(12) United States Patent
Shake et al.

(10) Patent No.: US 7,869,428 B2
(45) Date of Patent: Jan. 11, 2011

(54) PACKET TRANSMISSION METHOD AND PACKET TRANSMISSION DEVICE

(75) Inventors: Ippei Shake, Yokohama (JP); Mitsunori Fukutoku, Yokohama (JP); Wataru Imajyuku, Yokohama (JP); Katsuhiro Shimano, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1139 days.

(21) Appl. No.: 10/577,874

(22) PCT Filed: Jul. 13, 2005

(86) PCT No.: PCT/JP2005/012959

§ 371 (c)(1),
(2), (4) Date: Apr. 28, 2006

(87) PCT Pub. No.: WO2006/006632

PCT Pub. Date: Jan. 19, 2006

(65) Prior Publication Data

US 2008/0279181 A1    Nov. 13, 2008

(30) Foreign Application Priority Data

Jul. 14, 2004 (JP) ............................. 2004-207593
Nov. 18, 2004 (JP) ............................. 2004-334587

(51) Int. Cl.
*H04L 12/28* (2006.01)
(52) U.S. Cl. ...................................... 370/389
(58) Field of Classification Search ............. 370/389, 370/350, 231, 235, 236, 244, 248, 217, 249, 370/360, 390, 469, 401
See application file for complete search history.

(56) References Cited

U.S. PATENT DOCUMENTS 7,304,996 B1 * 12/2007 Swenson et al. ............ 370/394

(Continued)

FOREIGN PATENT DOCUMENTS

JP         60-167546         8/1985

(Continued)

OTHER PUBLICATIONS

Wakai, Masugawa et al., "IP Node ni okeru Protection Hoshiki no Ichi Kento", Nen IEICE Communications Society Taikai Koen Ronbunshu 2, p. 107, B-6-51, 2001.

(Continued)

*Primary Examiner*—Dang T Ton
*Assistant Examiner*—Nourali Mansoury
(74) *Attorney, Agent, or Firm*—Oblon, Spivak, McClelland, Maier & Neustadt, L.L.P.

(57) ABSTRACT

A packet transfer method in a network apparatus that transfers packets is disclosed. In the packet transfer method, a sending side apparatus generates two copies of a send packet, provides a sequence number identifying the same sending sequence to each of the copied packets, provides an identifier corresponding to a send/receive pair to each of the copied packets to send the packets, and a receiving side apparatus receives each of the packets with two receiving units; recognizes the identifiers each corresponding to a send/receive pair; identifies packets having the same information and the sequence based on the sequence number when the identifiers are the same; selects one of the packets of the same sequence so as to send the packet downstream, and discards another packet, wherein, when only one of the packets of the same sequence arrives, the arriving packet is sent downstream.

38 Claims, 56 Drawing Sheets

U.S. PATENT DOCUMENTS

2002/0009053 A1* 1/2002 Sjoblom ............... 370/235
2003/0018689 A1* 1/2003 Ramakrishnan ........... 709/104
2007/0297393 A1* 12/2007 Furukawa et al. .......... 370/352

FOREIGN PATENT DOCUMENTS

| JP | 4-278751 | 10/1992 |
|---|---|---|
| JP | 7 46250 | 2/1995 |
| JP | 7-307753 | 11/1995 |
| JP | 8-256158 | 10/1996 |
| JP | 2663687 | 6/1997 |
| JP | 10-200552 | 7/1998 |
| JP | 2001-7846 | 1/2001 |
| JP | 2002-524920 | 8/2002 |
| JP | 2002-335251 | 11/2002 |
| JP | 2003-69617 | 3/2003 |
| JP | 2003-174479 | 6/2003 |
| JP | 2004-104186 | 4/2004 |
| JP | 2005-039416 | 2/2005 |
| WO | WO 00/13376 | 3/2000 |

OTHER PUBLICATIONS

"IEEE Standard for Local and Metropolitan Area Networks Media Access Control (MAC) Bridges", IEEE Std 802.1D, pp. I-IX and 1-269, 2004.

"IEEE Standard for Local and Metropolitan Area Networks—Common Specifications Part 3: Media Access Control (MAC) Bridges—Amendment 2: Rapid Reconfiguration", IEEE Std 802.1 w, pp. I-VIII and 1-108, 2001.

Seifert, Rich, "The Switch Book: The Complete Guide to LAN Switching Technology", Nikkei Business Publications, Inc., pp. 190-215, 2001.

"IEEE Standard for Information Technology—Telecommunications and Information Exchange Between Systems—Local and Metropolitan Area networks—Specific Requirements Part 17: Resilient Packet Ring (RPR) Access Method and Physical Layer Specifications" IEEE Std 802.17, pp. I-XXIV and 1-664, 2004.

Terauchi, Hironori et al., "The High Reliable Network System Based on Layer 2 Technology", IEICE Technical Report, pp. 7-12, 2005. (With English Abstract).

Kawate, Ryusuke et al., "Implementation and Test of the High Reliable Network System Based on Layer 2 Technology", IEICE Technical Report, pp. 13-18, 2005. (With English Abstract).

* cited by examiner

CONFIGURATION OF POINT-MULTIPOINT

CONFIGURATION OF MULTIPOINT-MULTIPOINT

SEQUENCE NUMBER OF SEQUENCE IDENTIFIER $N_{max}$ IS THE MAXIMUM VALUE OF SEQUENCE NUMBER
(ex: WHEN SEQUENCE IDENTIFIER IS x BIT, $N_{max}=2^x$)

PACKET TRANSMISSION METHOD AND PACKET TRANSMISSION DEVICE

TECHNICAL FIELD

The present invention relates to a packet transfer method and a packet transfer apparatus. More particularly, the present invention relates to a packet transfer method and a packet transfer apparatus for realizing failure recovery without packet loss in a network adopting an Ethernet transfer scheme, a MPLS transfer scheme, GRE encapsulating, IPinIP encapsulating, GFP encapsulating, an encapsulation transfer scheme for variable length packet such as layer 2 frame encapsulating, and the like.

BACKGROUND ART

As conventional failure detection/switching technologies in packet communications, there are STP (Spanning Tree Protocol) in the Ethernet, derivatives of it (refer to non-patent documents 1-3, for example), and EAPS (Ethernet Automatic Protection Switching). In the EAPS, there is a technology for performing switching at high speed in a ring topology for a MAN service.

In this technology, master switches are selected in the ring so that one of the master switches is selected as a primary switch and another is selected as a secondary switch so as to block the secondary switch. The primary switch sends "Hello packet" over the ring, and a failure is detected if the packet does not return to the secondary switch within a predetermined time. When a switch on the ring detects a failure, the switch can send "TRAP" to the master switch, so that the failure can be detected more quickly (within one second). When the failure is detected, the secondary switch is changed to "FORWARDING" immediately.

In addition, as a standard for realizing high reliability in the ring network, there is RPR (Resilient Packet Ring) (refer to document 4, for example).

Further, as an uninterruptible technology for ATM cells in an ATM line, there is a method for writing a cell number on the ATM cell, copying the cell into equal to or more than two, sending each cell to different lines, and in the receiving side, selecting one of the same information cells sent from equal to or more than two lines to transfer the cell downstream (refer to patent document 1, for example).

[Non-patent document 1] IEEE 802.1D Spanning Tree Protocol (STP)

[Non-patent document 2] IEEE 802.1w Rapid Spanning Tree (RSTP)

[Non-patent document 3] The Switch Book: The Complete Guide to LAN Switching Technology by Rich Seifert, translated by Nikkei Business Publications, Inc., ISBN4-8222-8099-3

[Non-patent document 4] IEEE802.17 Resilient Packet Ring (RPR)

[Patent document 1] Japanese Laid-Open Patent Application No. 7-46250

DISCLOSURE OF THE INVENTION

Problem to be Solved by the Invention

However, since switching time in the conventional STP or EAPS is equal to or greater than one second, there is a problem in that high reliability that does not allow packet (frame) loss cannot be realized. In addition, these technologies are failure recovery technologies for each port of a switch, thus, they are not for realizing switching for each packet. In addition, there is a problem in that the EAPS or RPR can be adopted only for a ring network.

In addition, since the uninterruptible technology for ATM cells disclosed in the patent document 1 is tailored to the ATM line, and is an uninterruptible technology for each line, there is a problem in that the technology cannot be applied for node failure.

The present invention is contrived in view of the above-mentioned points, and an object of the present invention is to provide a packet transfer method and a packet transfer apparatus for realizing highly reliable failure recovery without packet loss in a network in which communications are performed by transferring packets

Means for Solving the Problem

The above object is achieved by a packet transfer method in a network apparatus that transfers packets, wherein:

a sending side apparatus generates two copies of a send packet, provides a sequence number identifying the same sending sequence to each of the copied packets, provides an identifier corresponding to a send/receive pair to each of the copied packets to send the packets, and a receiving side apparatus receives each of the packets with two receiving units;

recognizes the identifiers each corresponding to a send/receive pair;

identifies packets having the same information and the sequence based on the sequence number when the identifiers are the same;

selects one of the packets of the same sequence so as to send the packet downstream, and discards another packet, wherein, when only one of the packets of the same sequence arrives, the arriving packet is sent downstream.

The present invention can be also configured as a packet transfer method in a network apparatus that transfers packets, wherein:

a sending side apparatus generates two copies of a send packet, provides a sequence number identifying the same sending sequence to each of the copied packets, and provides an identifier corresponding to a send/receive pair and an identifier corresponding to a route to each of the copied packets to send the packets, and a receiving side apparatus receives each of the packets with two receiving units;

recognizes the identifiers each corresponding to a send/receive pair and the identifiers each corresponding to a route;

identifies packets having the same information and the sequence based on the sequence number when the identifiers are the same;

selects one of the packets of the same sequence so as to send the packet downstream, and discards another packet, wherein, when only one of the packets of the same sequence arrives, the arriving packet is sent downstream.

the receiving side apparatus can temporarily store the two packets transferred from two routes into two FIFO memories respectively, and select a packet transferred normally to transfer it downstream. In addition, the receiving side apparatus may be configured to temporarily store the two packets transferred from two routes into two circulating hash memories respectively, and select a packet that is transferred normally so as to transfer it downstream, or mat be configured to temporarily store the two packets transferred from two routes into two FIFO memories respectively, and select a packet that is transferred normally using a third memory shared by the two receiving units so as to transfer the selected packet downstream.

In addition, the present invention can be also configured as a packet transfer apparatus for transferring packets, including:

sending function means including:

copy means for generating two copies from a send packet;

number/identifier providing means for providing a sequence number identifying the same sending sequence to each of the packets copied by the copy means, and providing an identifier corresponding to a send/receive pair to each of the copied packets;

packet sending means for sending the two packets to which the sequence number and the identifier are provided; and receiving function means including:

packet receiving means for receiving each of the two packets sent from the sending function means;

memories each for storing one of the two received packets;

selection means for reading out the two packets stored in the memories, recognizing the identifiers each corresponding to a send/receive pair, identifying packets having the same information and the sequence based on the sequence number when the identifiers are the same, and selecting one of the packets of the same sequence; and sending means for sending the packet selected in the selection means downstream, and discarding another packet, wherein, when only one of the packets of the same sequence arrives, the arriving packet is sent downstream.

In addition, the present invention can be also configured as a packet transfer apparatus for transferring packets, including:

sending function means including:

copy means for generating two copies from a send packet;

number/identifier providing means for providing a sequence number identifying the same sending sequence to each of the packets copied by the copy means, and providing an identifier corresponding to a send/receive pair and an identifier corresponding to a route to each of the copied packets;

packet sending means for sending the two packets to which the sequence number and the identifier are provided; and receiving function means including:

packet receiving means for receiving each of the packets sent from the sending function means;

memories each for storing one of the two received packets;

selection means for reading out the two packets stored in the memories, recognizing the identifiers each corresponding to a send/receive pair and identifiers each corresponding to a route, identifying packets having the same information and the sequence based on the sequence number when the identifiers are the same, and selecting one of the packets of the same sequence; and sending means for sending the packet selected in the selection means downstream, and discarding another packet, wherein, when only one of the packets of the same sequence arrives, the arriving packet is sent downstream.

In addition, the present invention can be also configured as a packet transfer method performed by packet transfer apparatuses provided in a packet sending side and a receiving side in a communication network for transferring a packet by determining a transfer destination by referring to destination information of the packet, wherein equal to or more than two independent routes are set between the sending side packet transfer apparatus and the receiving side packet transfer apparatus;

the sending side packet transfer apparatus inserts information identifying a sequence of a packet into a part of the packet that is not referred to for determining the transfer destination of the packet, copies the packet to generate equal to or more than two packets, and sends the packets over the independent routes respectively; and the receiving side packet transfer apparatus receives each packet from the independent routes, refers to the information identifying the sequence for each packet to identify packets having the same information and the sequence, and transfer one of the packets having the same information downward in the order of the sequence of the packet.

In addition, the present invention can be also configured as a packet transfer apparatus used in a packet transfer system including a plurality of packet transfer apparatuses provided in a packet sending side and a receiving side via equal to or more than two independent routes in a communication network for transferring a packet by determining a transfer destination by referring to destination information of the packet, the packet transfer apparatus including sending function means and receiving function means, the sending function means including:

inserting means for inserting information identifying a sequence of a packet into a part of the packet that is not referred to for determining the transfer destination of the packet;

copying means for copying the packet to generate equal to or more than two packets; and sending means for sending the packets over the independent routes respectively;

the receiving function means including:

receiving means for receiving each packet from the independent routes;

identifying means for referring to the information identifying the sequence for each packet to identify packets having the same information and the sequence; and selection means for transferring one of the packets having the same information identified by the identifying means downstream in the order of the sequence of the packet.

In addition, the present invention can be also configured as a packet transfer method performed by packet transfer apparatuses provided in a packet sending side and a receiving side in a communication network for transferring a packet by determining a transfer destination by referring to destination information of the packet, wherein:

equal to or more than two independent routes are set between the sending side packet transfer apparatus and the receiving side packet transfer apparatus;

the sending side packet transfer apparatus distinguishes a high reliability packet from non-high reliability packets by referring to a part of a packet header of the packet, and copies the high reliability packet into packets to send them to all of the independent routes respectively;

the receiving side packet transfer apparatus determines whether an arriving packet from the independent routes is the high reliability packet by referring to a part of the packet header, and as to high reliability packets, the receiving side packet transfer apparatus determines sameness of packet data arriving from the plurality of routes, when the same packets arrives from equal to or more than two routes, the receiving side packet transfer apparatus transfers only one of the same packets downstream and discards other packets; and when the same packet arrives from only one route, the receiving side packet transfer apparatus transfers the packet downstream. By referring to the part of the packet, the priority of the packet can be determined so that it can be determined whether the packet is the high reliability packet.

When the packet to be transferred is an Ethernet packet, the part of the packet header is any one of a port number at which the packet arrives in a previous switch of the packet transfer apparatus, a Type value of layer 3 protocol in a frame header, a destination MAC address in a frame header, a source MAC address, a priority (CoS value) included in 802.1Q VLAN tag, VLAN-ID, a DiffServ code/point value (ToS value) included in an IP header, a destination port number, a source port number of UDP, a destination port number, and a source port number of TCP, when the packet to be transferred is a packet for MPLS, the part of the packet header is any one of a destination MAC address, a source MAC address, and a CoS value (Exp value) of a shim header, and when the packet to be transferred includes an IP packet, the part of the packet header is any one of a ToS value of the IP packet, a source IP address, and a destination IP address.

The receiving side packet transfer apparatus can determine the sameness of packets arriving from the plurality of routes based on a value obtained by applying a predetermined function to each packet arriving from the plurality of routes.

In addition, the sending side packet transfer apparatus may insert a sequence identifier or a timestamp into a send packet, wherein the receiving side packet transfer apparatus determines the sameness of packets arriving from the plurality of routes by referring to the sequence identifier or the timestamp inserted in the sending side.

A format of the sequence identifier or the timestamp inserted into the packet by the sending side packet transfer apparatus may be the same as a format of a VLAN tag conforming to 802.1Q standard, and the sending side packet transfer apparatus writes sequence information or time information into a VLAN-ID field of the VLAN tag.

In addition, the present invention can be also configured as a packet transfer method performed by packet transfer apparatuses provided in a packet sending side and a receiving side in a communication network for transferring a packet by determining a transfer destination by referring to destination information of the packet, wherein:

equal to or more than two independent routes are set between the sending side packet transfer apparatus and the receiving side packet transfer apparatus;

the sending side packet transfer apparatus copies the packet so as to send copied packets to all of the independent routes;

the receiving side packet transfer apparatus receives packets from each of the independent routes and refers to sameness identifying information of each packet so as to identify packets having the same information, and to send downstream a packet, among the packets having the same information, that has not yet be transferred, and the receiving side packet transfer apparatus stores the sameness identifying information of packets already sent downstream for m (m is an integer equal to or greater than one) preceding packets from the newest packet, and compares the stored sameness identifying information with sameness identifying information of a next arriving packet so as to determine whether the arriving packet is one already sent or not.

The sameness identifying information is a sequence identifier or a timestamp inserted into the packet, or a value obtained by applying a predetermined function to the packet.

In addition, the present invention can be also configured as a packet transfer method performed by packet transfer apparatuses provided in a packet sending side and a receiving side in a communication network for transferring a packet by determining a transfer destination by referring to destination information of the packet, wherein:

equal to or more than two independent routes are set between the sending side packet transfer apparatus and the receiving side packet transfer apparatus;

the sending side packet transfer apparatus inserts a sequence identifier for identifying sequence of packets into a send packet and copies the packet so as to send copied packets to all of the independent routes;

the receiving side packet transfer apparatus compares values of sequence identifiers of plural packets received form the independent routes with a value (CF) of a sequence identifier of an already sent packet so as to send a packet downstream in at least one packet having a value as the sequence identifier that is greater than the value (CF) of the sequence identifier of the already transferred packet and that is the least value among the values of the sequence identifiers of the plural packets received from the independent routes.

In addition, the present invention can be also configured as a packet transfer method performed by packet transfer apparatuses provided in a packet sending side and a receiving side in a communication network for transferring a packet by determining a transfer destination by referring to destination information of the packet, wherein:

a plurality of independent routes are set between the sending side packet transfer apparatus and the receiving side packet transfer apparatus;

the sending side packet transfer apparatus inserts a sequence identifier identifying a sequence of packets into a send packet, and copies the packet so as to send copied packets to all of the independent routes;

the receiving side packet transfer apparatus receives packets from each of the independent routes and refers to the sequence identifier of each packet so as to identify packets having the same information and the sequence, and to send downstream a packet among the packets having the same information in the order of the sequence of the packet, wherein, in the receiving side packet transfer apparatus, a route from which a packet arrives first from the start of communication among the independent routes is regarded as an active system, the receiving side packet transfer apparatus compares a value (CF) of the sequence identifier of an already transferred packet with a value of the sequence identifier of a packet received in the active system so as to determine a packet having a sequence identifier greater than the value (CF) of the sequence identifier of the already transferred packet as a packet to be transferred next, and when arrival of packets is interrupted for a predetermined time in the active system, another system is adopted as a new active system, and a packet received in the new active system is transferred downstream.

In addition, the present invention can be also configured as a packet transfer apparatus used in a packet transfer system including a plurality of packet transfer apparatuses provided in a packet sending side and a receiving side via equal to or more than two independent routes in a communication network for transferring a packet by determining a transfer destination by referring to destination information of the packet, the packet transfer apparatus including sending function means and receiving function means, the sending function means including means for distinguishing a high reliability packet from non-high reliability packets by referring to a part of a packet header of the packet, and copying the high reliability packet into packets to send them to all of the independent routes;

the receiving function means including means for determining whether an arriving packet from the independent routes is the high reliability packet by referring to a part of the packet header, and as to high reliability packets, determining sameness of packet data arriving from the plurality of routes, and, when the same packets arrives from equal to or more than two routes, transferring only one of the same packets downward and discarding other packets, and when the same packet arrives from only one route, transferring the packet downstream.

In addition, the present invention can be also configured as a packet transfer apparatus used in a packet transfer system including a plurality of packet transfer apparatuses provided in a packet sending side and a receiving side via equal to or more than two independent routes in a communication network for transferring a packet by determining a transfer destination by referring to destination information of the packet, the packet transfer apparatus including sending function means and receiving function means, the sending function means includes means for copying the packet so as to send copied packets to all of the independent routes;

the receiving function means including:

means for receiving packets from each of the independent routes;

means for referring to sameness identifying information of each packet so as to identify packets having the same information, means for storing the sameness identifying information of packets already sent downstream for m (m is an integer equal to or greater than one) preceding packets from the newest packet, and comparing the stored sameness identifying information with sameness identifying information of a next arriving packet so as to determine whether the arriving packet is one already sent or not; and means for sending downstream a packet, among the packets having the same information, that has not yet be transferred.

In addition, the present invention can be also configured as a packet transfer apparatus used in a packet transfer system including a plurality of packet transfer apparatuses provided in a packet sending side and a receiving side via equal to or more than two independent routes in a communication network for transferring a packet by determining a transfer destination by referring to destination information of the packet, the packet transfer apparatus including sending function means and receiving function means, the sending function means includes means for inserting a sequence identifier for identifying sequence of packets into a send packet and copies the packet so as to send copied packets to all of the independent routes;

the receiving function means includes means for comparing values of sequence identifiers of plural packets received form the independent routes with a value (CF) of a sequence identifier of an already sent packet so as to send a packet downstream in at least one packet having a value as the sequence identifier that is greater than the value (CF) of the sequence identifier of the already transferred packet and that is the least value among the values of the sequence identifiers of the plural packets received from the independent routes.

In addition, the present invention can be also configured as a packet transfer apparatus used in a packet transfer system including a plurality of packet transfer apparatuses provided in a packet sending side and a receiving side via equal to or more than two independent routes in a communication network for transferring a packet by determining a transfer destination by referring to destination information of the packet, the packet transfer apparatus including sending function means and receiving function means, the sending function means including means for inserting a sequence identifier for identifying a sequence of packets to a send packet and copying the packet so as to send copied packets to the independent routes;

the receiving function means including means for receiving packets from each of the independent routes and referring to the sequence identifier of each packet so as to identify packets having the same information and the sequence, and to send downstream a packet among the packets having the same information in the order of the sequence of the packet, wherein, in the receiving function means, a route from which a packet arrives first from the start of communication among the independent routes is regarded as an active system, the receiving function means compares a value (CF) of the sequence identifier of an already transferred packet with a value of the sequence identifier of a packet received in the active system so as to determine a packet having a sequence identifier greater than the value (CF) of the sequence identifier of the already transferred packet as a packet to be transferred next, and when arrival of packets is interrupted for a predetermined time in the active system, another system is adopted as a new active system, and a packet received in the new active system is transferred downstream.

EFFECT OF THE INVENTION

According to the present invention, in a packet network that could not be recovered uninterruptedly in an event of a failure in the past, copies of a packet is generated and the copies are transferred over different route respectively, and, in the receiving side, one of the two copies is transferred to realize uninterruptible switching function so that a highly reliable packet network can be provided. In addition, by using the independent route for each send/receive, a highly reliable packet network similar to point-point can be provided for communications among a plurality of sites.

In addition, according to the present invention, since a packet that requires high reliability and a packet that does not require it can be identified by referring to information in a packet header, the present invention can be used to networks of users having various requirements for reliability.

In addition, when the sameness of packets is determined in the receiving side, by using a value obtained by applying a predetermined function to a packet, high reliability of the network can be realized without inserting an excessive field to a packet.

In addition, in the receiving side, by performing transfer of a packet after waiting for arrival of the same packets from equal to or more than two routes, in a case when a packet is sent from one source to a plurality of destinations, skip of sequence due to arrival delay can be prevented even when the sequence identifier becomes discontinuous.

In addition, by providing a route identifier corresponding to a user priority, priority control can be performed in the relay network.

Figure 1:
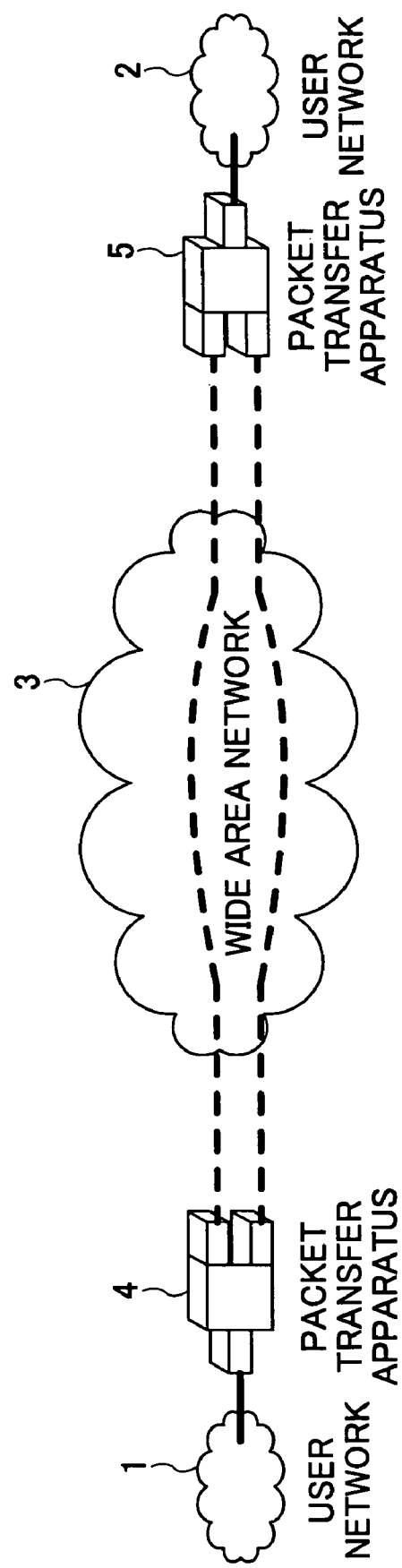
FIG. 1 is a system schematic diagram in an embodiment of the present invention.

DESCRIPTION OF REFERENCE SIGNS 100, 200, 300, 400, 500, 600, 700, 800 packet transfer apparatus
110, 210 sending function unit
111, 211 receiving unit
115, 215 route-send/receive pair determination unit
112, 212 copy unit
113, 213 identifier providing unit
114, 214 sending unit
116 high reliability determination unit
120, 220, 320, 420, 520, 620, 720, 820 receiving function unit
121, 221, 321, 421, 521, 621, 721, 821 receiving unit
122, 222, 322, 422, 522, 622, 722, 822 memory A, memory B, memory C
123, 223 selection unit
124, 224, 427, 627, 727, 827 counter unit
125, 225, 325, 425, 525, 625, 725, 825 sending unit
126, 226 identifier referring unit
127, 227, 326, 426, 526, 626, 628, 826 control unit
829 arriving counter/circulation counter unit

PREFERRED EMBODIMENTS FOR CARRYING OUT THE INVENTION

In the following, embodiments of the present invention are described with reference to figures. FIG. 1 shows a schematic diagram of a packet transfer system in an embodiment of the present invention.

In the figure, user networks 1 and 2 are connected via a wide area network 3. Each of packet transfer apparatuses 4 and 5 of the present invention is provided on a border between the user network 1, 2 and the wide area network 3.

When sending a packet to the wide area network 3, the packet transfer apparatus (4, 5) generates two copies of the packet sent from the user network 1 or 2, provides a sequence number (to be also referred to as "counter value" or "sequence identifier") indicating an order of the packets to the packets, so as to transfer the packets separately over independent routes. A receiving side selects one of the plural packets having the same information by referring to the counter value so as to transfer the selected packet downstream.

By the way, in the present specification and claims, "equal to or more than two independent routes" mean different routes in which communications are not interrupted at the same time due to single failure or construction. In addition, in the present specification and claims, the wording "packet" is used to include meaning of "frame" that is transferred over a layer 2 network.

In the configuration shown in FIG. 1, a plurality of packet transfer apparatuses may be provided in each of the sending side and the receiving side. In such a case, the packet transfer apparatus 4 adds, to the packet, an identifier for identifying a send/receive pair of the packet (a pair of a sending side packet transfer apparatus and a receiving side packet transfer apparatus), so that the packet transfer apparatus 5 can select a packet for each send/receive pair. In addition, the packet transfer apparatus 4 may provide a route identifier indicating a transfer route in the wide area network 3 so as to be able to transfer a packet over a route corresponding to the identifier. In addition, identifying information that serves both as identifying information of the send/receive pair (or only destination, or only source) and identifying information of the route can be provided.

Each of the user network and the wide area network is the Ethernet, the MPLS, and other networks in which packets are transferred by encapsulation, and the like. In addition, the wide area network is a network including layer 2 switches for transferring a packet by determining a transfer destination by referring to destination information of the packet. By the way, it is preferable to insert the counter value used for identifying packets having the same information into a part that is not referred to by the layer 2 switch and the like for determining the destination while the packet is transferred.

Figure 2:
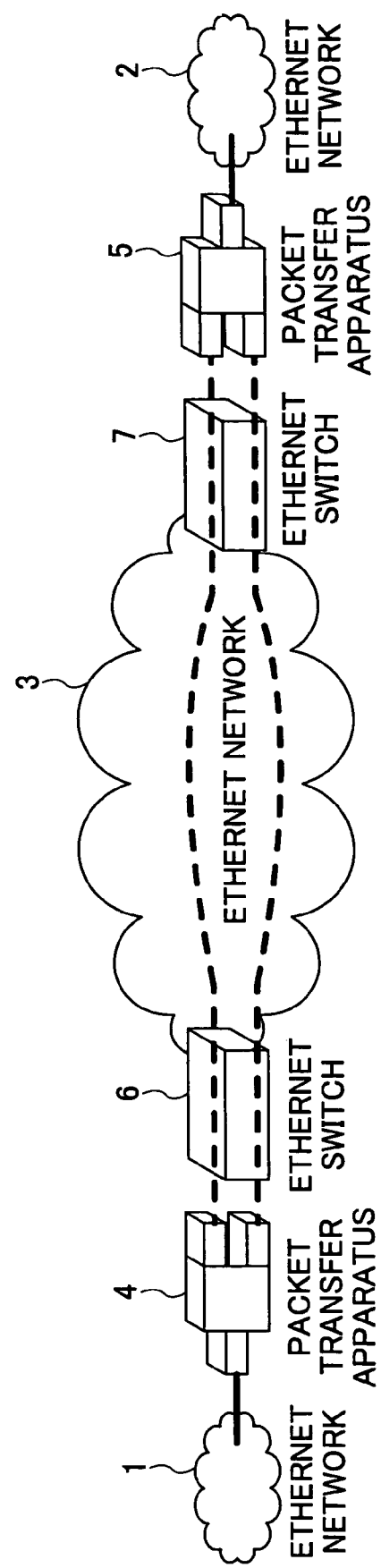
FIG. 2 is a system schematic diagram in an embodiment of the present invention.

FIG. 2 shows a network configuration example in a case when each of the user network and the wide area network is an Ethernet network.

Figure 3:
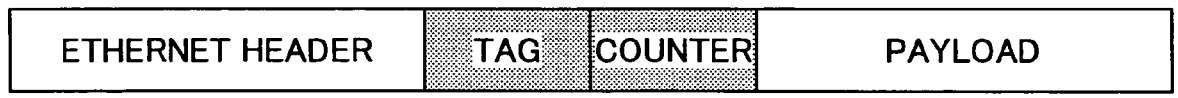
FIG. 3 is a figure showing a configuration of a packet in an embodiment of the present invention.

As shown in the figure, the Ethernet networks 1 and 2 in both edges are connected using an intermediate Ethernet network 3. Ethernet switches 6 and 7 are provided at borders of the Ethernet network 3. The packet transfer apparatuses 4 and 5 used in the present invention are provided in the outside of the Ethernet switches 6 and 7, and are used for configuring a highly reliable Ethernet network. The packet transfer apparatus (4, 5) generates two copies of an Ethernet packet from the Ethernet network 1 or 2 and sends the copies. Each of them is transferred separately so that the receiving side selects a normal one to transfer it downstream. As shown in FIG. 3, the copied packet is transmitted between the packet transfer apparatuses 4 and 5 as a packet to which two fields of a tag region and a counter region are added in addition to a normal Ethernet header and payload.

Addition of the fields can be performed in the following way for example.

When a target packet is an Ethernet packet, a tag field and a counter field are inserted following a source MAC address of the Ethernet packet, and a VLAN tag corresponding to the route and a sequence number are written. In addition, the tag field and the counter field is inserted following the source MAC address, so that a VLAN tag corresponding to the send/receive pair and a sequence number can be written. In addition, the tag field and the counter field is inserted following the source MAC address, so that a VLAN tag corresponding to the send/receive pair and a sending route, and a sequence number can be written. The tag field and the counter field may be inserted following the destination MAC address so that an identifying ID corresponding to the send/receive pair and a sequence number can be written.

When using MPLS as the packet transfer technology, the tag field and the counter field can be inserted before a shim header of MPLS so that a shim header corresponding to the sending route and a sequence number can be written. In addition, the tag field and the counter field may be inserted before the shim header of MPLS for writing a shim header corresponding to the send/receive pair and a sequence number. In addition, the tag field and the counter field may be inserted before the shim header of MPLS for writing a shim header corresponding to the sending route, an identifying ID corresponding to the send/receive pair, and a sequence number. In addition, the tag field and the counter field may be inserted before the shim header of MPLS for writing a shim header corresponding to the sending route, the send/receive pair and a sequence number.

In addition, when using encapsulation of a variable length packet as a packet transfer technology, a counter field is inserted after a header for encapsulation so that a sequence number is written. The receiving side apparatus can extracts an identifier corresponding to a send/receive pair or an identifier corresponding to a route from the header for encapsulation.

Examples of packets corresponding to each scheme such as the Ethernet, MPLS and the like are described in the following in detail.

Figure 4:
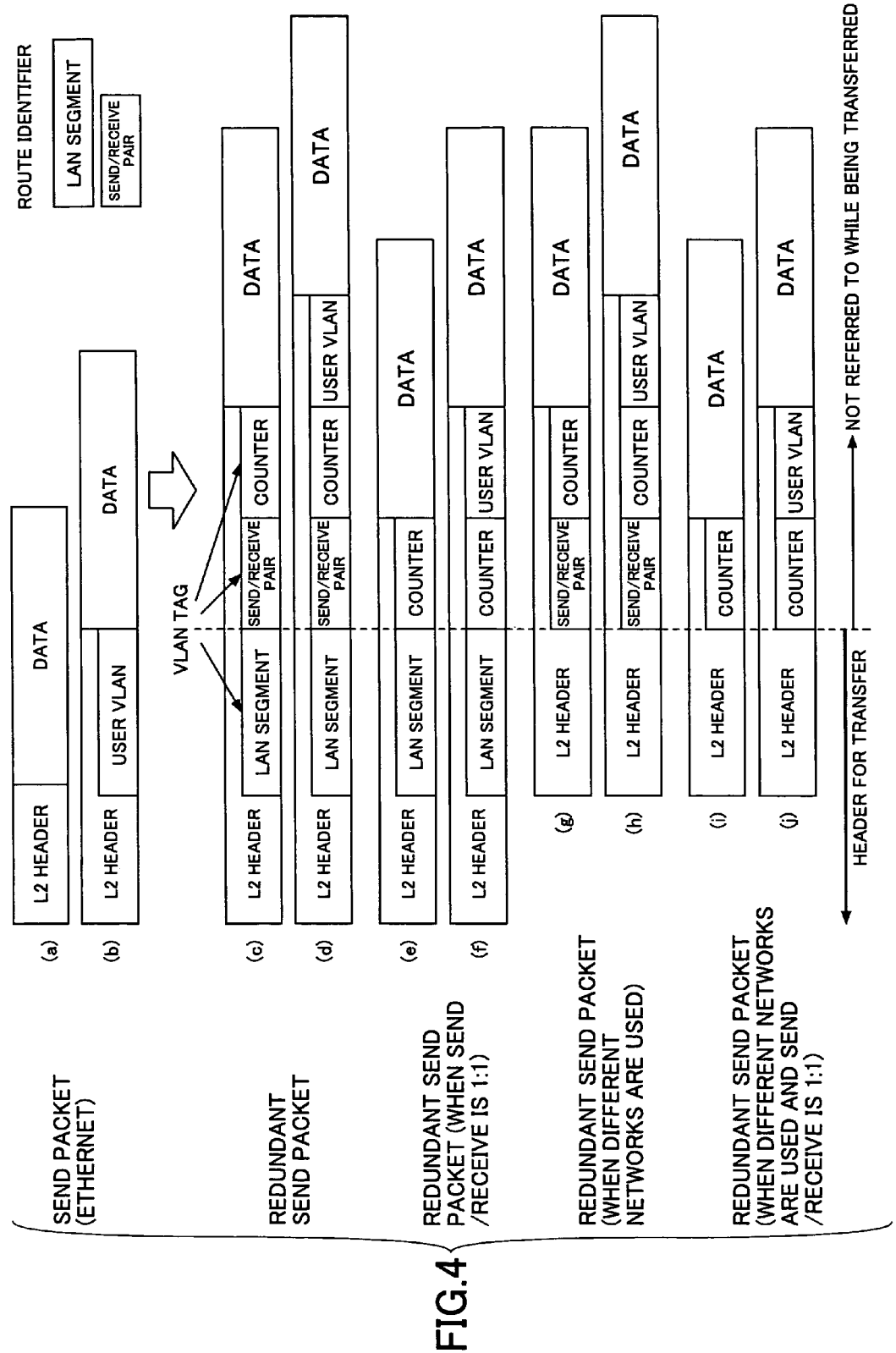
FIG. 4 is a figure showing a configuration of a packet in an embodiment of the present invention (example 1 in a case of Ethernet)

FIG. 4 is a figure showing examples of packet configurations in a case where the packet transfer apparatus of the present invention is applied to the Ethernet.

(a) and (b) show normal packets sent from a user side. As shown in (a), the packet includes a layer 2 (L2) header region (including MAC address and the like) and a data (payload) region. (b) shows a case in which a VLAN tag (user VLAN) used in the user side is included. Also in each case described below, an example including the user VLAN and an example without it are shown. But, since presence or absence of the user VLAN is an only different point between the example including the user VLAN and the example without it, only the examples that do not include the user VLAN are described. By the way, there may be a case in which a plurality of VLAN tags are provided.

A packet indicated by (c) includes a region of a LAN segment identifier (VLAN identifier, for example) indicating a LAN segment in the wide area network where the packet is transferred, a region of an identifier of a send/receive pair, and a region of a counter. The send/receive pair identifier can be determined based on MAC addresses of a source packet transfer apparatus and a destination packet transfer apparatus.

When the number of the send/receive pair is one, or when the send/receive pair is not identified, a configuration (e) in which the send/receive pair identifier is not included can be adopted.

In addition, when the plural copied packets are sent over different networks respectively, it is not necessary to identify a route in the network. Therefore, as indicated by (g), the LAN segment identifier can be omitted. Further when the number of the send/receive pair is one, or when the send/receive pair is not identified, a configuration including only the counter region shown in (i) can be adopted.

Figure 5:
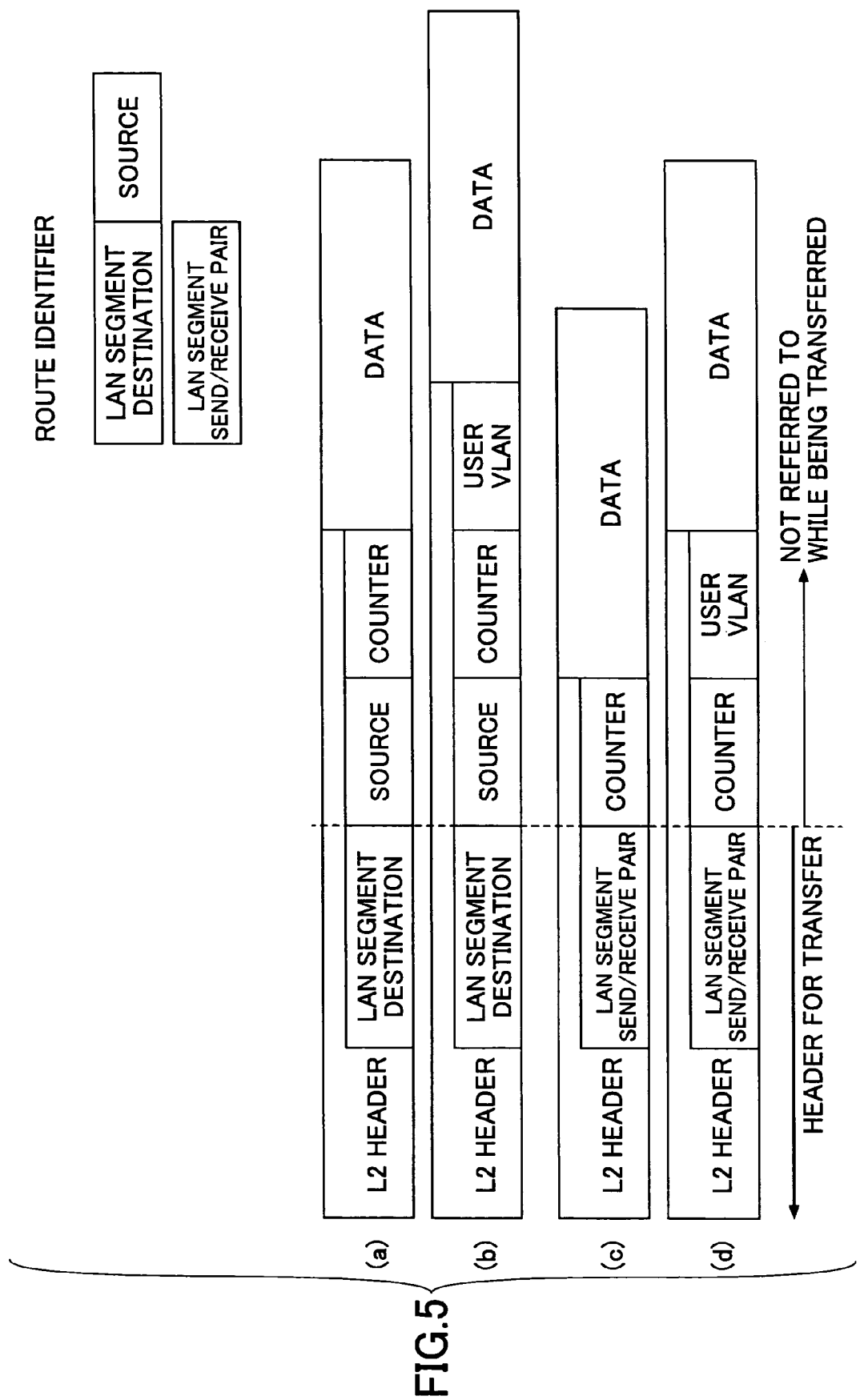
FIG. 5 is a figure showing a configuration of a packet in an embodiment of the present invention (example 2 in a case of Ethernet)

FIG. 5 is a figure showing other examples of packet configurations when the packet transfer apparatus is applied for the Ethernet. The example indicated by (a) includes a region of an identifier identifying a LAN segment in which the packet is transferred and the destination packet transfer apparatus, a region of an identifier identifying a source packet transfer apparatus, and a region of a counter. In addition, (c) shows an example including a region of an identifier identifying a LAN segment and a send/receive pair, and a region of a counter.

Figure 6:
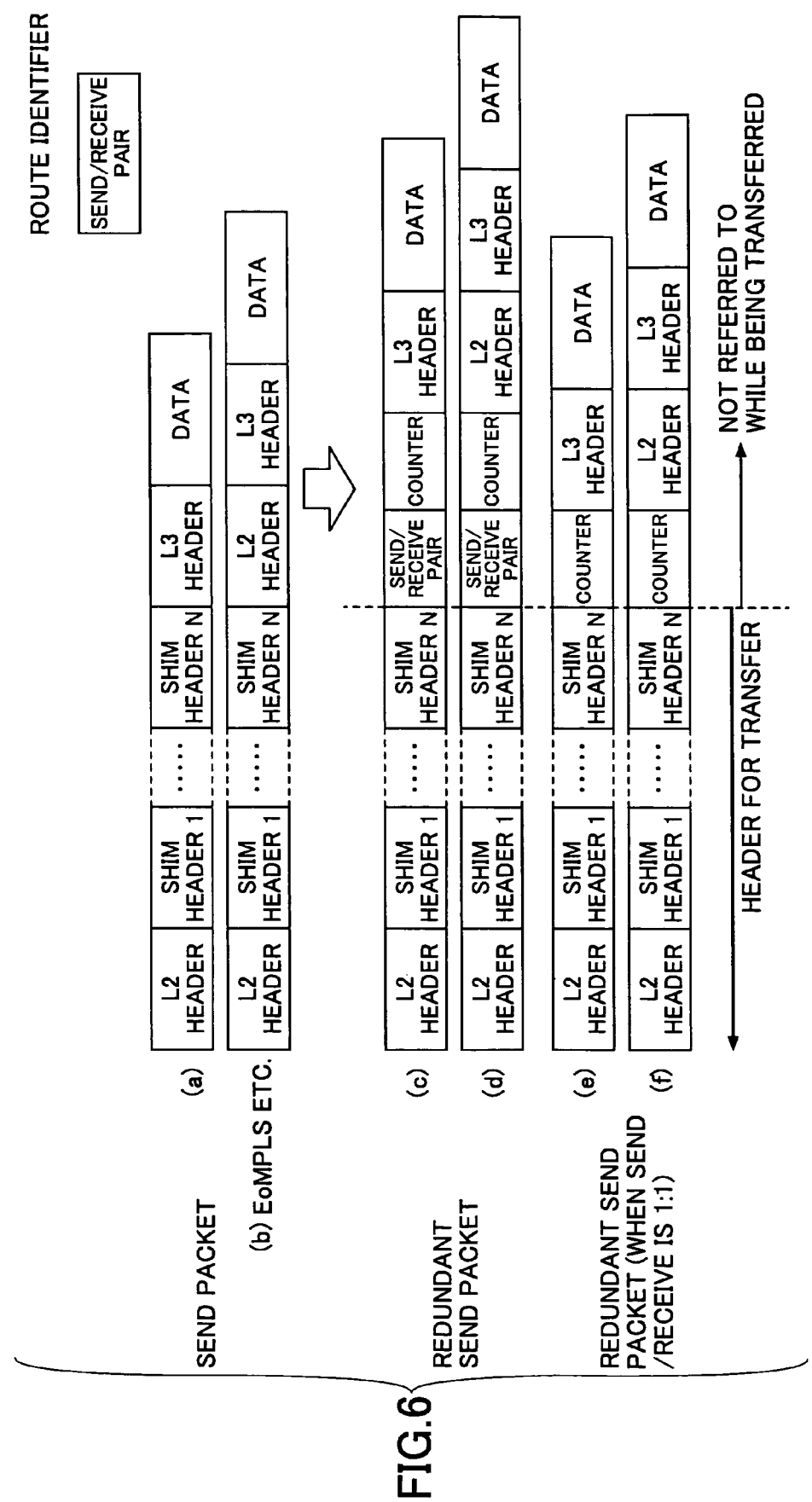
FIG. 6 is a figure showing a configuration of a packet in an embodiment of the present invention (example in a case of MPLS)

FIG. 6 is a figure showing other examples of packet configurations when the packet transfer apparatus is applied for MPLS. (a) shows a normal packet sent from the user side. (b) shows a normal packet of Ethernet over MPLS and the like. (b) is different from (a) in that (b) includes a L2 header after a L3 header. In each case in FIGS. 6 and 7, an example including the L2 header after the L3 header and an example without it are shown. However, since presence or absence of the L2 header is an only different point between the example including the L2 header after the L3 header and an example without it, only the examples that do not include the L2 header after the L3 header are described.

(c) in FIG. 6 is one in which a send/receive pair region and a counter region are provided before the shim header. In addition, (e) corresponds to one in which the send/receive pair region is omitted from (c).

Figure 7:
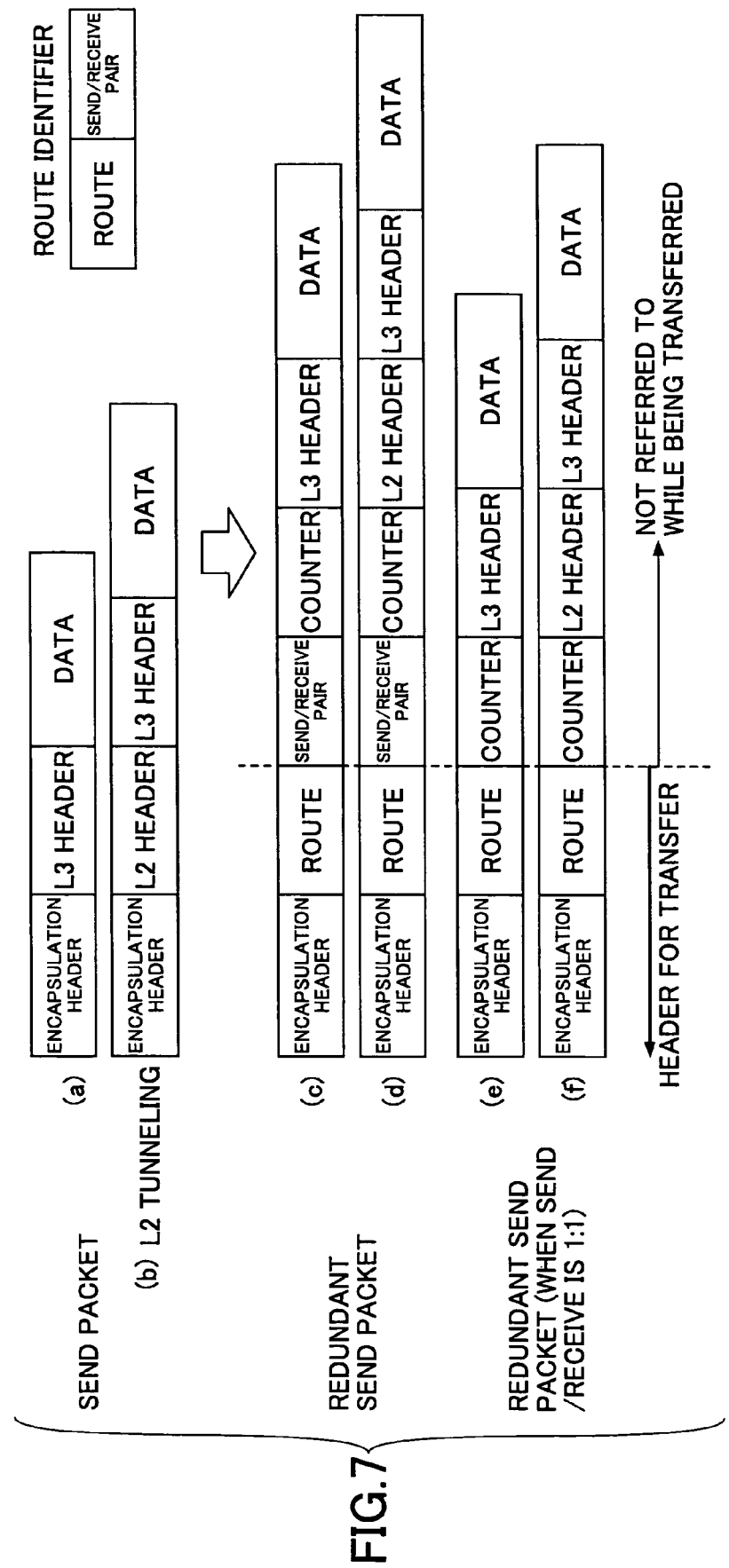
FIG. 7 is a figure showing a configuration of a packet in an embodiment of the present invention (example in a case of other encapsulation)

FIG. 7 is a figure showing examples of packet configurations when the packet transfer apparatus is applied for the technology for encapsulating a packet and transferring it. Each of (a) and (b) shows a normal packet from the user side.

(c) indicates one providing, before an encapsulation header, a region of an identifier identifying a route by which the packet is transferred in the wide area network, a region of a send/receive pair identifier, and a counter region. When it is not necessary to identify the send/receive pair, the configuration (e) can be adopted.

By the way, an identifier indicating a route such as the LAN segment and an identifier indicating a destination, a source, a send/receive part and the like may be collectively referred to as a route identifier.

As shown in FIGS. 4-7, it is preferable to provide the counter region in a part that is not referred to for determining a destination while the packet is transferred. Accordingly, there is a merit that the operation of the packet transfer apparatus of this invention can be realized irrespective of kinds of carriers of the wide area network in which the packet is transferred. In this method, for the Ethernet, as the identifier that is inserted into the packet and that is referred to while the packet is transferred for determining a destination, a VLAN tag format is desirable in consideration of compatibility to the network. On the other hand, it is also desirable to use the VLAN tag format as the counter region. However, considering that the counter region is not referred to while the packet is transferred, the counter region may have any field length. In addition, in cases other than the Ethernet, the length of the counter region can be any length. In the following, each embodiment is described.

First Embodiment

Figure 8:
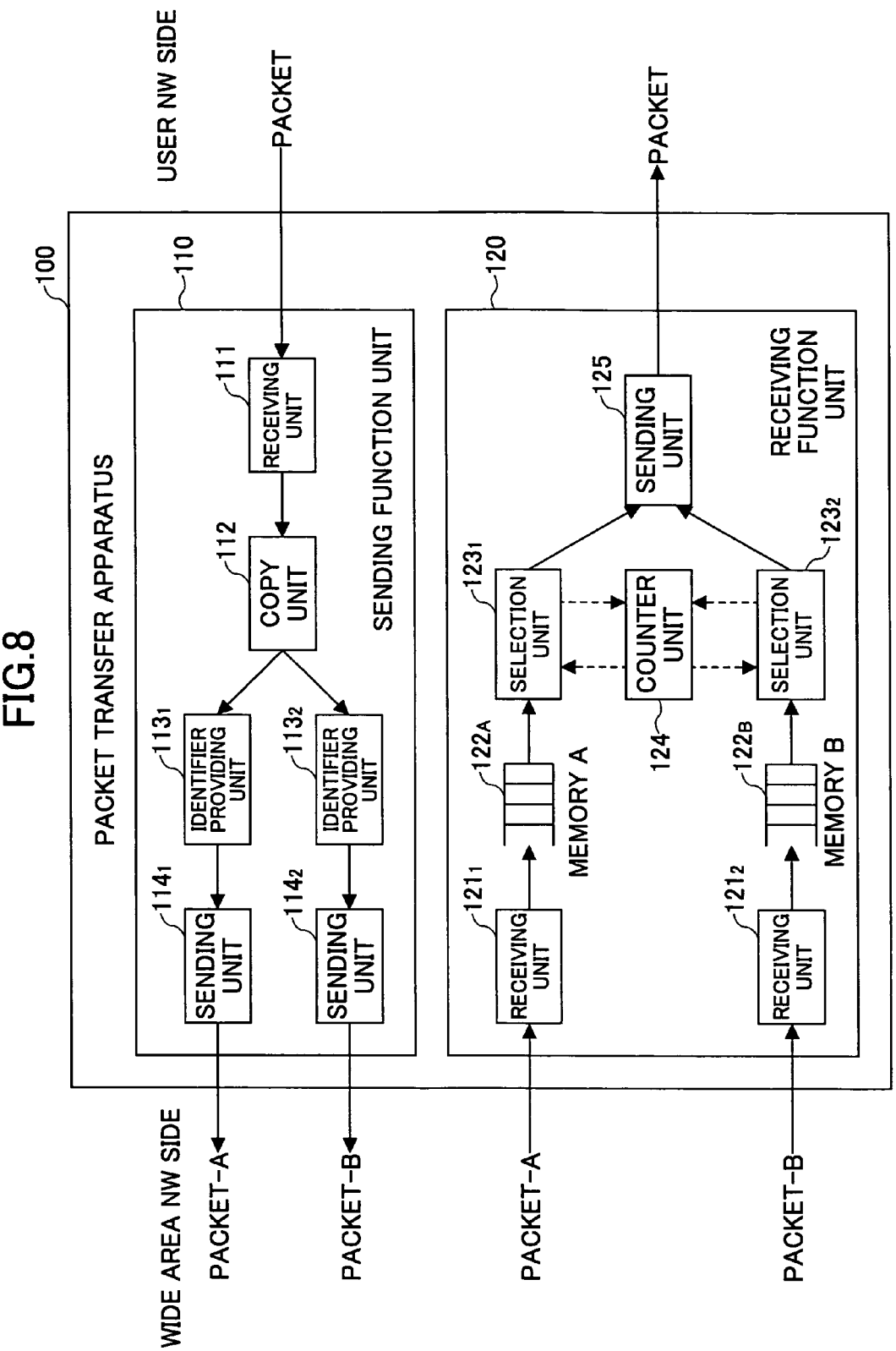
FIG. 8 is a block diagram of a packet transfer apparatus in a first embodiment of the present invention.

FIG. 8 is a figure showing a configuration of a packet transfer apparatus 100 realizing the first embodiment of the present invention.

The packet transfer apparatus 100 shown in the figure includes a sending function unit 110 and a receiving function unit 120. When the packet transfer apparatus 100 exists on a sending side, the sending function unit 110 is used. When the packet transfer apparatus 100 exists in a receiving side, the receiving function unit 120 is used.

The sending function unit 110 includes a receiving unit 111, a copy unit 112, identifier providing units $113_1$ and $113_2$, and sending units $114_1$ and $114_2$.

The sending function unit 110 receives a packet from the user network side by the receiving unit 111, and generates two copies of the packet in the copy unit 112. The copied packets are sent to the identifier providing units $113_1$ and $113_2$ respectively in which a counter region (sequence identifier region) is provided for each packet, and a counter value (sequence identifier) is written into the region. The counter value indicates a sequence of the packet, and is incremented by 1 each time when a packet is transferred and written. The packets generated by the identifier providing units $113_1$ and $113_2$ are sent to the wide area network side by the sending units $114_1$ and $114_2$ respectively.

The receiving function unit 120 includes a receiving unit 121, a memory A $122_A$, a memory B $122_B$, selection units $123_1$ and $123_2$, a counter unit 124, and a sending unit 125.

In the receiving function unit 120, packets of an A system and a B system are received from the wide area network by the two receiving units $121_1$ and $121_2$. The received packet of A system is stored in the memory A $122_A$, and the received packet of B system is stored in the memory B $122_B$. In this embodiment, each of the memories A $122_A$ and B $122_B$ are used as a FIFO (First In First Out). The packets read from the memory A $122_A$ and the memory B $122_B$ are identified in the selection units $123_1$ and $123_2$, so that a packet is selected. Then, the counter region added to the packet is deleted so as to be sent to the user network side from the sending unit 125.

Figure 9:
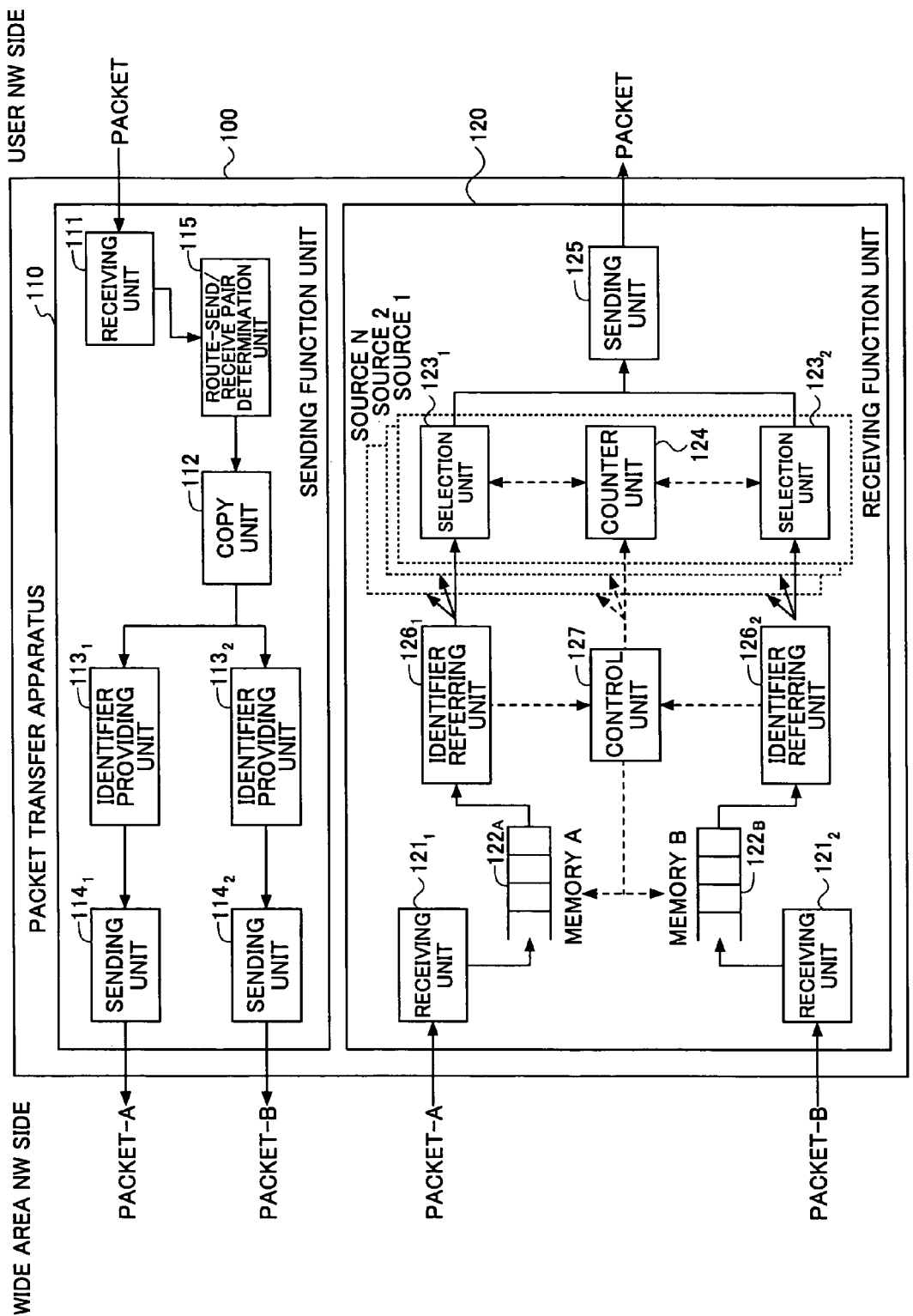
FIG. 9 is a block diagram of a packet transfer apparatus in the first embodiment of the present invention.

FIG. 9 shows another configuration of the packet transfer apparatus for realizing the first embodiment of the present invention. The example shown in FIG. 9 is an example in which there exists a plurality of sending side packet transfer apparatuses and destination side packet transfer apparatuses, and a send/receive pair is identified.

The packet transfer apparatus 100 shown in the figure includes a sending function unit 110 and a receiving function unit 120. In FIG. 9, when the packet transfer apparatus 100 exists on a sending side, the sending function unit 110 is used. When the packet transfer apparatus 100 exists in a receiving side, the receiving function unit 120 is used.

The sending function unit 110 includes a receiving unit 111, a route-send/receive pair determination unit 115, a copy unit 112, identifier providing units $113_1$ and $113_2$, and sending units $114_1$ and $114_2$.

The sending function unit 110 receives a packet from the user network side by the receiving unit 111. Then, the route-send/receive pair determination unit 115 determines a packet transfer route and a send/receive pair (of packet transfer apparatuses) based on a destination of the packet and the like. By the way, when routes on which plural copies packets are transferred are predetermined, determination of the packet transfer route is not necessary.

Then, the copy unit 112 generates two copies of the packet. The copied packets are sent to the identifier providing units $113_1$ and $113_2$ respectively in which a region of the route identifier (including identifying information of a route and identifying information of a send/receive pair) and a counter region are provided for each packet, so that a value is written into each region.

Figure 10:
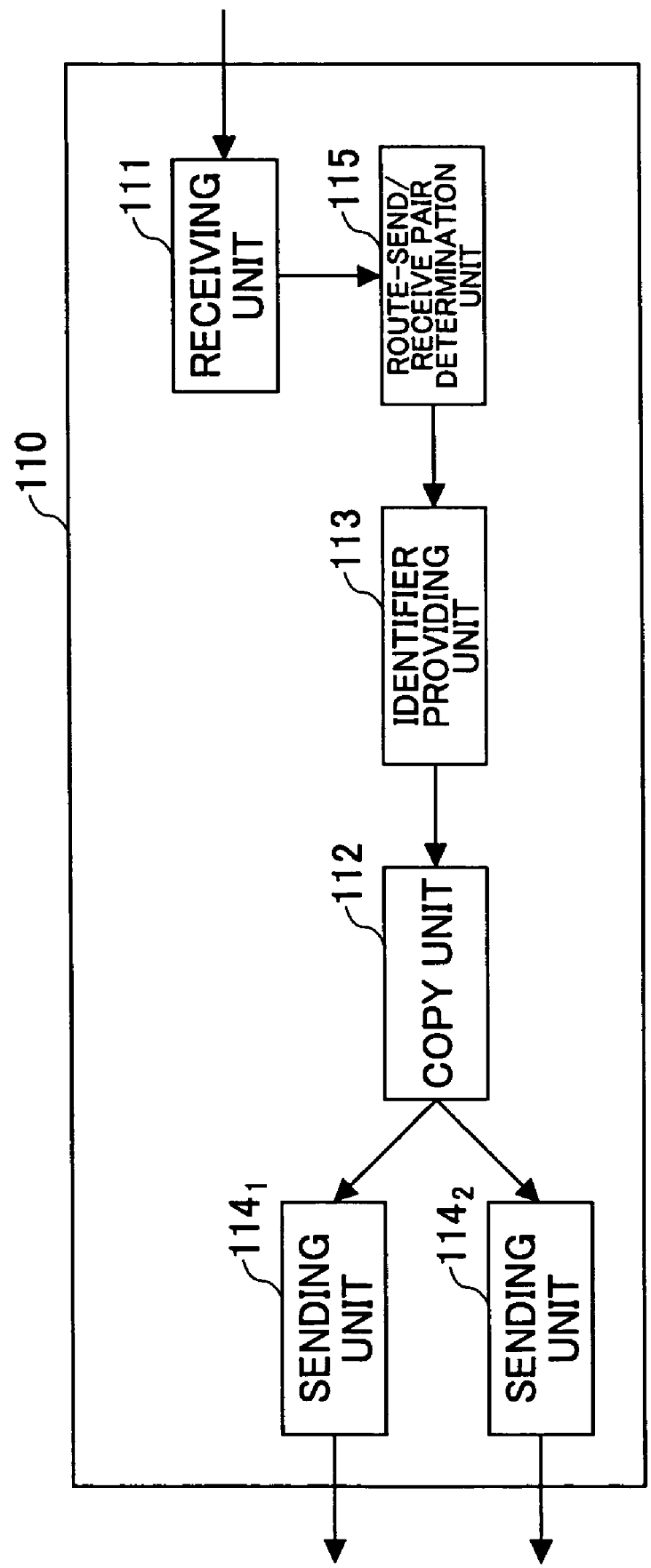
FIG. 10 shows another example of a sending function unit of the packet transfer apparatus in the first embodiment of the present invention.

Examples of the region of the route identifier and the counter region are as shown in FIGS. 4-7. A sequence number (sequence identifier) is written into the counter region. The packets generated by the identifier providing units $113_1$ and $113_2$ are sent to the wide area network by the sending units $114_1$ and $114_2$ respectively. The sending function unit 110 can be configured as one shown in FIG. 10. In this case, a packet to which an identifier and a counter value are provided by the identifier providing unit 113 is copied in the copy unit 112.

The receiving function unit 120 includes receiving units $121_1$ and $121_2$, a memory A $122_A$, a memory B $122_B$, identifier referring units $126_1$ and $126_2$, a control unit 127, selection units $123_1$ and $123_2$, a counter unit 124, and a sending unit 125. The selection units and the counter unit are provided for each sending source, and the selection units $123_1$ and $123_2$ and the counter unit 124 correspond to one source. In addition, when different plural route pairs are adopted for the same send/receive pair, the selection units $123_1$ and $123_2$ and the counter unit 124 can be provided for each route pair in the same source. This feature similarly applies to other embodiments.

The receiving function unit 120 receives packets of the A system and the B system from the wide area network 3 by the two receiving units $121_1$ and $121_2$. The received packet of the A system is stored in the memory A $122_A$, and the received packet of the B system is stored in the memory B $122_B$. In this embodiment, each of the memories A $122_A$ and B $122_B$ are used as a FIFO (First In First Out). Route identifies in data read from the memory A $122_A$ and the memory B $122_B$ are referred to in the identifier referring units $126_1$ and $126_2$ respectively, so that a source packet transfer apparatus is identified.

Then, based on control by the control unit 127, the packets are passed to the selection units $123_1$ and $123_2$ that correspond to the source of the packets, so that the selection units $123_1$ and $123_2$, and the counter unit 124 select a packet based on the sequence number. Then, the route identifier region and the counter region are deleted from the packet, and the packet is sent to the user network side by the packet sending unit 125.

Next, a process procedure by the counter unit 124 and the selection unit 123 is described. This process procedure similarly applies for FIGS. 8 and 9.

Figure 11:
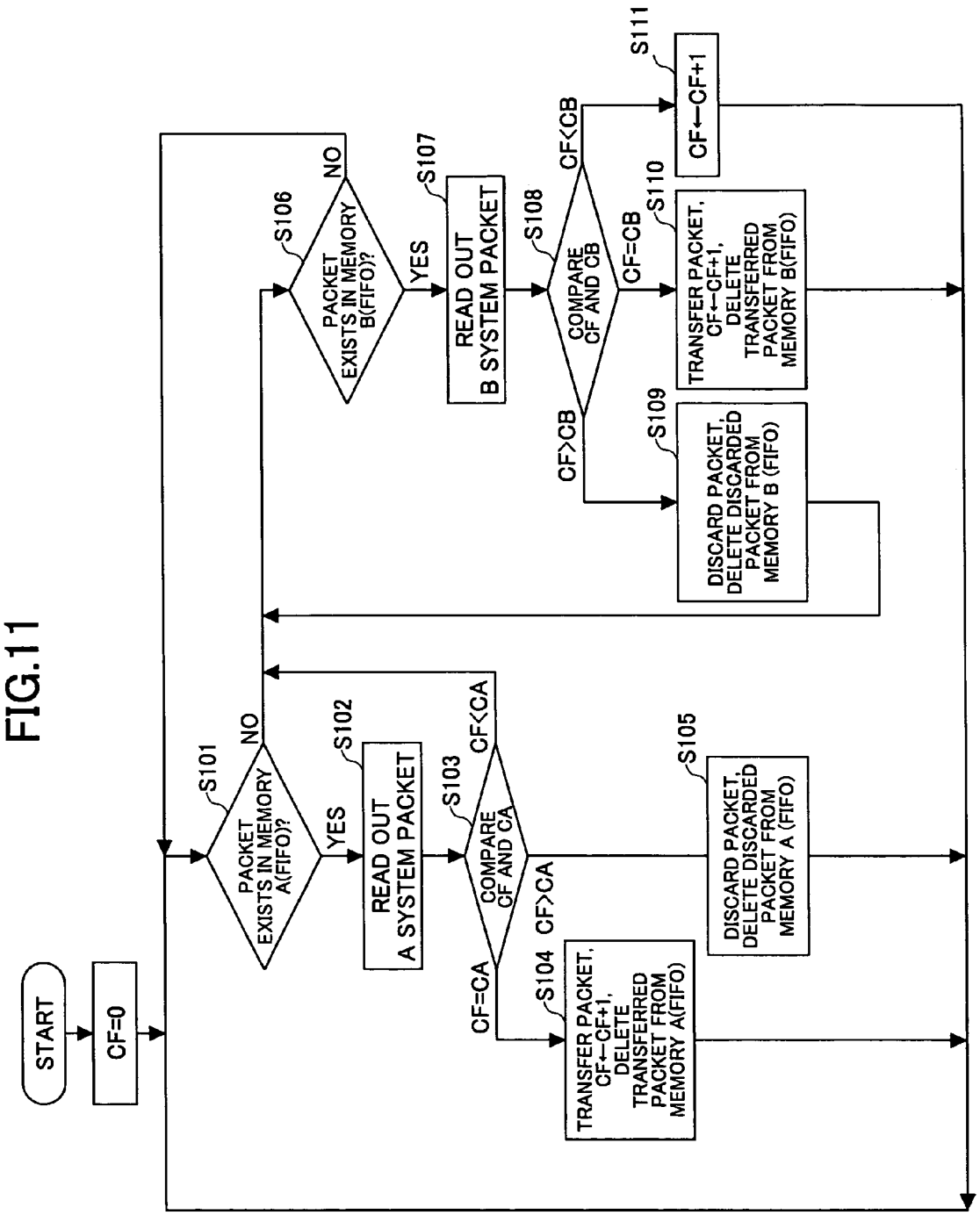
FIG. 11 is a flowchart (pat 1) showing a process procedure of the counter unit and the selection unit in the first embodiment of the present invention.

FIG. 11 is a flowchart showing the process procedure of the counter unit and the selection unit in the first embodiment of the present invention. The following procedure corresponds to one for one send/receive pair. In the configuration shown in FIG. 9, the following process is performed for each send/receive pair (for each source in the receiving function unit) by functions of the identifier referring unit and the control unit.

Each of the sending function unit 110 and the receiving function unit 120 includes two systems of the A system and the B system. Each receiving unit waits for arrival of a packet, and stores an arriving packet into a memory used as FIFO. When the packet exists in the memory A, the selection unit $123_1$ obtains the oldest packet in the FIFO (steps 10, 10), refers to a counter value of the packet, and substitutes the counter value into CA. Comparing CA with a reference counter CF that is managed by the counter unit (step 103), the procedure conditionally branches off to any one of three cases: CF=CA, CF>CA, and CF<CA. When CF=CA, the packet is transferred to the packet sending unit 125, and the state is changed to a packet waiting state (step 104). When CF>CA, the packet is discarded, and the state is changed to the packet waiting state (step 105). When CF<CA, the state is changed to a B system packet waiting state (step 106).

When the packet exists in the B system, the selection unit $123_2$ obtains the oldest packet in the memory B $122_B$ used as the B system FIFO (step 107), refers to a counter value of the packet, and substitutes the counter value into CB. Comparing CF with CB (step 108), the procedure conditionally branches off according to a case among three cases: CF>CB, CF=CB and CF<CB. When CF>CB, the packet is discarded, and the state is changed to the B system packet waiting state (step 109). When CF=CB, the packet is transferred, and the state is changed to the A system packet waiting state after incrementing the value of CF by 1 (step 110). When CF<CB, the state is changed to the A system packet waiting state after incrementing the value of CF by 1 (step 111).

The route identifier region and the counter region are removed from the packet sent to the packet sending unit 125, so that the packet is transferred to the user network side.

According to the above-mentioned operation, it can be realized that packets having the same information are identified based on the sequence, and that one of the packets having the same information is transferred downstream following the sequence of the packet.

For carrying out the algorithm of this embodiment, if the condition of CF=CA continues, there is a possibility that the memory B $122_B$ of the B system may overflow. In such a case, several measures can be considered as follows.

(1) Configuring each FIFO of the memory A $122_A$ and the memory B $122_B$ as a circulating FIFO. In this configuration, the memory does not overflow, and an old packet is overwritten by a new packet.

(2) Deleting old data forcibly when the data amount exceeds a predetermined amount when writing into the FIFO of the memory A $122_A$ and the memory B $122_B$.

(3) Exchanging the role of A system and B system periodically to avoid overflow.

Figure 12:
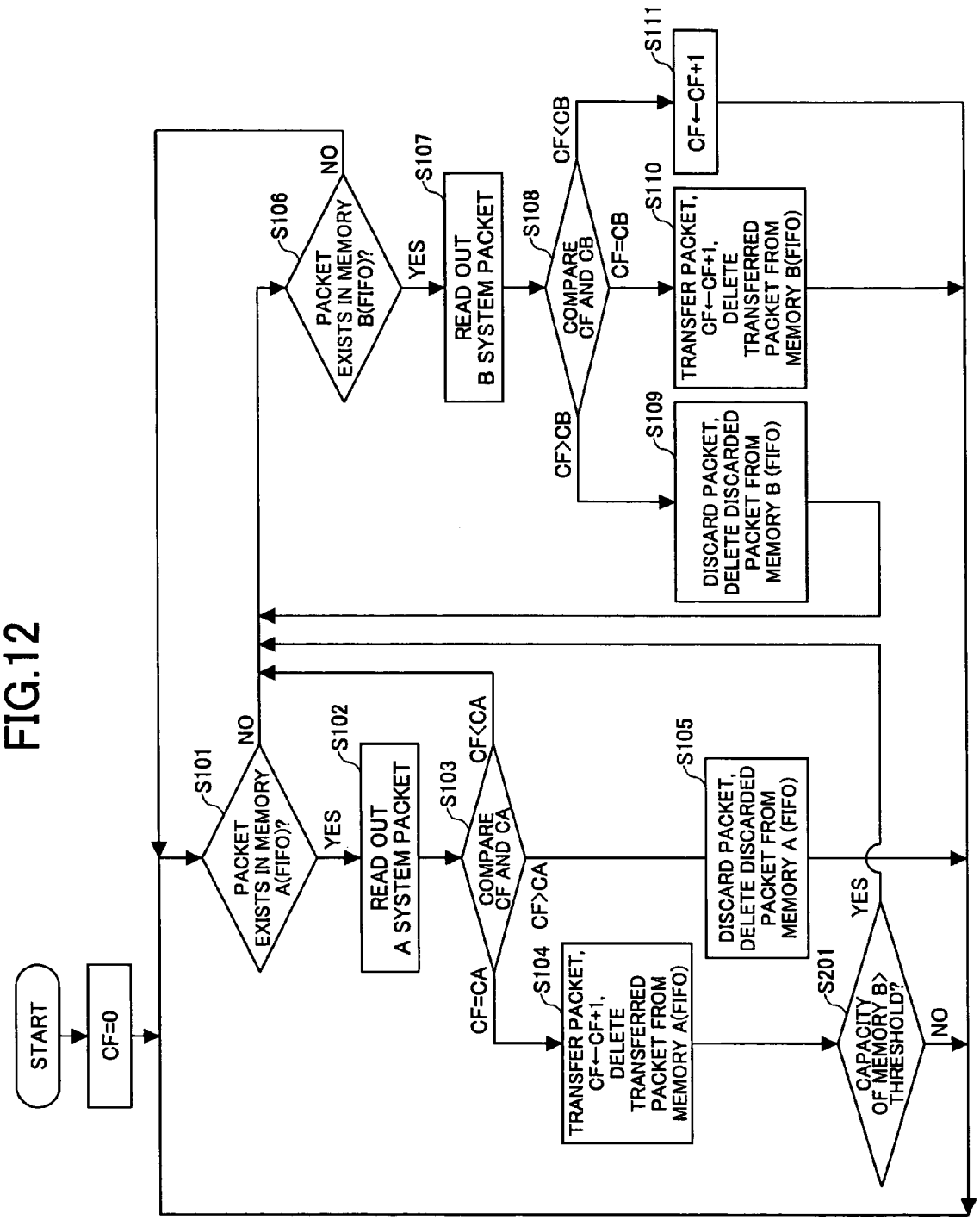
FIG. 12 is a flowchart (pat 2) showing a process procedure of the counter unit and the selection unit in the first embodiment of the present invention.

(4) Adding an algorithm. FIG. 12 shows the algorithm in which the measure against overflow of the B system memory $122_B$ is taken. Difference compared to FIG. 11 is as follows. After performing processing such as packet transfer when the condition CF=CA is satisfied, an used amount of the memory B $122_B$ is checked. If the amount exceeds a predetermined threshold, the state is changed to the B system packet waiting state (step 201). Other parts of the procedure are the same as those of FIG. 11.

Figure 13:
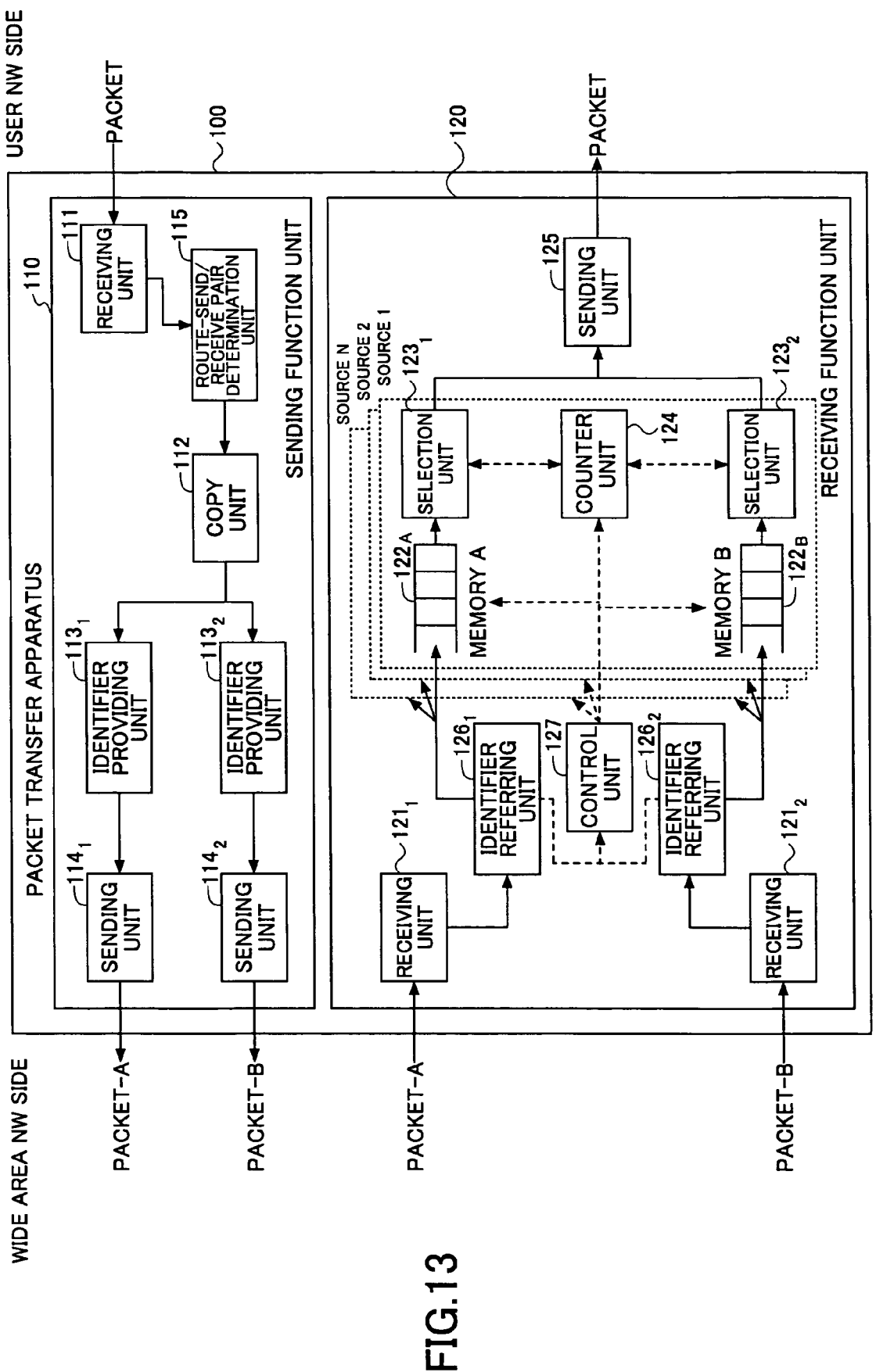
FIG. 13 shows another example of the packet transfer apparatus in the first embodiment of the present invention.

The packet transfer apparatus can be configured as one shown in FIG. 13. Between the configuration shown in FIG. 13 and the configuration shown in FIG. 9, the configuration of the receiving function unit 120 is different. In the configuration of FIG. 9, the route identifier of the packet read from the memory is referred to so that the packet is distributed to the selection unit and the counter unit for each send/receive pair. On the other hand, in the configuration of FIG. 13, the route identifier in the received packet is referred to first, then, the packet is stored in the memory for each send/receive pair. The operation of the configuration of FIG. 13 is the same as the operation shown in FIGS. 11 and 12 in view of each send/receive pair.

Second Embodiment

In this embodiment, an apparatus configuration shown in FIG. 8 or FIG. 13 in the first embodiment is used. However, although a FIFO or a circulating FIFO is used for the memory A $122_A$ and the memory B $122_B$ in the first embodiment, a circulating hash is used in this embodiment.

Figure 14:
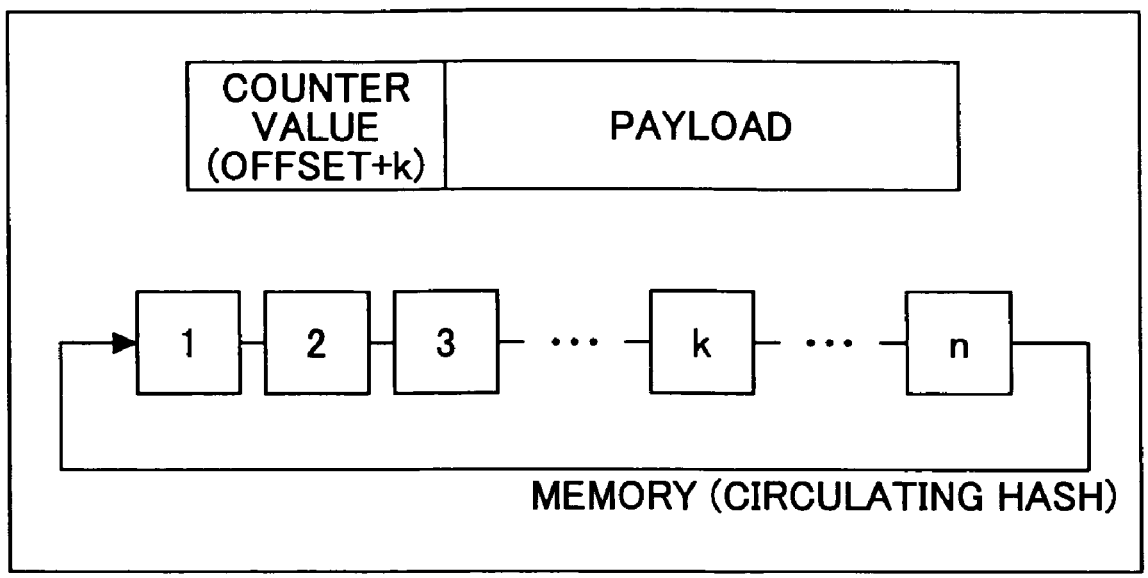
FIG. 14 is a figure for explaining a case when using a circulating hash as the memory in the second embodiment of the present invention.

FIG. 14 is a figure for explaining a case when using the circulating hash as the memory in the second embodiment of the present invention.

In the circulating hash, a given memory region is divided into n (an integer), and 1~n are provided as addresses. As to a packet sent from the wide area network, the counter value is referred to, and the packet is stored in a memory region whose address is a remainder of the counter value when divided by n. For storing the packet, as long as the packet includes the data (payload) region in the L2 header, the route identifier region, the counter region, and the data (payload) region, the whole parts of the packet may be stored or some parts of them may be selected to be stored. For information in the memory A $122_A$ and the memory B $122_B$ configured in the above-mentioned way, the counter unit and the selection unit operate according to a process procedure shown in FIG. 15.

Figure 15:
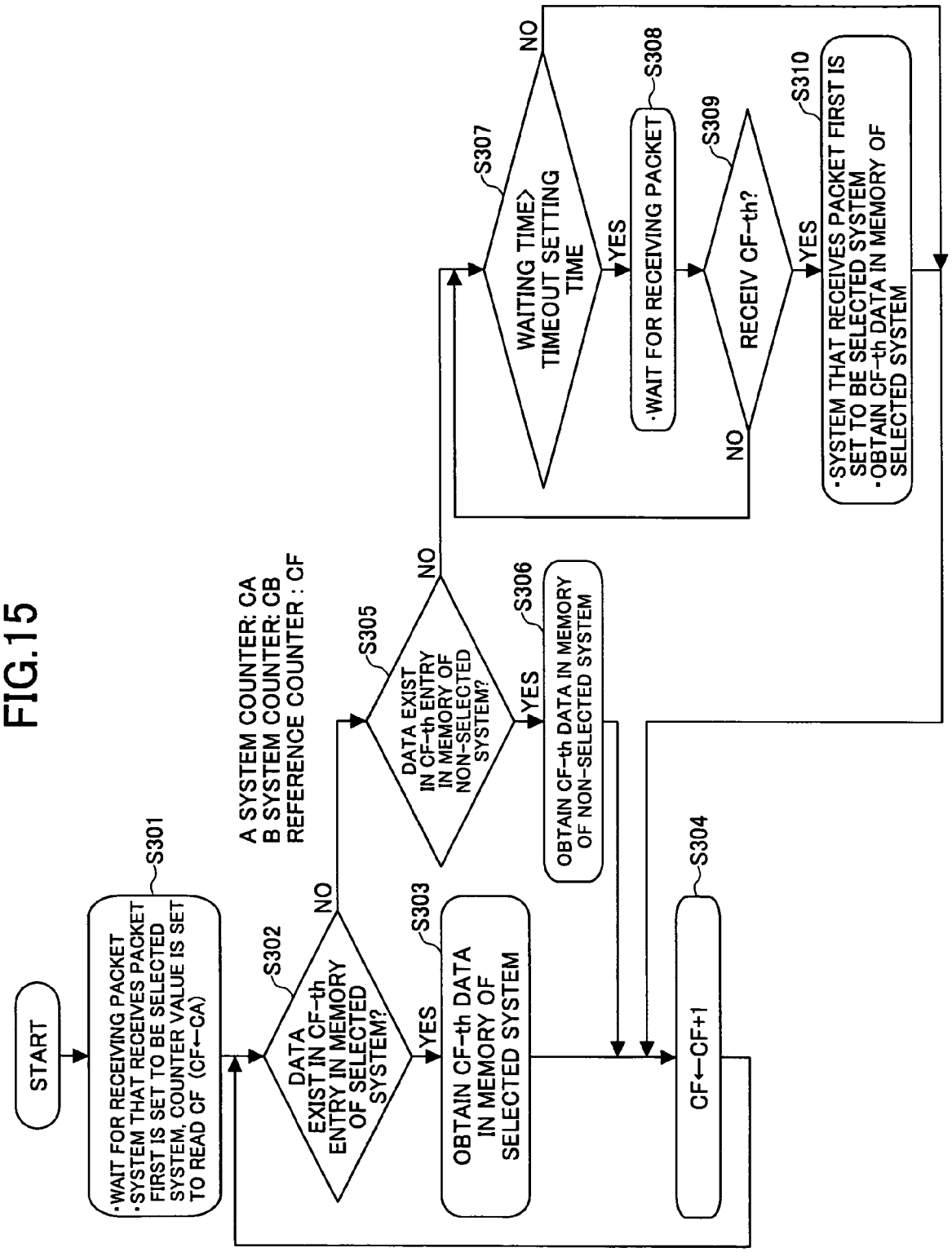
FIG. 15 is a flowchart showing a process procedure of the counter unit and the selection unit in the second embodiment of the present invention.

FIG. 15 shows a flowchart of the process procedure of the counter unit and the selection unit in the second embodiment of the present invention. The following process corresponds to one for one send/receive pair. That is, by functions of the identifier referring unit and the control unit, following processes are performed for each send/receive pair (for each source in the receiving function unit).

The receiving function unit 120 includes two systems of the A system and the B system. A system that mainly receives packets is called a selected system, and a standby system is called a non-selected system. For example, when packets from the A system are mainly transferred, the A system is called the selected system, and the B system is called the non-selected system. Assignment of the selected system/the non-selected system is not fixed, but they may be exchanged according to conditions. When packet processing starts, both of the A system and the B system enter a packet waiting state. In this state, a system that receives a packet first is regarded as the selected system. At this time, a counter value that is read is set into CF (step 301). In the following, it is assumed that the A system is the selected system.

Next, the main process procedure starts.

The procedure conditionally branches off to one of two branches according to presence or absence of data in a location corresponding to an address of CF in the memory A $122_A$ of the selected system (step 302).

(1) When the data exists, data of the address of CF is obtained from the memory A $122_A$, and the data is transferred to perform send processing (step 303). After that, CF is incremented by 1 (step 304), and presence or absence of data in the location corresponding to the address of CF in the memory A $122_A$ of the selected system is checked again.

(2) When the data does not exist, it is checked whether data exists in an address of CF in the memory B $122_B$ of the non-selected system (step 305), and the branch is further divided into two according to presence or absence of the data in the memory B $122_B$ of the non-selected system.

(2-1) When the data exists, the data existing at the address of CF in the memory B $122_B$ of the non-selected system is obtained and the data is sent (step 306). After that, CF is incremented by 1 (step 304), and presence or absence of data in the memory A $122_A$ of the selected system is checked again.

(2-2) When the data does not exist in step 305, timeout waiting is performed (steps 307, 308). When CF-th data arrives before timeout (step 309), the send processing of (2-1) is performed, and the names of the selected system and the non-selected system are exchanged (step 310). When the timeout occurs, sending is given up, and CF is incremented by 1 (step 304), and the state is changed to packet processing state in the selected system.

By using the circulating hash, the packet is stored in a memory region at an address that is a reminder of the counter value when divided by n. Even when a frame having N as the counter value arrives faster than a frame having N-n as the counter value, the reversal of the arriving sequence within n-th can be corrected to a correct sequence when reading the packet from the circulating hash by considering the counter value and by reading the packet in the order of the counter value.

Third Embodiment

Figure 16:
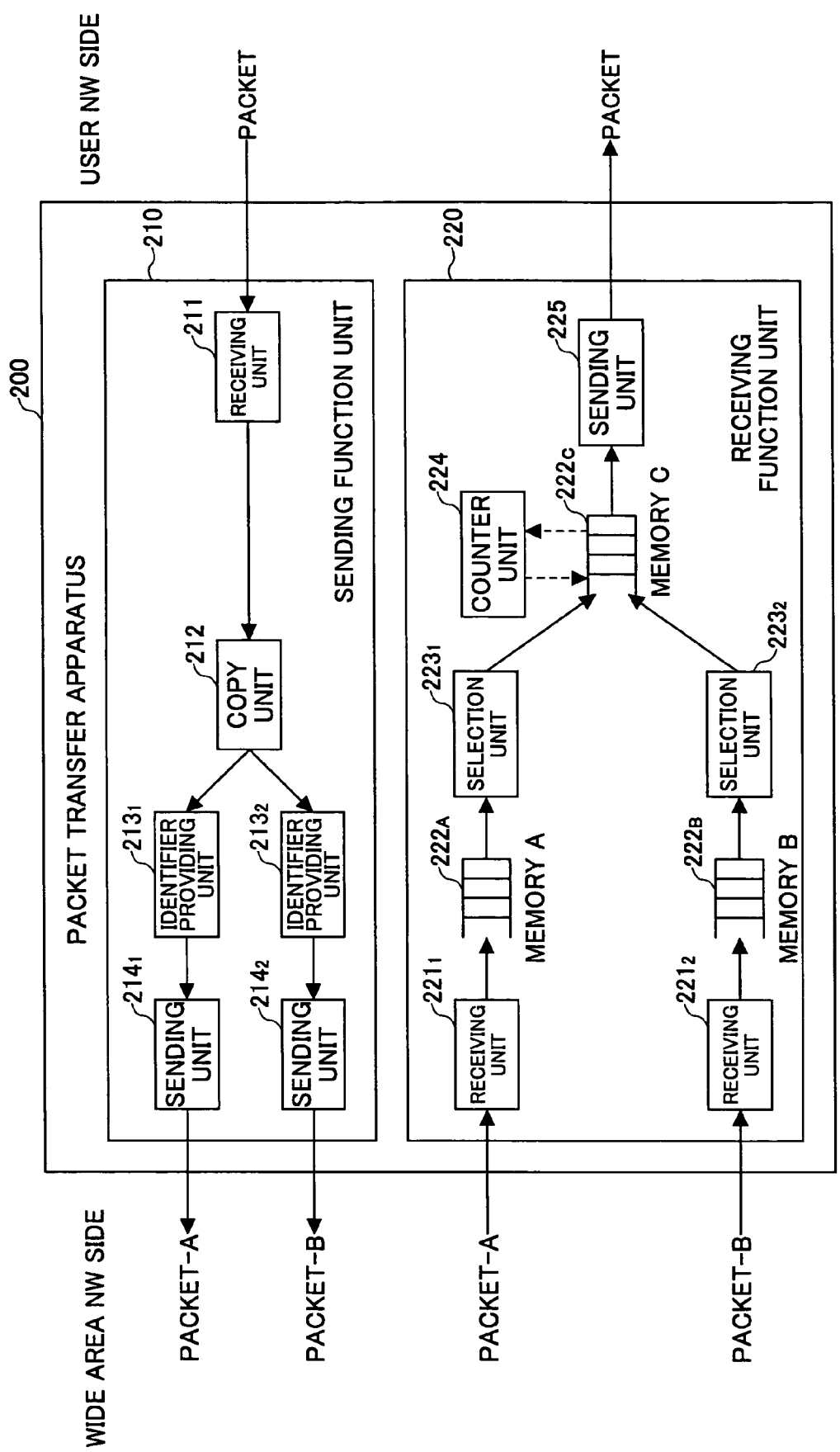
FIG. 16 is a block diagram of a packet transfer apparatus in a third embodiment of the present invention.

FIG. 16 is a figure showing a configuration of a packet transfer apparatus in the third embodiment of the present invention.

The packet transfer apparatus 200 shown in the figure includes a sending function unit 210 and a receiving function unit 220.

The sending function unit 210 includes a receiving unit 211, a copy unit 212, encoding units $213_1$ and $213_2$, and sending units $214_1$ and $214_2$. The configuration is the same as one of the first embodiment shown in FIG. 8.

The receiving function unit 220 includes receiving units $221_1$ and $221_2$, a memory A $222_A$, a memory B $222_B$, selection units $223_1$ and $223_2$, a counter unit 224, and a sending unit 225. The receiving function unit 220 receives packets by the receiving units $221_1$ and $221_2$, and writes each packet into the memory A $222_A$ or the memory B $222_B$. Each of the memory A $222_A$ and the memory B $222_B$ is used as FIFO.

The selection units $223_1$ and $223_2$ read data from the memory A $222_A$ and the memory B $222_B$, and transfer the data to a shared memory C $222_C$ according to an after-mentioned procedure.

The shared memory C $222_C$ forms a circulating hash shown in FIG. 14. Data is read under control of the counter unit 224 and is transferred to the user network by the sending unit 225.

Figure 17:
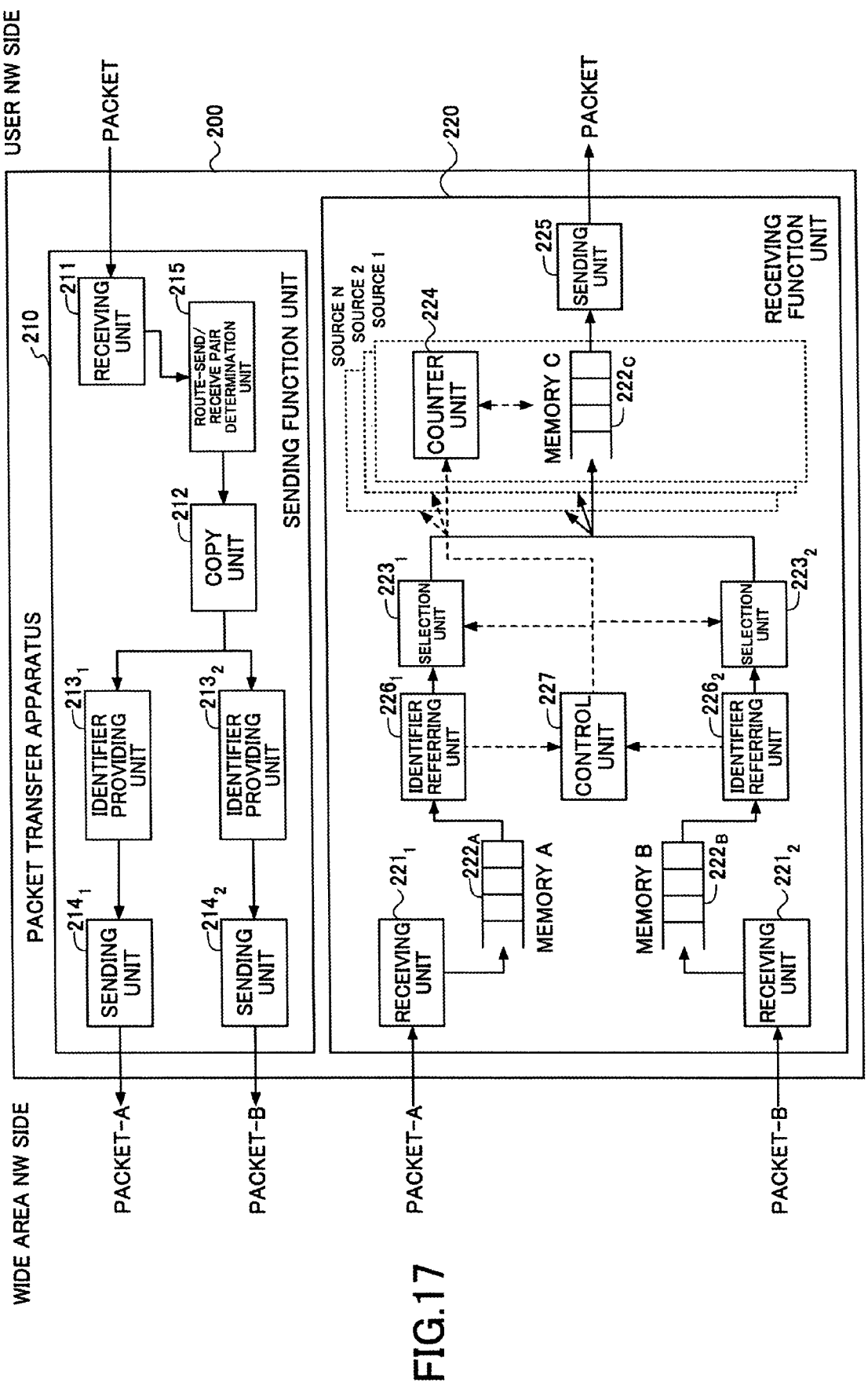
FIG. 17 is a block diagram of a packet transfer apparatus in the third embodiment of the present invention.

FIG. 17 shows another example of the packet transfer apparatus 200 in this embodiment. The example shown in FIG. 17 corresponds to a case in which there are a plurality of sending side packet transfer apparatuses and a destination side packet transfer apparatuses, and a send/receive pair is identified.

The packet transfer apparatus 200 shown in the figure includes a sending function unit 210 and a receiving function unit 220.

The sending function unit 210 includes a packet receiving unit 211, a route-send/receive pair determination unit 215, a copy unit 212, identifier providing units $213_1$ and $213_2$, and sending units $214_1$ and $214_2$. The configuration is the same as one of the first embodiment shown in FIG. 9.

The receiving function unit 220 includes packet receiving units $221_1$ and $221_2$, a memory A $222_A$, a memory B $222_B$, a shared memory C $222_C$, identifier referring units $226_1$ and $226_2$, a control unit 227, selection units $223_1$ and $223_2$, a counter unit 224, and a sending unit 225. The counter unit and the shared memory C are provided for each source, and the counter unit 224 and the shared memory C $222_C$ corresponds to one of the sources.

The receiving function unit 220 receives packets by the receiving units $221_1$ and $221_2$, and writes each packet into the memory A $222_A$ or the memory B $222_B$. Each of the memory A $222_A$ and the memory B $222_B$ is used as FIFO.

Each of the identifier referring units $226_1$, $226_2$ refers to the route identifier of a packet so as to identify a source of the packet. Then, based on control by the control unit 227, the selection unit $223_1$ or $223_2$ transfers data from the memory A $222_A$ or the memory B $222_B$ to the shared memory C corresponding to the source for each source identified by the identifier referring units $226_1$ and $226_2$ according to an after-mentioned procedure.

The shared memory C $222_C$ forms a circulating hash shown in FIG. 14. Data is read under control of the counter unit 224 and is transferred to the user network by the sending unit 225.

Figure 18:
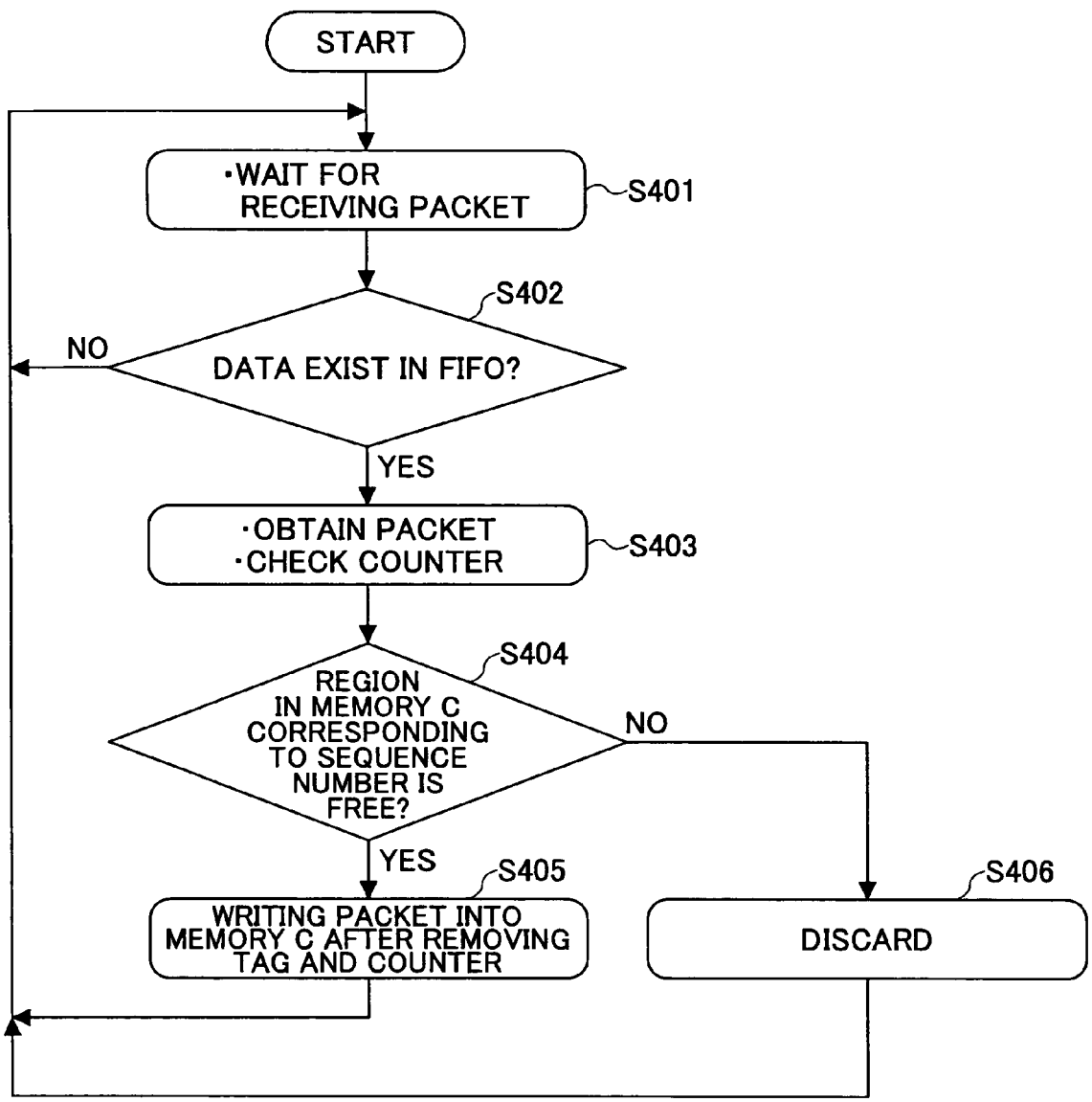
FIG. 18 is a flowchart showing the procedure for writing from the memory A, B to the shared memory C in the third embodiment of the present invention.

FIG. 18 is a flowchart showing the procedure for writing from the memory A, B to the shared memory C in the third embodiment of the present invention. In the following, although the procedure is described based on the configuration of FIG. 17, the same operation is performed also in the case of FIG. 16. The procedure shown in FIGS. 18 and 19 corresponds to one send/receive pair. That is, following processes are performed by the functions of the identifier referring unit and the control unit for each send/receive pair (for each source in the receiving function unit).

The identifier referring unit 226 and the selection unit 223 wait for receiving a packet (step 401). When data exists in the memory A $222_A$ or the memory B $222_B$ (step 402), the data is obtained, and a sequence number is read from the counter region of the packet (step 403). When a region in the memory C corresponding to the sequence number is not available (step 404, No), the packet is discarded (step 406). When the region is available, the packet from which the route identifier region and the counter region are removed is written in the corresponding region of the memory C $222_C$ (step 405), and the state is changed to packet waiting.

Figure 19:
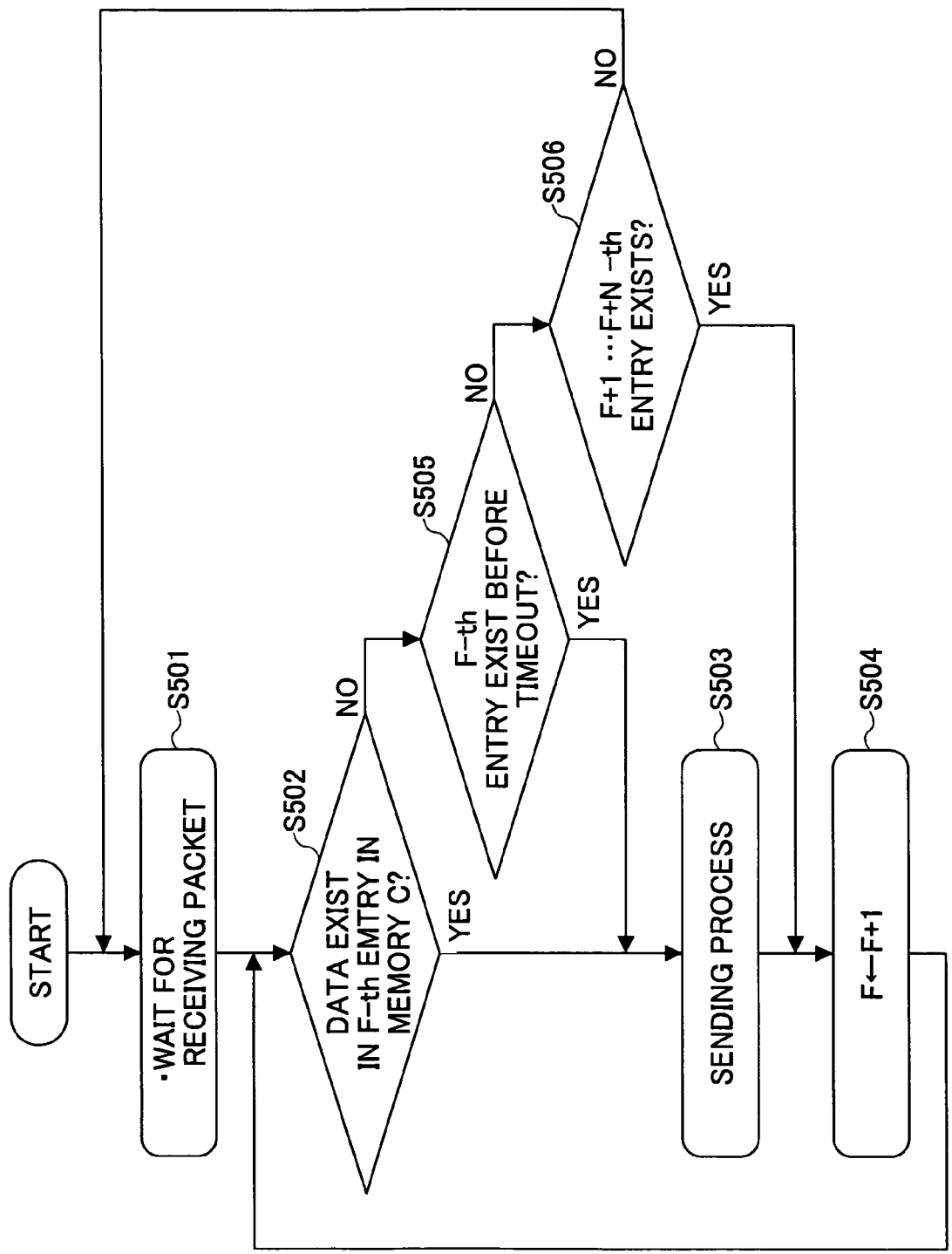
FIG. 19 is a flowchart showing a procedure for transferring data of the shard memory C in the third embodiment of the present invention.

FIG. 19 is a flowchart showing a procedure for transferring data of the shard memory C by the counter unit in the third embodiment of the present invention.

From the packet waiting state (step 501), it is checked whether there is data in a F (integer)-th entry in the memory C $222_C$ (step 502), and the procedure conditionally branches off to one of two branches according to presence or absence of data.

(1) When there is data, the data is transferred to the sending unit 225 (step 503), and F is incremented by 1 so as to return to the packet receiving state.

(2) When data does not exist, waiting for timeout is performed. Further, the procedure conditionally branches off to two (step 505).

(2-1) When F-th data arrives before timeout, the data is sent (step 503), and the value of F is incremented by 1 (step 504).

(2-2) When timeout occurs, it is checked whether any entry after F+1 exists (step 506). Conditional branching into one of two occurs according to presence or absence of data.

(2-2-1) When the entry exists, the value of F is incremented by 1 (step 504), and the state is changed to the packet waiting state.

(2-2-2) When the entry does not exist, the state is changed to the packet waiting state.

Fourth Embodiment

Next, a redundancy configuration in the fourth embodiment is described. In fourth-tenth embodiments, a case in which the packet transfer apparatus is applied on the Ethernet is described as an example. By the way, although the configuration of the sending side apparatus and the receiving side apparatus in the following description may be any one of the before-mentioned first-third embodiments, it is not necessary to identify the send/receive pair in this embodiment.

Figure 20:
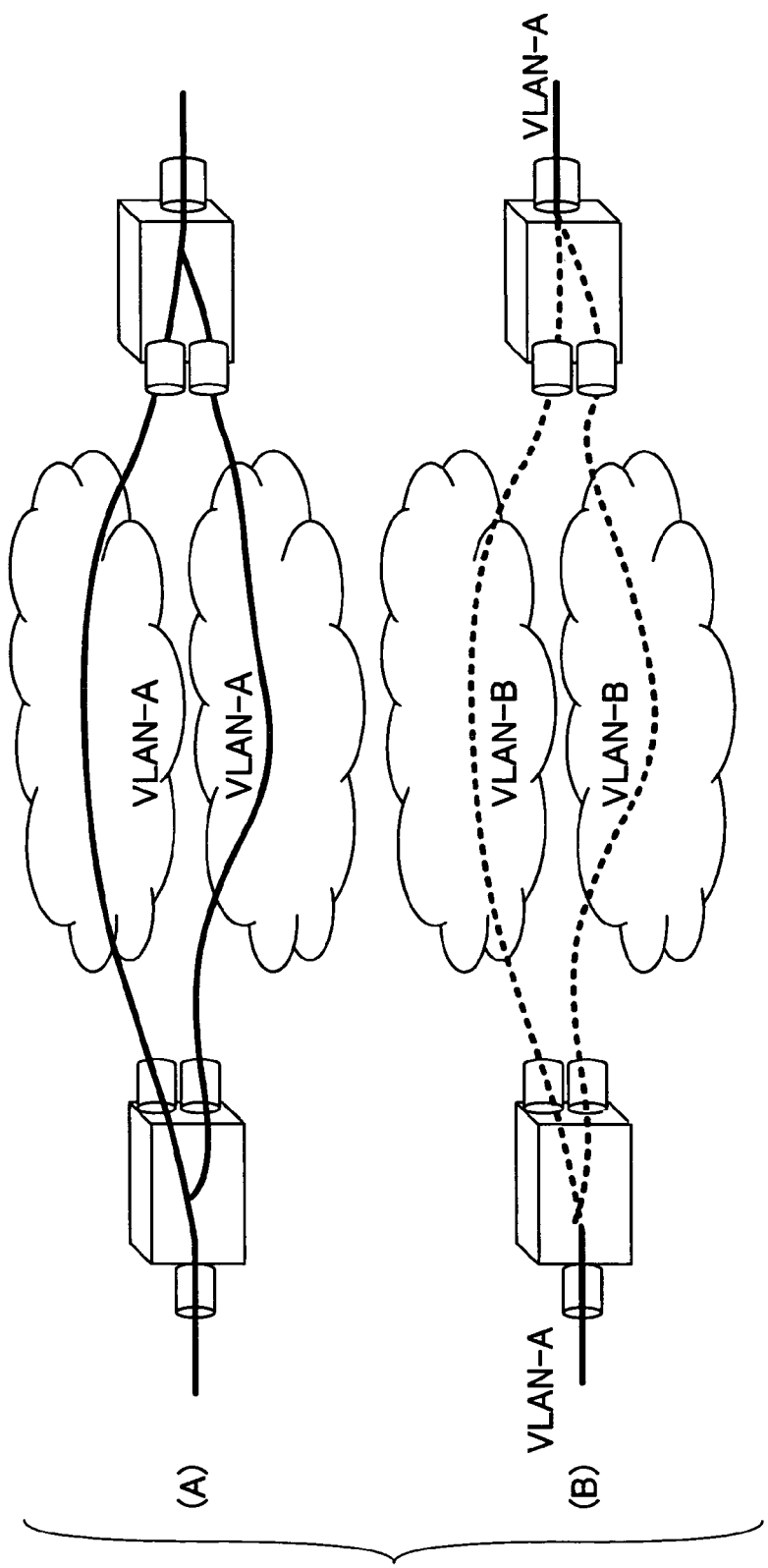
FIG. 20 is a figure showing a configuration for realizing redundancy for the Ethernet packet in a fourth embodiment of the present invention.

FIG. 20(A) shows a configuration for realizing redundancy for all Ethernet packets. The copy unit in the sending side apparatus generates two copies of a send packet. Then, the identifier providing unit newly provides a VLAN tag ("VLAN-A" in the figure) and a sequence number for identifying the same sending sequence to each copy, and the two copies are sent to different networks respectively from the sending units. The selection units in the receiving side apparatus select one that arrives first in the packets having the same sequence so as to send the selected packet downstream. When another packet arrives, the packet is discarded.

FIG. 20(B) shows a configuration for realizing redundancy by selecting an Ethernet packet having "VLAN-A" as VLAN setting. The sending side apparatus identifies the packet having VLAN-A as the VLAN setting, and the copy unit generates two copies of the packet. Then, the identifier providing units newly provide a VLAN tag ("VLAN-B" in the figure) and a sequence number for identifying the same sending sequence to each packet, so that the packet sending units send two copies to different networks respectively.

Fifth Embodiment

Figure 21:
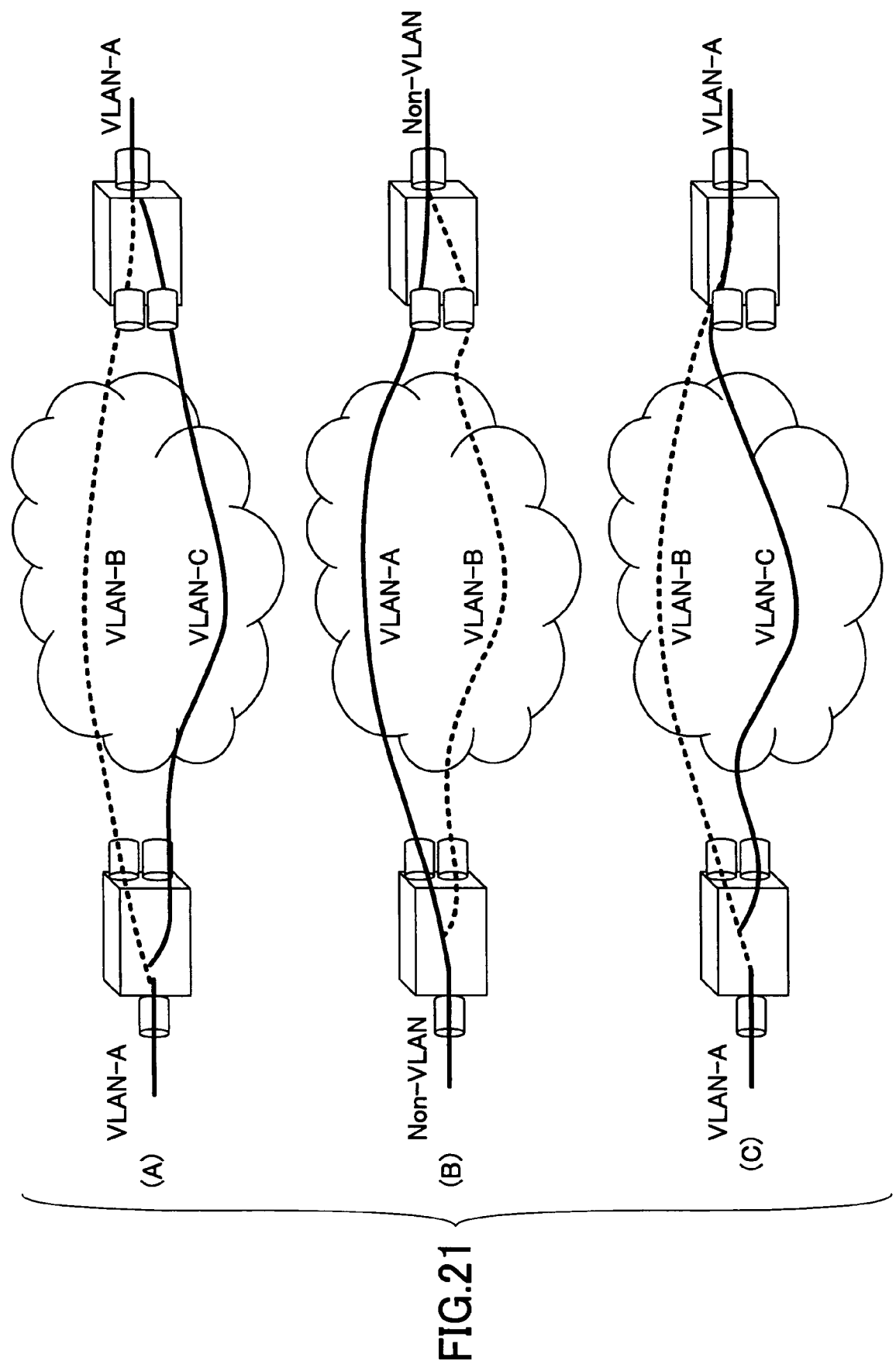
FIG. 21 is a figure showing a configuration for realizing redundancy for the Ethernet packet in a fifth embodiment of the present invention.

FIG. 21 shows a configuration for realizing redundancy for Ethernet packets in the fifth embodiment of the present invention. By the way, although the configurations of the sending side apparatus and the receiving side apparatus in the following description may be any one of the before-mentioned first-third embodiments, it is not necessary to identify the send/receive pair also in this embodiment.

FIG. 21(A) shows a configuration for realizing redundancy by selecting Ethernet packets having "VLAN-A" as the VLAN tag. In the sending side apparatus, the copy unit generates two copies of a send packet. Then, the identifier providing units provide different VLAN tags ("VLAN-B" and "VLAN-C" in the figure) and a sequence number for identifying the same sending sequence to the copies respectively, and the two copies are sent to different networks respectively from the sending units. In the receiving side apparatus, two ports (receiving units) are set so as to receive only packets of "VLAN-B" and packets of "VLAN-C" respectively. Routes on which the packet of "VLAN-B" and the packet of "VLAN-C" are transmitted in the wide area network can be different independent routes in which communications are not interrupted at the same time due to a single failure or construction.

FIG. 21(B) shows a configuration for realizing redundancy for all packets to which the VLAN tag is not provided. In the same way as the process mentioned above, in the sending side apparatus, the copy unit generates two copies of the packet, the identifier providing units newly provide different VLAN tags ("VLAN-A" and "VLAN-B" in the figure) and a sequence number for identifying the same sending sequence to the copies, so that the packet sending units send two copies to different networks respectively.

FIG. 21(C) shows a configuration for realizing redundancy by selecting packets having "VLAN-A" as the VLAN tag like the case shown in FIG. 21(A). In the sending side apparatus, different VLAN tags ("VLAN-B" and "VLAN-C" in the figure) are provided to the two copies respectively. In the receiving side apparatus, one port is set so as to receive both of "VLAN-B" and "VLAN-C". Thus, settings in the sending side apparatus and in the receiving side apparatus are not necessarily the same.

Sixth Embodiment

Figure 22:
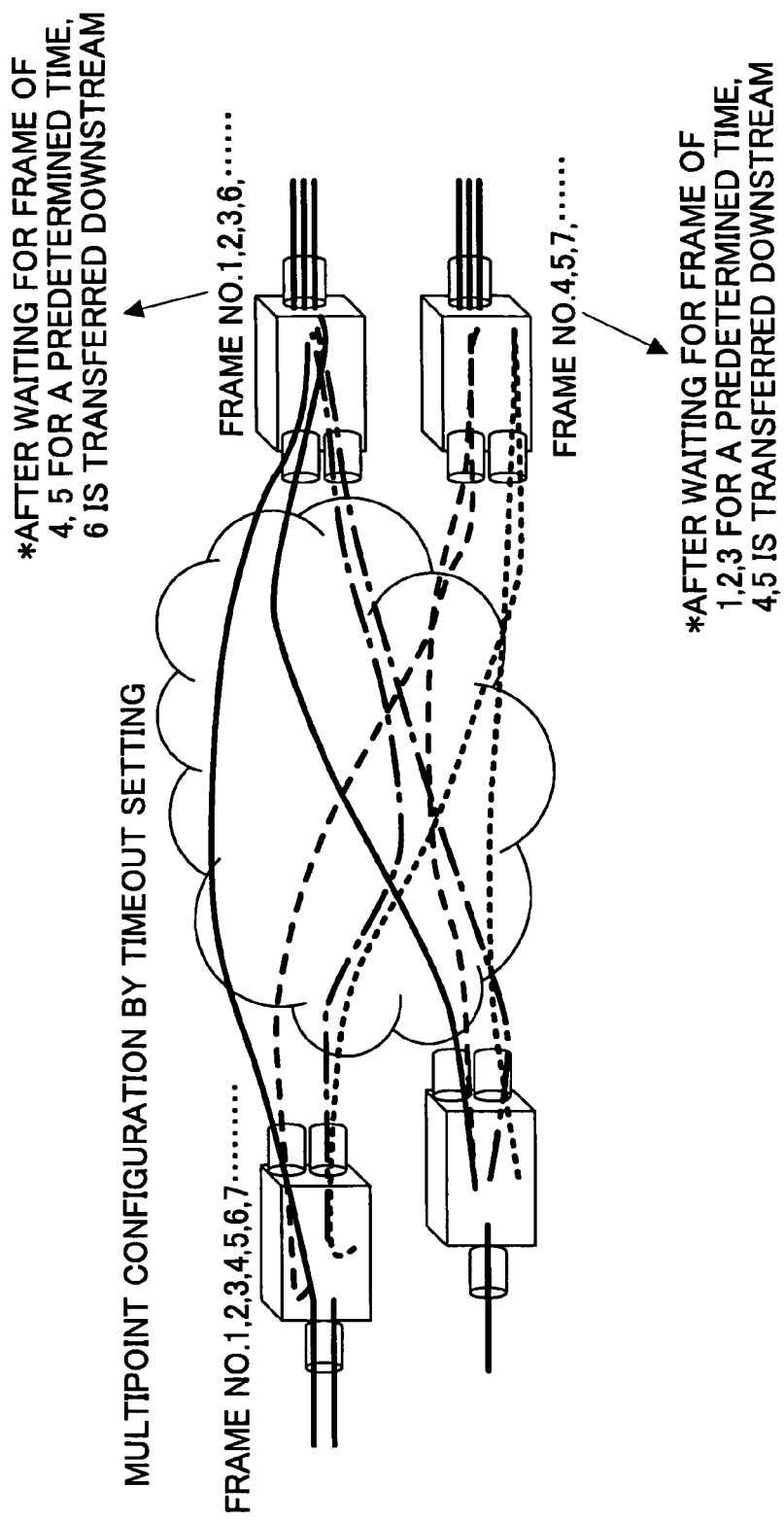
FIG. 22 is a figure for explaining realizing a multipoint configuration by setting timeout in the sixth embodiment of the present invention.

FIG. 22 is a figure for explaining realizing a multipoint configuration by setting timeout in the sixth embodiment of the present invention. By the way, the configurations of the sending apparatus and the receiving apparatus in the following description are configurations that can set timeout in the first-third embodiments.

In the configuration of the example of FIG. 22 in which a timeout function is used, a finite time is set for waiting for a packet of a sequence number in the receiving unit of the receiving side apparatus, and in the sending unit in the receiving side apparatus, when a predetermined time comes, a packet of a next sequence number is automatically sent downstream. In the case of this embodiment, a timer (not shown in the figure) for measuring the predetermined time is provided to the receiving unit and the sending unit in the receiving side apparatus.

Seventh Embodiment

Figure 23:
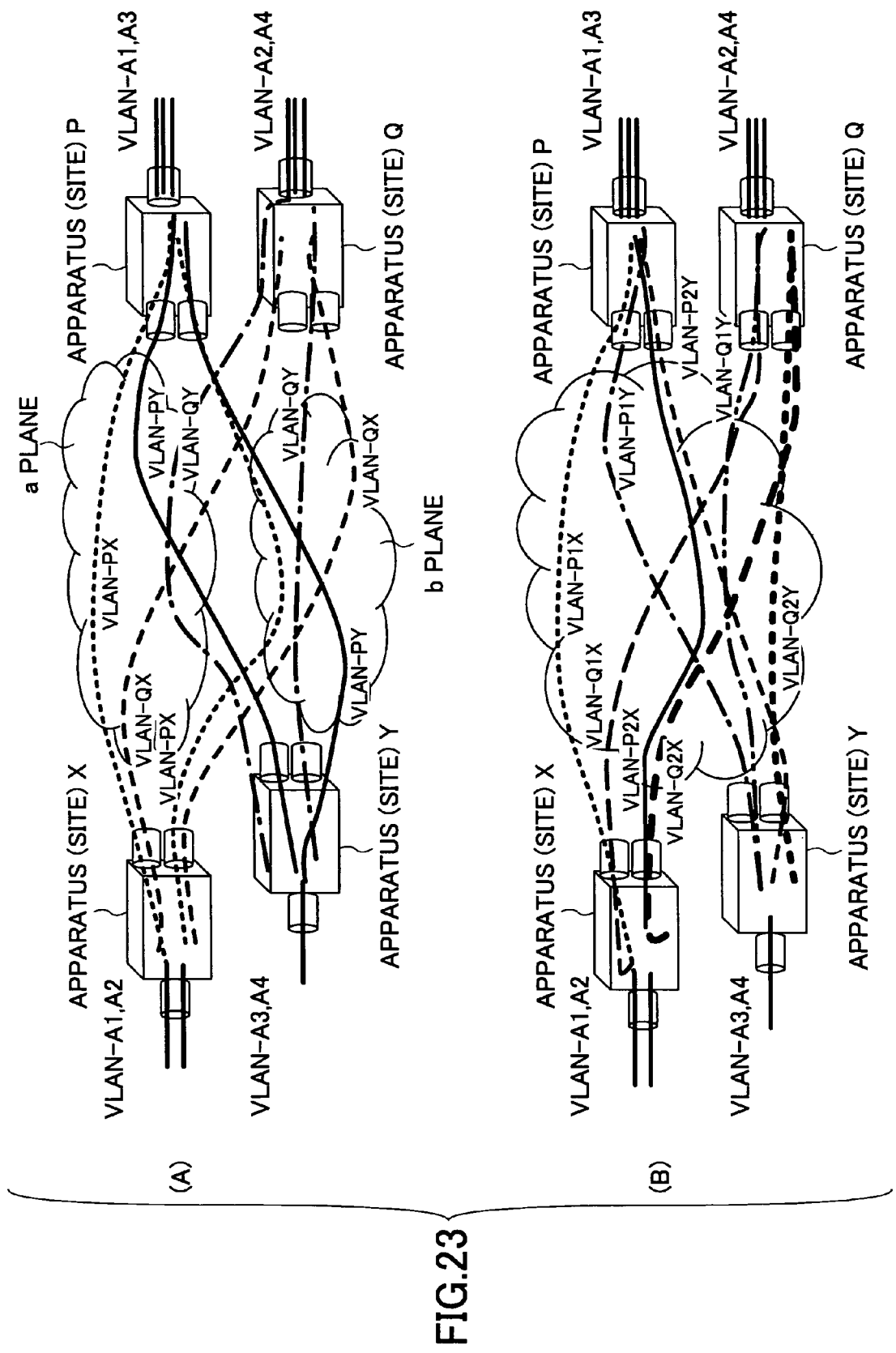
FIG. 23 is a figure showing a configuration for providing a VLAN tag in the seventh embodiment of the present invention.

FIG. 23 is a figure showing a configuration for providing a VLAN tag in the seventh embodiment of the present invention.

FIG. 23(A) shows a configuration for providing VLAN tags depending on send/receive pairs. The copy unit of the sending side apparatus copies the sending packet into two copies. When the identifier providing units provide the same sequence number, a VLAN tag depending on a send/receive pair to each of the two copies, and the sequence number is provided to each packet of the send/receive pair from 1, so that the two copies are sent from the packet sending units to separate networks respectively. The packet here corresponds to one in which a part depending on "LAN segment" is removed from the route identifier in (c) or (d) in FIG. 5. As shown in FIG. 23(A), for example, a packet sent from an apparatus X to an apparatus P is provided with "VLAN-PX" as the VLAN tag.

The selection units of the receiving side apparatus identify the VLAN tag of the packets received from the two networks, and identify packets having the same information and the sequence based on the sequence number for packets having a VLAN tag indicating the same source. Then, one is selected from among packets of the same sequence so that the selected packet is sent from the sending unit and another packet is discarded.

As to the VLAN tag, the identifier providing units newly provide the VLAN tag irrespective of whether an input packet includes a VLAN tag or not. Accordingly, the multipoint configuration can be realized.

By the way, the send/receive pair can be determined from the source and destination MAC addresses, VLAN setting and the like of the Ethernet packet to be transferred.

FIG. 23(B) shows a configuration for providing a VLAN tag depending on a send/receive pair and a sending route. The copy unit of the sending side apparatus copies the sending packet into two copies. When the identifier providing units provide the same sequence numbers, VLAN tags are provided such that the VLAN tags are different for the two redundant packets and the VLAN tags are unique for identifying each send/receive pair, then, the sequence number is provided to each packet from 1 for each send/receive apparatus pair. Accordingly, the routes of the two packets can be identified. The packet here corresponds to one in (c) or (d) of FIG. 5. As shown in FIG. 23(B), for example, packets sent from an apparatus X to an apparatus P are provided with "VLAN-P1X" and "VLAN-P2X" respectively as a VLAN tag.

In the receiving side apparatus, the identifier referring units identify each VLAN tag to identify packets having the VLAN tag indicating the same source, and identify packets having the same information and the sequence of them based on the sequence number. Accordingly, the multipoint configuration can be realized. For example, when there are a plurality of pairs of routes, packets that are sent from the same source and transmitted via the same route pair can be identified.

Figure 24:
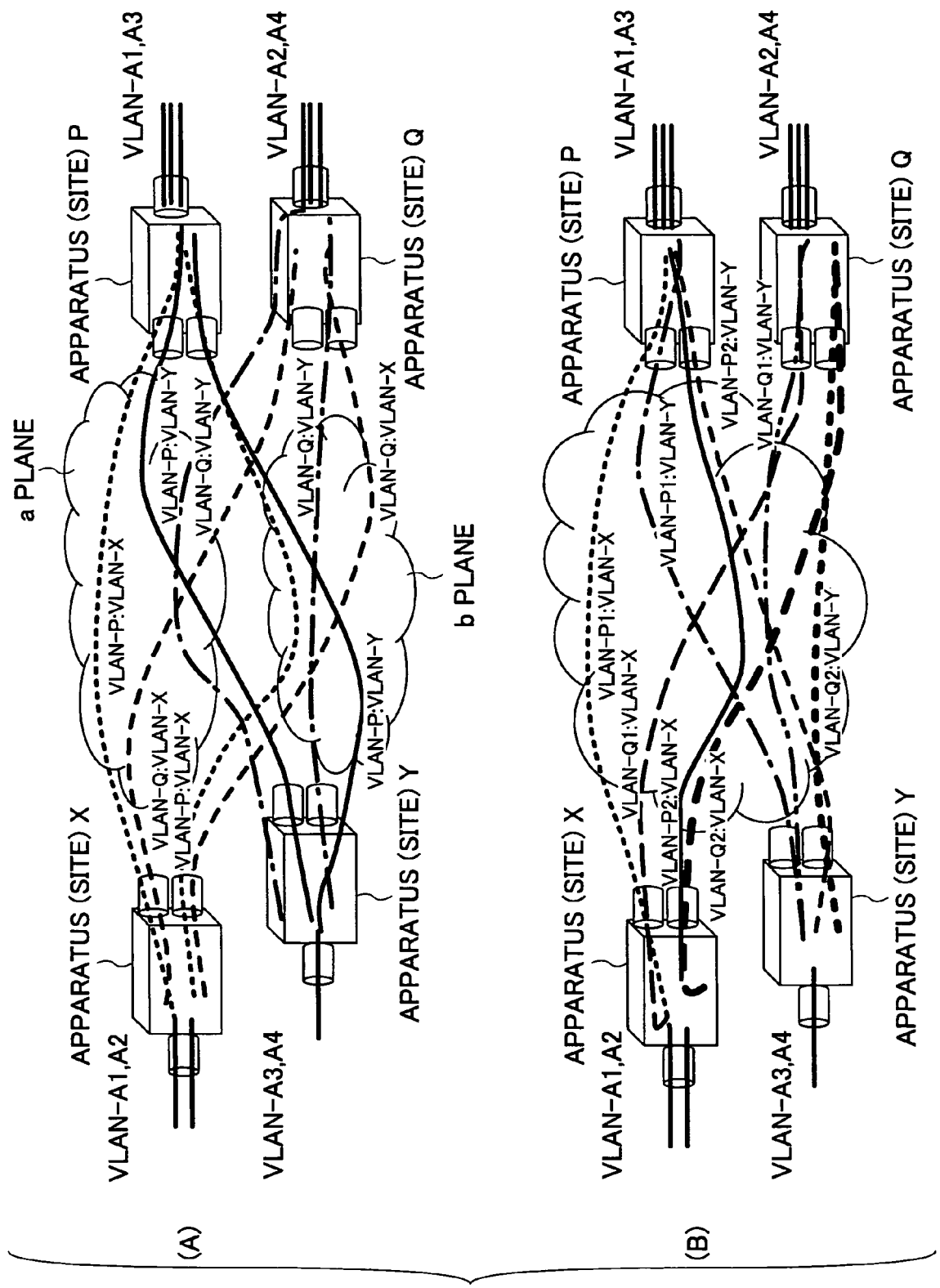
FIG. 24 is a figure for explaining providing a VLAN tag depending on a sending route and a VLAN tag depending on a source in a seventh embodiment of the present invention.

When providing the VLAN tag corresponding to a send/receive pair and a route, two VLAN tags corresponding to the send/receive pair and the route respectively can be provided. FIGS. 24(A) and (B) shows examples of the case. For example, in FIG. 24(A), VLAN-P and VLAN-X are provided in place of VLAN-PX shown in FIG. 23(A). In addition, in FIG. 24(B), VLAN-P1 and VLAN-X are provided in place of VLAN-P1X of FIG. 23(B).

Eighth Embodiment

Figure 25:
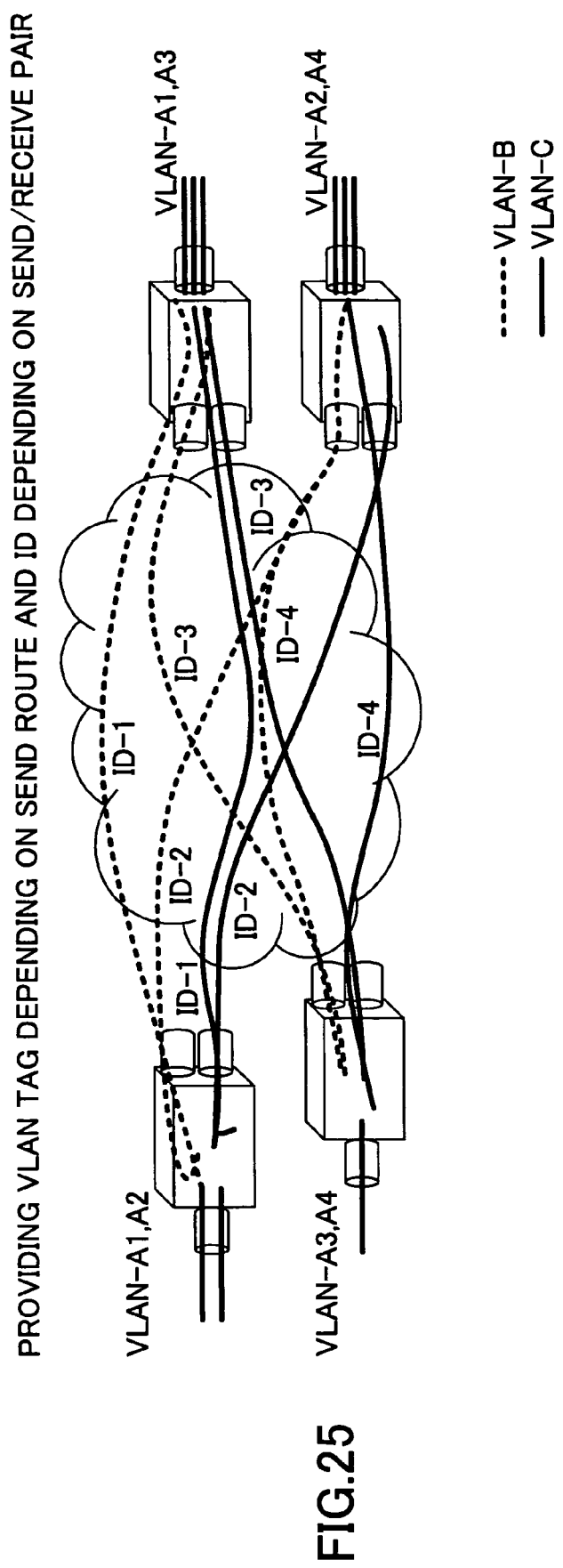
FIG. 25 is a figure for explaining providing a VLAN tag depending on a sending route and an ID depending on a send/receive pair in a eighth embodiment of the present invention.

FIG. 25 shows a figure for explaining the method for providing a VLAN tag depending on a sending route and an ID depending on a send/receive pair. The configuration of the sending side apparatus and the receiving side apparatus in the following description may be any of the before-mentioned first-third embodiments.

In the configuration of the example shown in the figure, a VLAN tag depending on the sending route is provided, and in addition to that, an identifying ID depending on the send/receive apparatuses pair is provided. The copy unit of the sending side apparatus copies the send packet into two copies. When the identifier providing units provide the same sequence numbers, the identifier providing units newly provide VLAN tags such that the VLAN tags depending on the sending routes are different for the two redundant packets, then, provide the sequence number and the ID that are different for each send/receive apparatus pair. The packet here almost corresponds to one in (c) or (d) of FIG. 7.

In the receiving side apparatus, the identifier referring units refer to the VLAN tag and the ID to identify packets sent from the same source via the same route pair, and identify packets having the same information and the sequence of them based on the sequence number. Then, one of the packets having the same sequence is sent from the sending unit and another packet is discarded.

Ninth Embodiment

Figure 26:
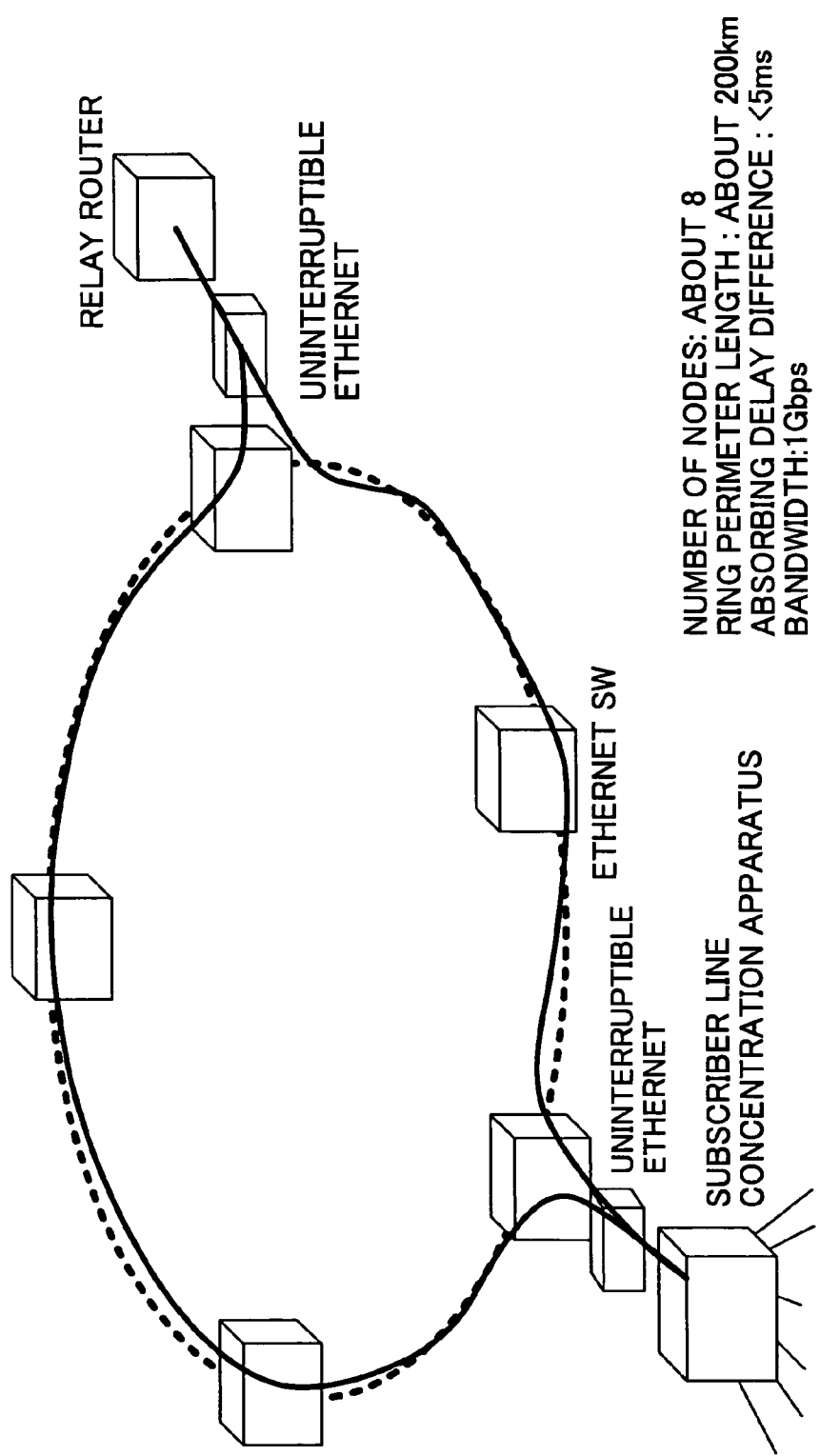
FIG. 26 is a figure showing an example of application to a network in a ninth embodiment of the present invention.

FIG. 26 is a figure showing an example of application to a network in the ninth embodiment of the present invention. In the figure, an example applied to a metro-loop is shown. In the figure, "uninterruptible Ethernet" corresponds to the above-mentioned packet transfer apparatus.

In the configuration shown in the figure, two packets that are generated by copying in the sending side apparatus are sent via routes in reverse directions respectively on the ring. For example, this example can be applied to a case where packets having the same VLAN tag are sent via different networks. The different networks in this embodiment are examples of networks that forms physically independent routes.

Tenth Embodiment

Figure 27:
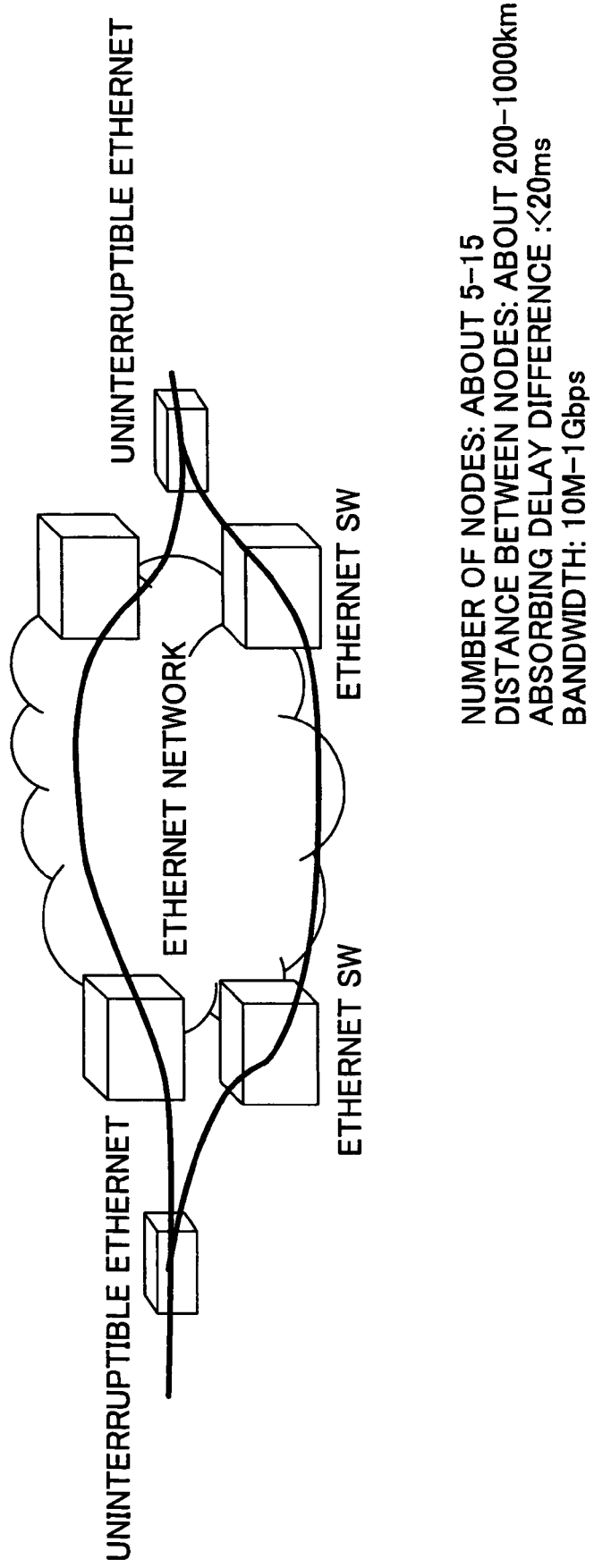
FIG. 27 is a figure showing an example of application to a network in a tenth embodiment of the present invention.

FIG. 27 is a figure showing an example of application to a network in the tenth embodiment of the present invention. In the figure, an example applied to an Ethernet private line is shown. In the figure, "uninterruptible Ethernet" corresponds to the above-mentioned packet transfer apparatus.

In the configuration shown in the figure, two packets that are generated by copying in the sending side apparatus are sent to different Ethernet private lines respectively. For example, this example can be applied to a case where packets having the same VLAN tag are sent via different networks. The different networks in this embodiment are examples of independent routes using private lines.

Eleventh Embodiment

Figure 28:
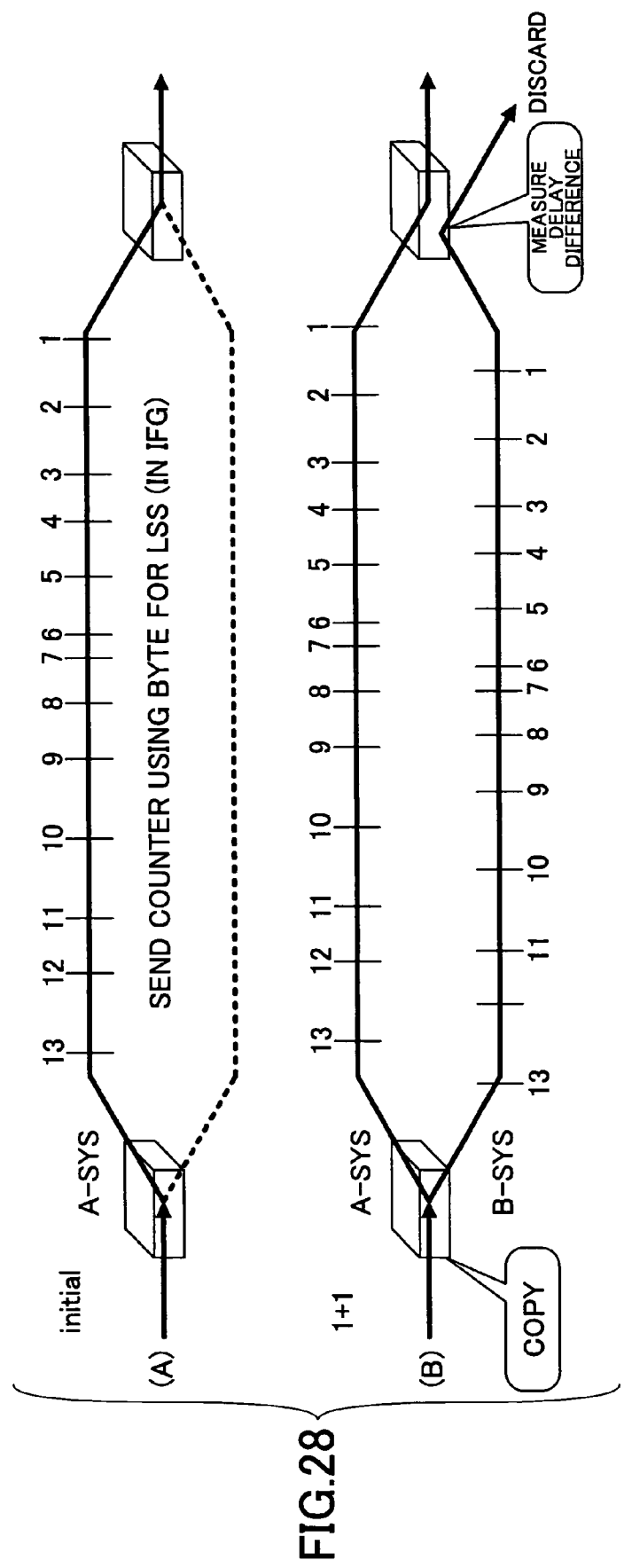
FIG. 28 is an example of planned uninterruptible switching using LSS in an eleventh embodiment of the present invention.

FIG. 28 shows an example of planned uninterruptible switching using LSS in the eleventh embodiment of the present invention. The figure shows an example in which the packet transfer apparatus performs planned uninterruptible switching using Link Signaling Sublayer (LSS) protocol. A counter is sent by preparing LSS byte in Inter Frame Gap (IFG) (FIG. 28(A)), and by measuring a counter delay difference between an active system and a standby system, one having greater delay is discarded. When arrival of the counter of the active system is delayed due to failure and the like, a packet of the standby system is selected (FIG. 28(B)).

Twelfth Embodiment

Figure 29:
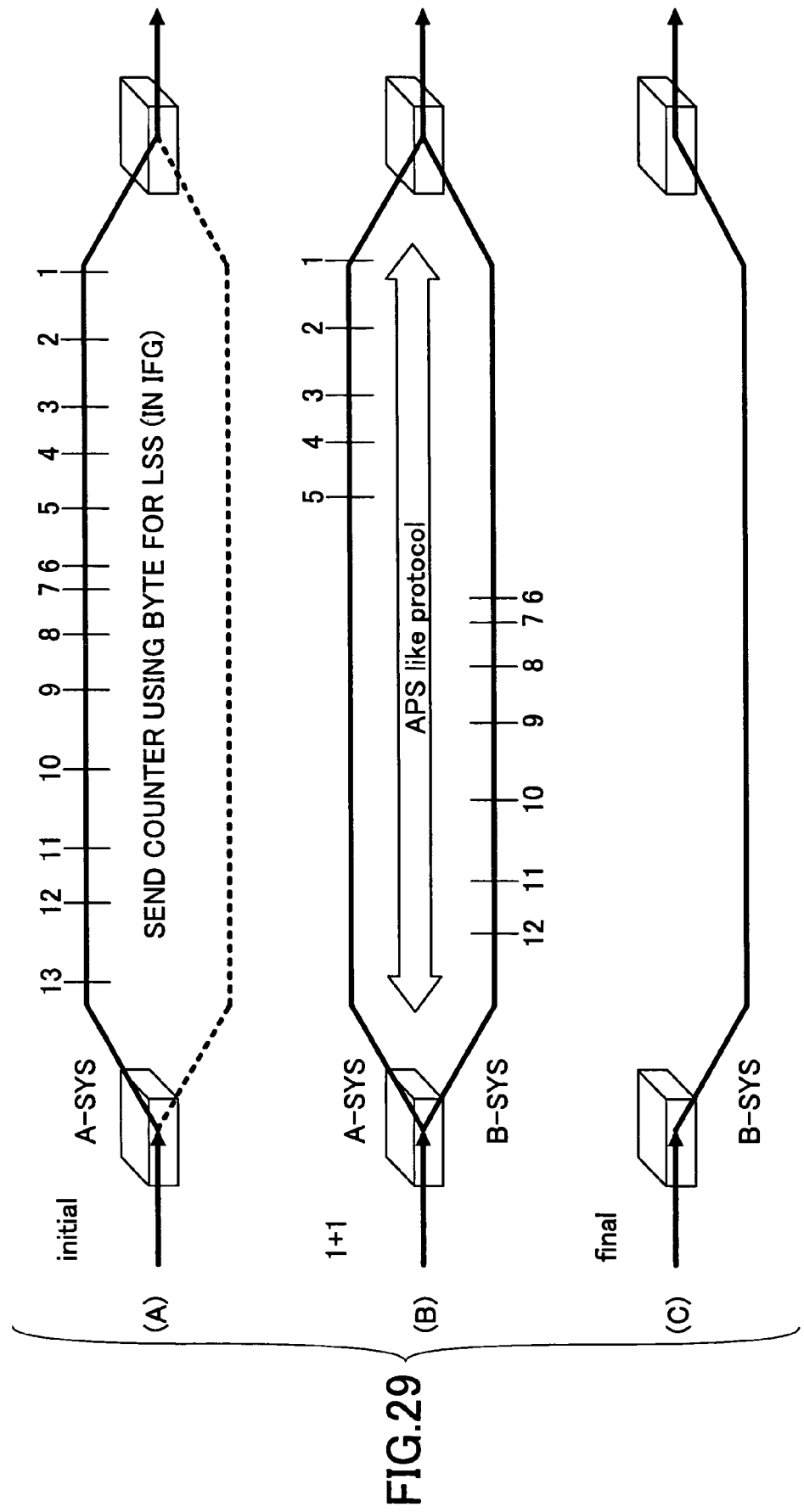
FIG. 29 is an example of planned uninterruptible switching using LSS in a twelfth embodiment of the present invention.

FIGS. 29(A)-(C) show examples of planned uninterruptible switching using LSS in the twelfth embodiment of the present invention. In the figure, the packet transfer apparatus performs switching between the active system and the standby system by sending an APS (Automatic Protection Switching)-like protocol inbound.

Thirteenth Embodiment

In this embodiment, a variable-length encapsulation technology is described.

As the variable-length encapsulation technology, an internet encapsulation protocol can be used, for example. For example, a method can be adopted in which a counter field is inserted between an encapsulation header and a datagram.

In addition, a GRE encapsulation technology can be used. In the GRE encapsulation technology, a method is adopted in which a sending header+GRE header is provided to an original datagram as the encapsulation header. For example, a method to insert the counter field between the GRE header and the datagram can be adopted.

In addition, an IPinIP tunneling technology can be used. The IPinIP tunneling technology uses a method for providing external IP header+tunneling header to an original datagram as the encapsulation header, and a method for inserting the counter field between the tunneling header and the datagram can be adopted.

In addition, encapsulation using PPP or HDLC can be used. For example, a method for inserting the counter field between a PPP header and a datagram can be adopted.

In addition, encapsulation by GFP can be used. For example, a method for inserting the counter field between an overhead and the datagram can be adopted.

In addition to them, any technology that enables stacking between a header (overhead) and a datagram in the encapsulation technology can be applied to the present invention.

The packet transfer apparatus of the present invention can be realized by loading a program, onto a computer used as the packet transfer apparatus, for causing the computer to execute operations of the sending function unit and the receiving function unit. The program can be distributed via a network.

In addition, the program can be installed into the computer, when it is executed, by storing the program into a disk apparatus connected to the packet transfer apparatus, or a portable storing medium such as a flexible disk, CD-ROM and the like.

Fourteenth Embodiment

Next, an embodiment is described in which a packet that requires high reliability and a packet that does not require it are identified by referring to information of a packet header, and transfer to plural routes is performed only for the packet that requires high reliability. The technology of this embodiment can be applied to a network of a user having various requirements for reliability.

In this embodiment, the sending side packet transfer apparatus refers to a part of the packet header of a packet so as to discriminate between the packet that requires high reliability and the packet that does not require it, and copies the packet that requires high reliability to send the copies to all independent routes. The packet that does not require high reliability is not copied and is sent to one of the independent routes. In the receiving side packet transfer apparatus, the receiving unit refers to the part of the packet header of a packet arriving from the independent route so as to determine whether the packet is a high reliability packet. For the high reliability packet, sameness of packets arriving from the plurality routes can be determined. When the same packets arrive from equal to or more than two routes, only one of the packets is transferred downstream and other ones are discarded. When the same packet arrives only from one route, the packet is transferred downstream.

Figure 30:
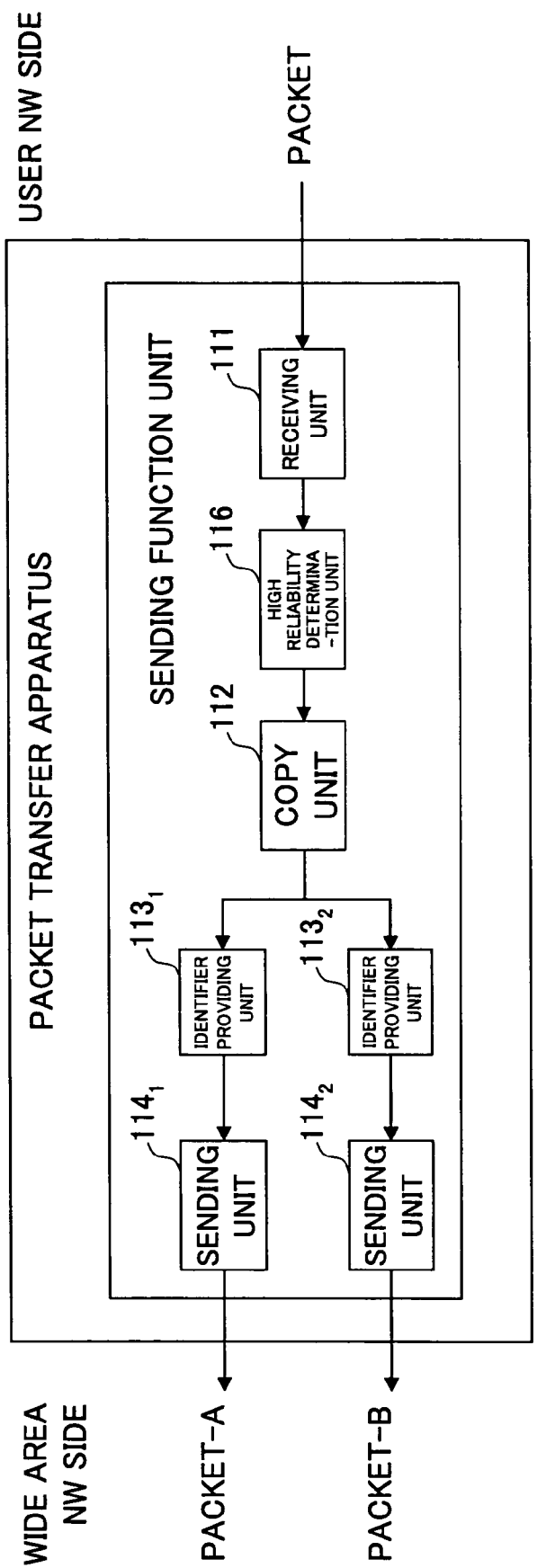
FIG. 30 is a block diagram of a sending function unit of the packet transfer apparatus in a fourteenth embodiment of the present invention.
Figure 31:
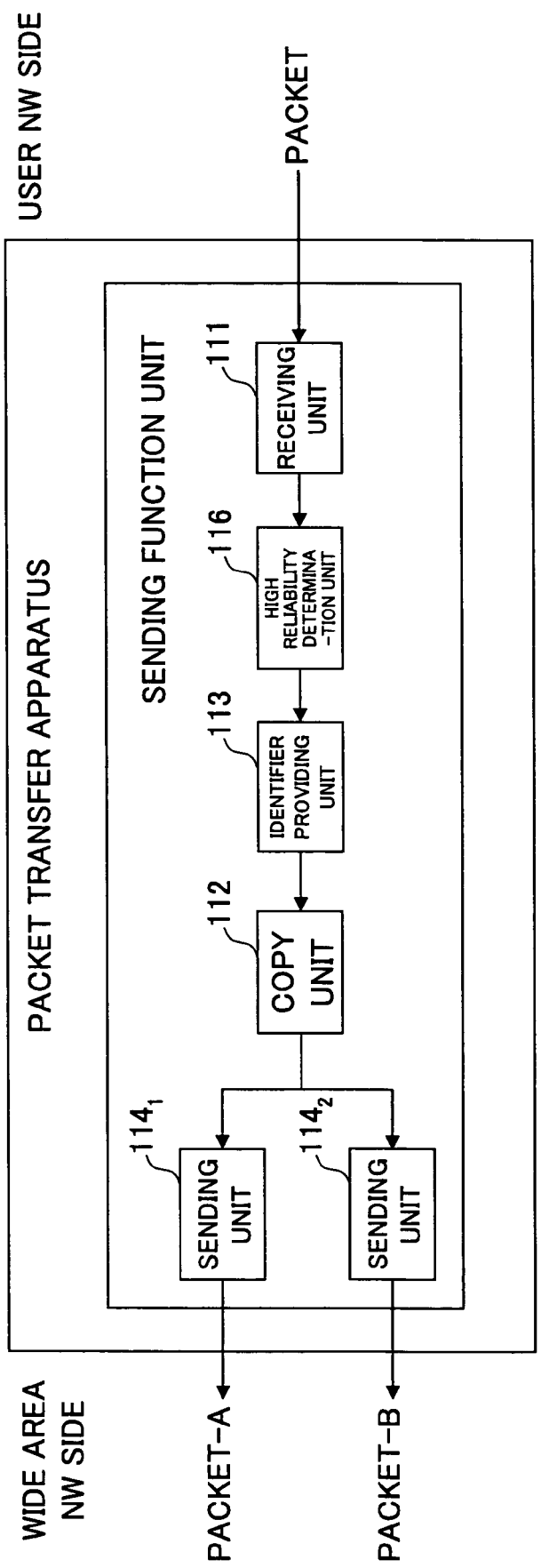
FIG. 31 is a block diagram of a sending function unit of the packet transfer apparatus in the fourteenth embodiment of the present invention.

A configuration example of the sending function unit of the packet transfer apparatus in this embodiment is shown in FIG. 30. This configuration is a configuration in which a high reliability determination unit 116 is provided between the receiving unit 111 and the copy unit 112 in the configuration shown in FIG. 8. In the configuration of FIG. 30, copying and identifier providing are performed for a packet that is determined to require high reliability in the high reliability determination unit 116. As to a packet that is determined not to require high reliability in the high reliability determination unit 116, copying and identifier providing are not performed, and the packet is sent from one of the sending unit 114₁ and sending unit 114₂. As shown in FIG. 31, a configuration may be adopted in which the high reliability packet is copied after adding the identifier. In addition, another configuration can be adopted, in which, after copying, it is determined whether the packets require high reliability or not, and when the packets are not high reliability packets, one of the copied packets is transferred.

The configuration that includes the high reliability determination unit in the sending function unit and that includes a function for determining whether packets are high reliability packets in the receiving unit in the receiving function unit can be applied to packet transfer apparatuses of other embodiments.

There are following methods for discriminating a packet that requires high reliability and a packet that does not require it in the high reliability determination unit 116, for example.

When the target packet is the Ethernet packet, the packet can be determined to be one that requires high reliability or not by using any one of a port number at which the packet arrives at a previous switch of the packet transfer apparatus, a Type value of layer 3 protocol in the packet header, a destination MAC address in a frame header, a source MAC address, a priority (CoS value) included in 802.1Q VLAN tag, VLAN-ID, a DiffServ code/point value (ToS value) included in an IP header, a destination port number of UDP or TCP, and a source port number of UDP or TCP.

When the target packet is one for MPLS, the packet can be determined to be one that requires high reliability or not by using any one of a destination MAC address, a source MAC address, or a CoS value (Exp value) of shim header.

Also in cases other than those above, as long as the target packet includes an IP address, the packet can be determined to be one that requires high reliability or not by using any one of a ToS value of the IP packet, a source IP address, and a destination IP address.

By the way, when providing the route identifier in the packet transfer apparatus in the sending side, a route identifier to which a priority of the user packet is reflected can be included. When a plurality of route identifiers are included, one or more of them may include the route identifier to which the priority of the user packet is reflected. More particularly, for example, when the VLAN tag or the shim header is used as the route identifier, the priority is reflected to the route identifier to be inserted, wherein the priority is a CoS value in the user provided VLAN tag, a CoS value (Exp value) in the user provided shim header, or a ToS value of the user IP header.

Figure 32:
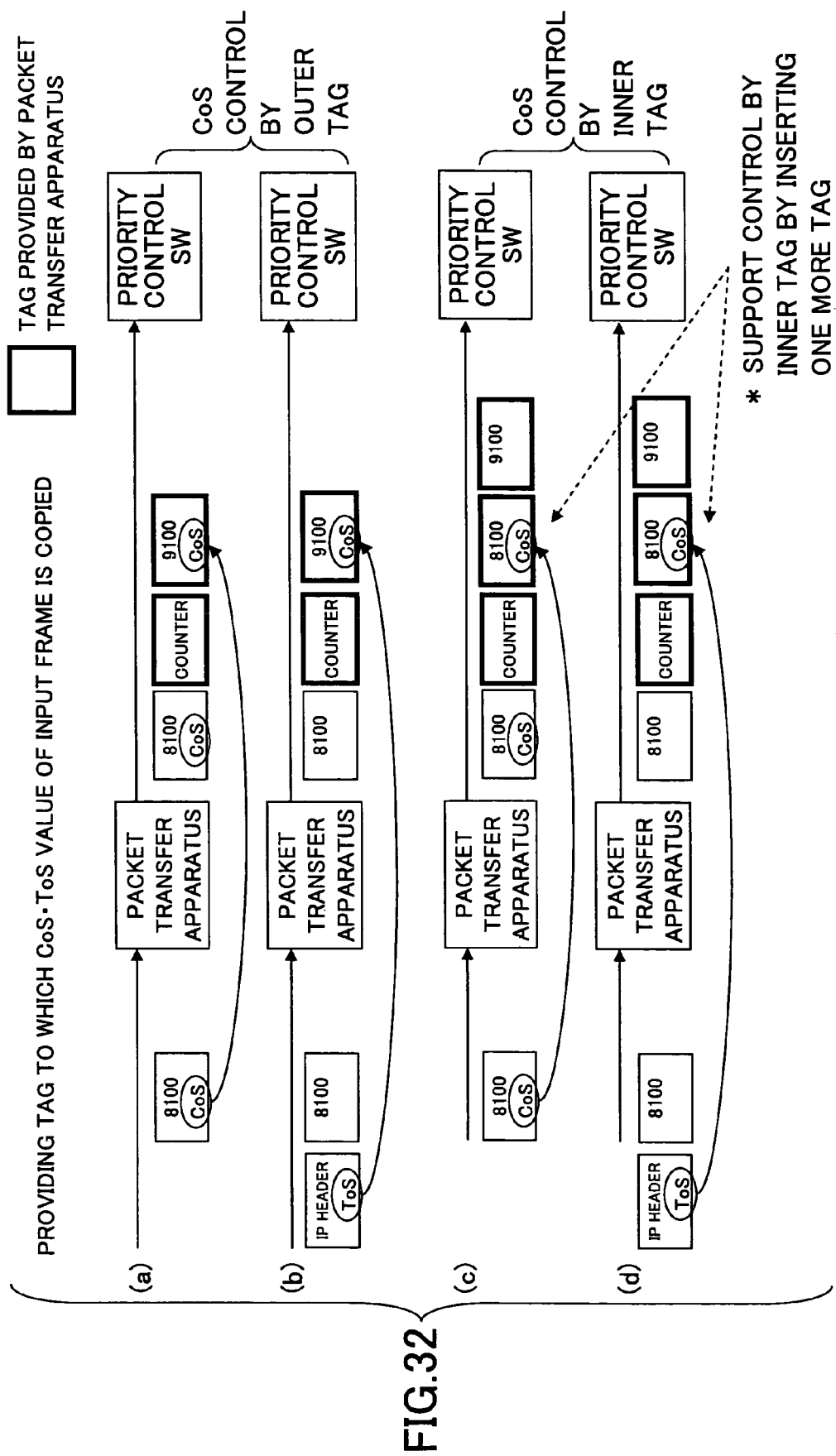
FIG. 32 shows an example in a case for reflecting the priority of the user packet to the route identifier to be inserted.

FIG. 32 shows an example in a case for reflecting the priority of the user packet to the route identifier to be inserted.

(a) indicates an example in which the packet transfer apparatus in the sending side refers to the CoS value in a user VLAN tag (type value 8100) so as to reflect the value as a CoS value of a route identifier (VLAN tag of type value 9100) to be newly provided. (b) indicates an example in which the packet transfer apparatus in the sending side refers to the ToS value in an IP header of a user packet so as to reflect the value as a CoS value of a route identifier (VLAN tag of type value 9100) to be newly provided. (c) indicates an example in which the packet transfer apparatus in the sending side refers to the CoS value in a user VLAN tag (type value 8100) so as to reflect the value as a CoS value of a tag (VLAN tag of type value 8100) of the inside one (nearer side to data) of two route identifiers to be newly provided. (d) indicates an example in which the packet transfer apparatus in the sending side refers to the ToS value in an IP header of a user packet so as to reflect the value as a CoS value of a tag (VLAN tag of type value 8100) of the inside one (nearer side to data) of two route identifiers to be newly provided.

By reflecting the priority to the route identifier to be inserted, priority control according to priority can be performed in switches between the packet transfer apparatuses. In addition, by performing conversion from ToS to CoS in the packet transfer apparatus, there is a possibility that ToS control in the switches becomes unnecessary.

In addition that the priority is reflected to the filed of the route identifier, the priority may be reflected to a filed of the sequence identifier (counter), or a filed of an after-mentioned timestamp. That is, the format of the sequence identifier or the timestamp to be newly inserted is set to be the same as the format of the VLAN tag of 802.1Q specification, and the sequence information or the time information is written into the VLAN-ID field of the VLAN tag. Then, the CoS value of the user packet is reflected as a CoS value of the VLAN tag.

Figure 33:
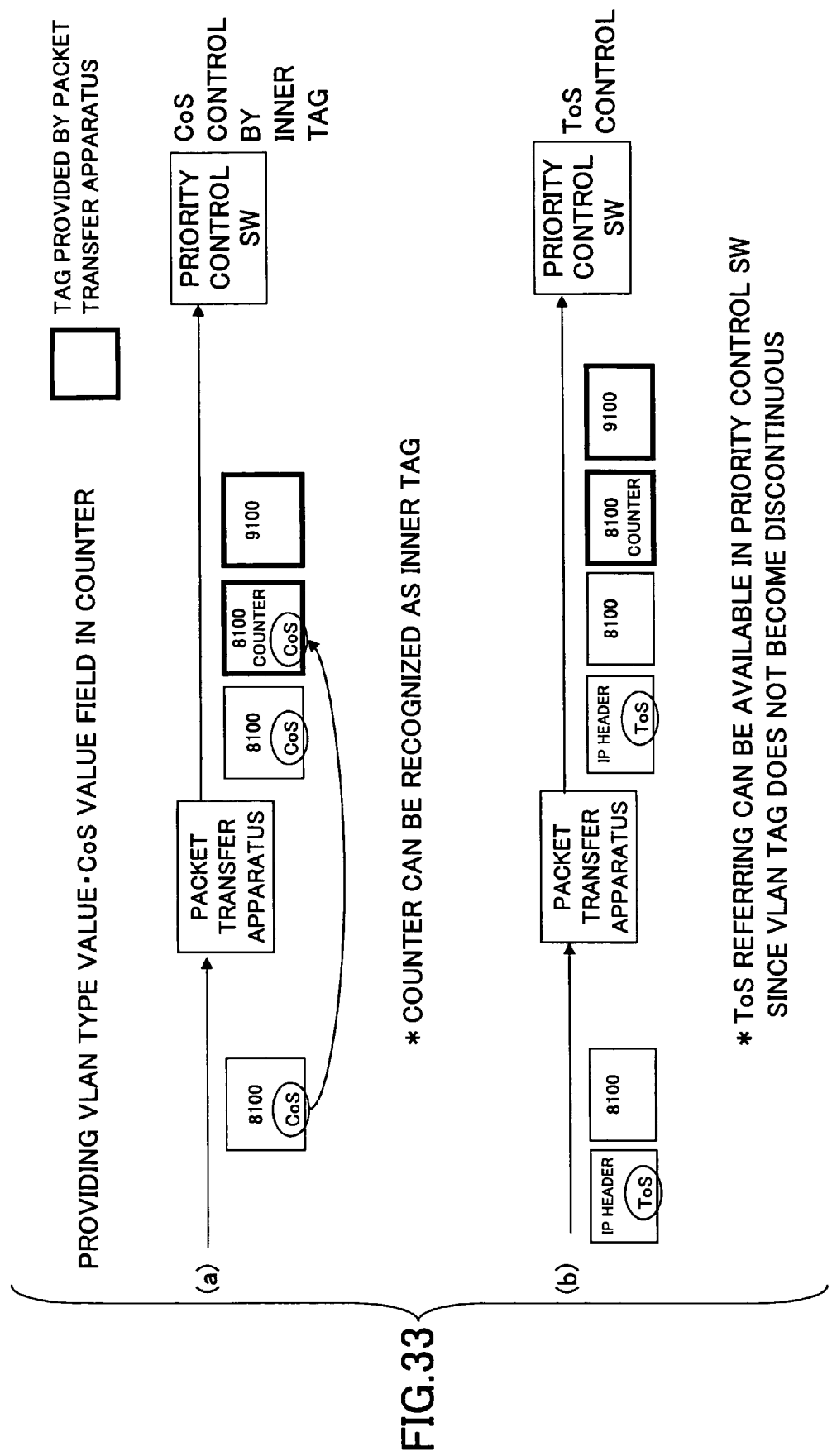
FIG. 33 is a figure showing an example of a case for reflecting priority to a counter field.

FIG. 33 shows an example. The example shown in FIG. 33 shows a case in which, the form of the sequence identifier or the timestamp to be newly inserted conforms to the VLAN format of 802.1Q, and 8100 indicating the VLAN tag is provided as a type value, and a value that is obtained by referring to the user packet is provided as the CoS value.

Figure 34:
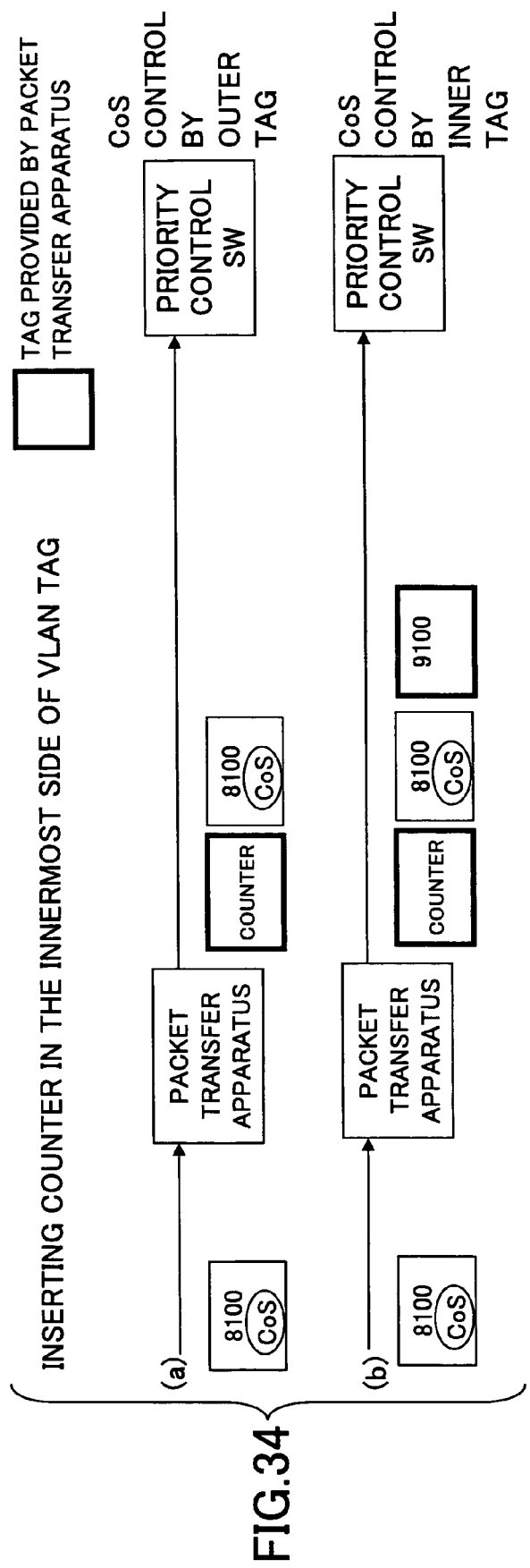
FIG. 34 is a figure showing an example in which a counter is inserted in the inside of a VLAN tag.

In addition, as shown in FIG. 6 and the like, when one or more VLAN tag or shim header is provided to the packet, the sequence identifier or the after-mentioned timestamp may be inserted in the inside of a VLAN tag or a shim header that is provided in the innermost side (nearest to data) in the VLAN tags and the shim headers. Accordingly, priority control can be performed in relay switches without copying the sequence identifier CoS value and the like in the packet transfer apparatus. That is, the number of tags to be provided can be reduced. In this case, in the receiving side, a reading position of the sequence identifier or the timestamp is determined according to the inserting position. FIG. 34 shows an example in which, when the user provides one VLAN tag, the sequence identifier (counter) is inserted in the inside of it.

The method of high reliability determination, the method for reflecting the priority and the like in this embodiment can be applied to each of other embodiments.

Fifteenth Embodiment

Figure 35:
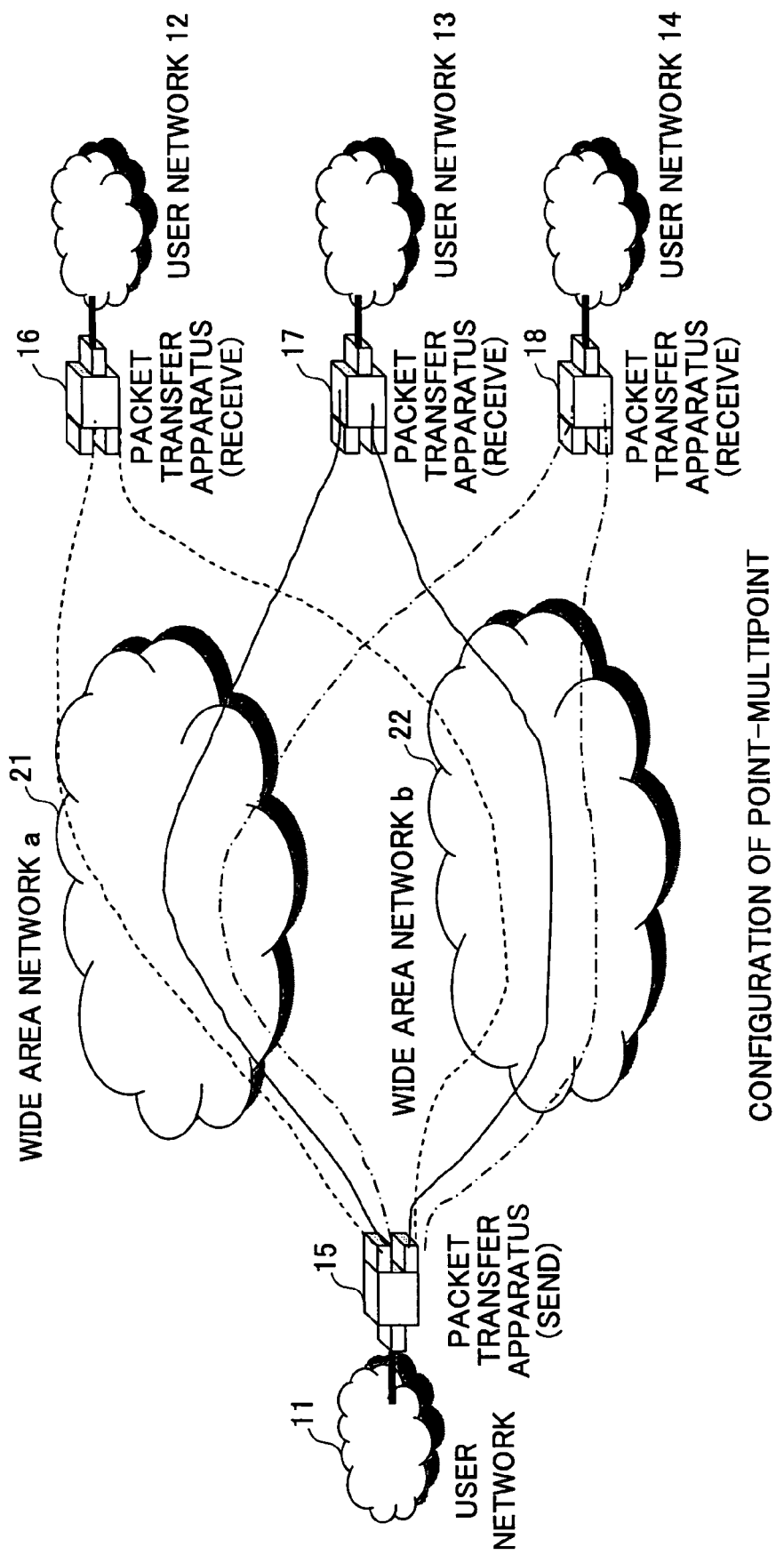
FIG. 35 is a system block diagram in a fifteenth embodiment of the present invention.

FIG. 35 shows a system configuration in this embodiment. As shown in FIG. 35, the system in this embodiment forms a point-multipoint network in which a sending side packet transfer apparatus 15 is connected to a plurality of receiving side packet transfer apparatuses 16, 17 and 18 via a wide area network a21 and a wide area network b22.

Figure 36:
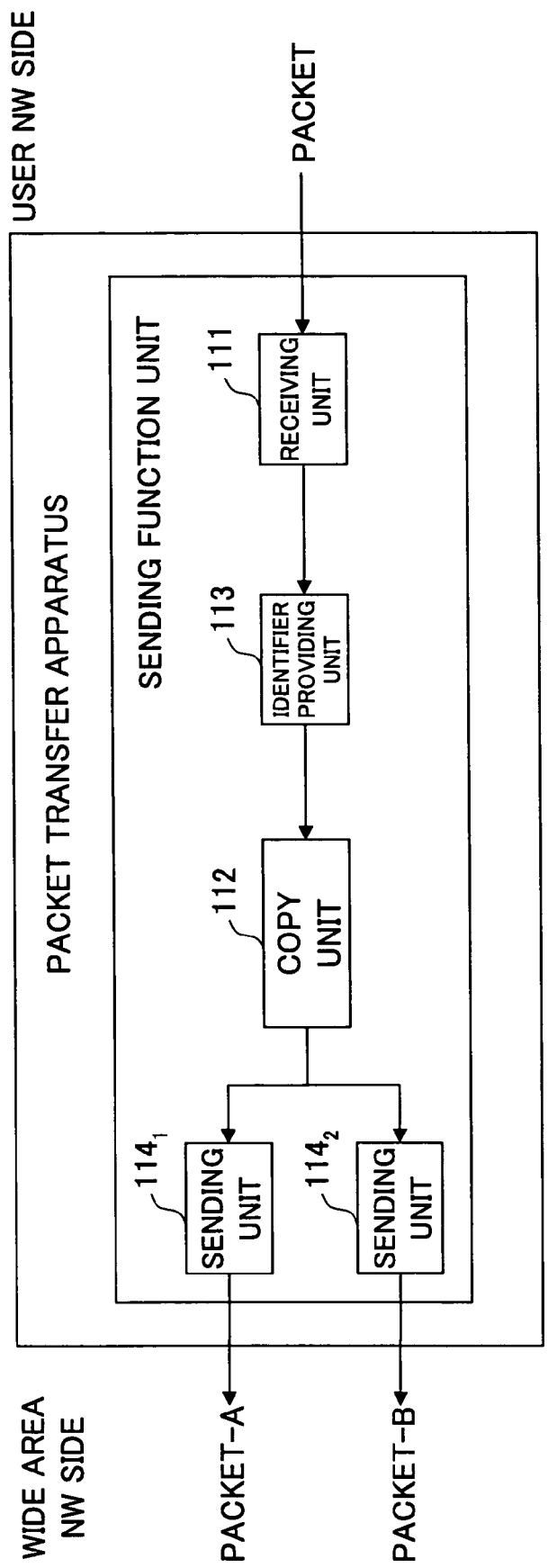
FIG. 36 is a figure showing a configuration example of a sending function unit of a packet transfer apparatus in the fifteenth embodiment of the present invention.

In this embodiment, when the number of the independent routes is two, the configuration of the sending function unit of the sending side apparatus can be the same as the configuration shown in FIG. 8. That is, the receiving unit 111 receives a packet from the user network, and the copy unit 112 generates copies of the packet. After that, the route identifier and the sequence identifier are provided for each of the copied two packets. Then, the packets are sent over two routes respectively in the wide area network side. In addition, as shown in FIG. 36, a configuration may be adopted in which the packet is copied after providing the route identifier and the sequence identifier so as to send packets to two routes.

Figure 37:
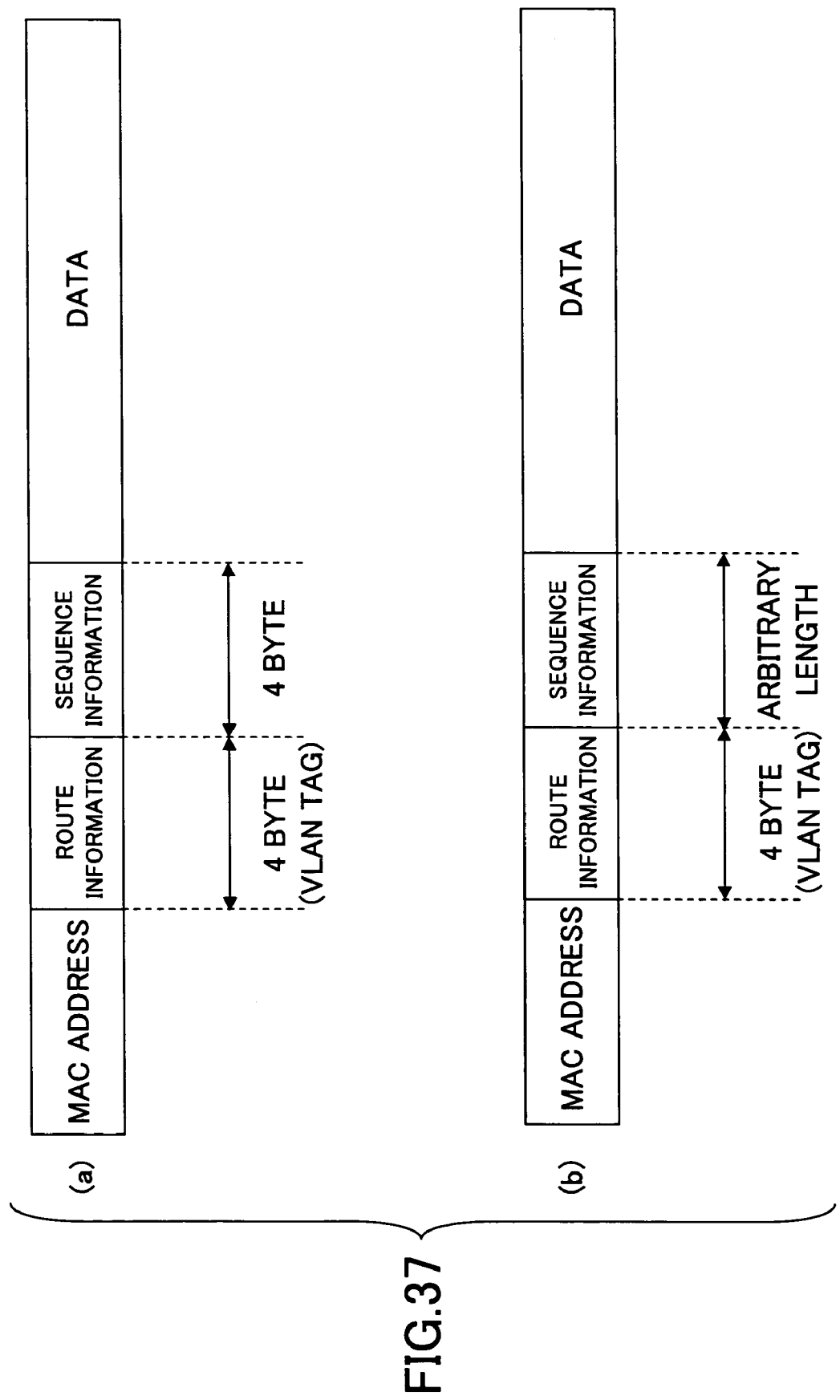
FIG. 37 shows configuration examples of a packet when the target network is Ethernet.

FIG. 37 shows configuration examples of a packet when the target network is the Ethernet. An identifier is provided using VLAN technology such that the packet can be transferred on the existing Ethernet in the wide area network. Especially, since the route identifier inserted right after the MAC address is referred to while the packet is transferred in the wide area network, it is desirable to provide the identifier conforming to the existing VLAN technology (IEEE802.1Q). In addition, the sequence identifier indicating the sequence information may be a tag (4 bytes) conforming to the VLAN technology (IEEE802.1Q), or may be one having 4 bytes length but not conforming to the VLAN technology (IEEE802.1Q), or may be one having any length.

Figure 38:
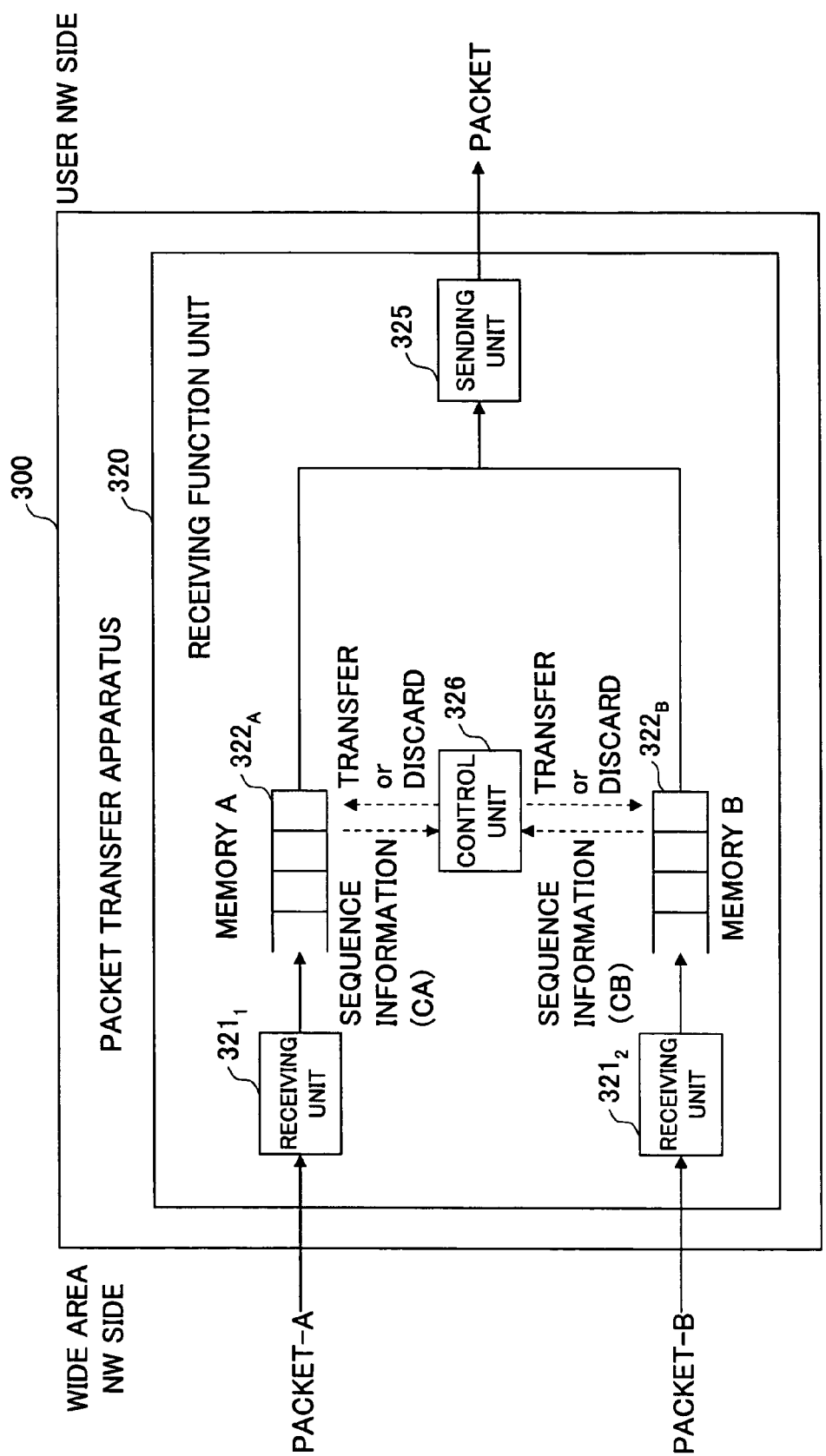
FIG. 38 is a block diagram of a receiving function unit of the packet transfer apparatus in the fifteenth embodiment of the present invention.

FIG. 38 is a block diagram of a receiving function unit 320 of the packet transfer apparatus 300 in this embodiment. FIG. 38 does not show the sending function unit. As shown in FIG. 38, the receiving function unit 320 includes receiving units $321_1$ and $321_2$ for receiving packets from each route, a memory A $322_A$ and a memory B $322_B$ for storing packets temporarily, a control unit 326 for controlling transfer or discard of a packet by referring to the sequence information, and a sending unit 325 for transferring the packet to the user network side. Operation of the receiving function unit 320 in this embodiment is as follows.

Figure 39:
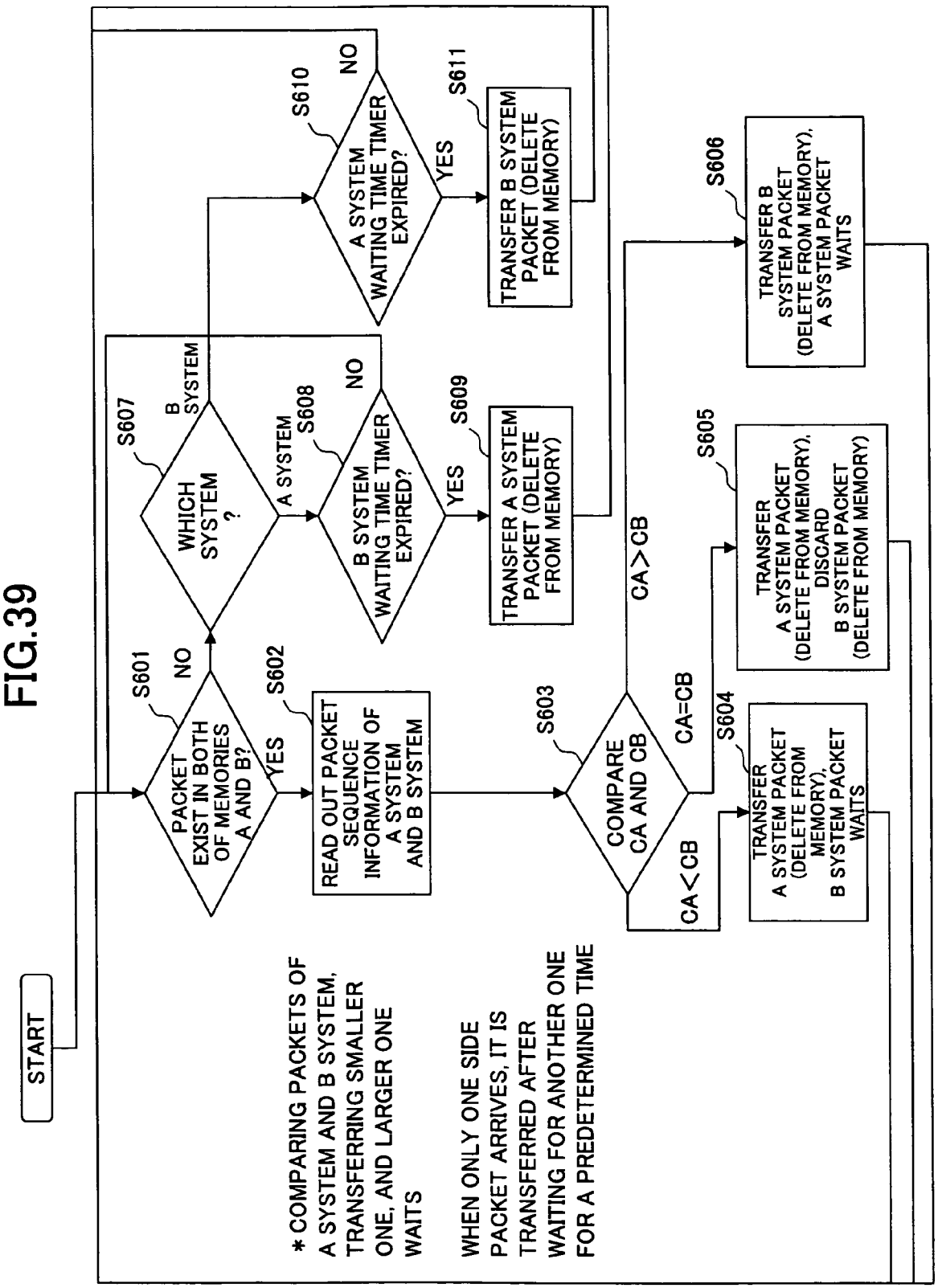
FIG. 39 is a flowchart showing a process procedure of the receiving function unit of the packet transfer apparatus in the fifteenth embodiment of the present invention.

The receiving units $321_1$ and $321_2$ receive packets via two routes from the wide area network side, and store the received packets into the memory A $322_A$ and the memory B $322_B$ respectively. The control unit 326 refers to the oldest packet (packet arriving at the earliest time) in each of the memory A $322_A$ and the memory B $322_B$ so as to transfer an older packet downstream by comparing the sequence identifiers. A control procedure by the control unit 326 is described with reference to a flowchart of FIG. 39.

The control unit 326 refers to presence or absence of a packet in each of the memory A $322_A$ and the memory B $322_B$. The procedure conditionally branches off to one of two according to whether both include packets or one of the memories includes the packet (step 601).

(1-1) When there are packets in both memories, the sequence identifiers CA and CB of the packets of both of the A system and the B system are read (step 602), and the numbers are compared (step 603). The procedure conditionally branches off according to the case of CA<CB, the case of CA=CB, or the case of CA>CB.

(1-1-1) When CA<CB, the A system packet is transferred downstream, and the packet is deleted from the memory A. Then, the state returns to the both system packet referring state while the B system packet remains in a waiting state (step 604).

(1-1-2) When CA=CB, the A system (or B system) packet is transferred downstream, and the transferred packet is deleted from the corresponding memory, the B system packet (A system) is discarded to delete from the memory, and the state returns to the both system packet referring state (step 605).

(1-1-3) When CA>CB, the B system packet is transferred downstream, the packet is deleted from the memory, then, the state returns to the both system packet referring state while the A system packet remains in a waiting state (step 606).

That is, a packet that have a smaller number is determined to be one to be transferred next, so that the packet is transferred downstream and is deleted from the memory. Another system in which a larger number is detected waits, and the state returns to the packet referring state of both systems.

(1-2) When a packet exists in only one memory A or B in step 601, the procedure branches off to a case where the packet exists only in the A system or a case where the packet exists only in the B system (step 607).

(1-2-1) When the packet exists only in the A system, the packet waiting time in the B system is checked (step 608).

(1-2-1-1) When the packet waiting time in the B system has not yet expired, the state returns to the both system packet referring state.

(1-2-1-2) When the packet waiting time in the B system has expired, the A system packet is transferred downstream and is deleted from the memory A. Then, the state returns to the both system packet referring state (step 609).

(1-2-2) When the packet exists only in the B system, the packet waiting time in the A system is checked (step 610).

(1-2-2-1) When the packet waiting time in the A system has not yet expired, the state returns to the both system packet referring state.

(1-2-2-2) When the packet waiting time in the A system has expired, the B system packet is transferred downstream and is deleted from the memory B. Then, the state returns to the both system packet referring state (step 611).

Figure 40:
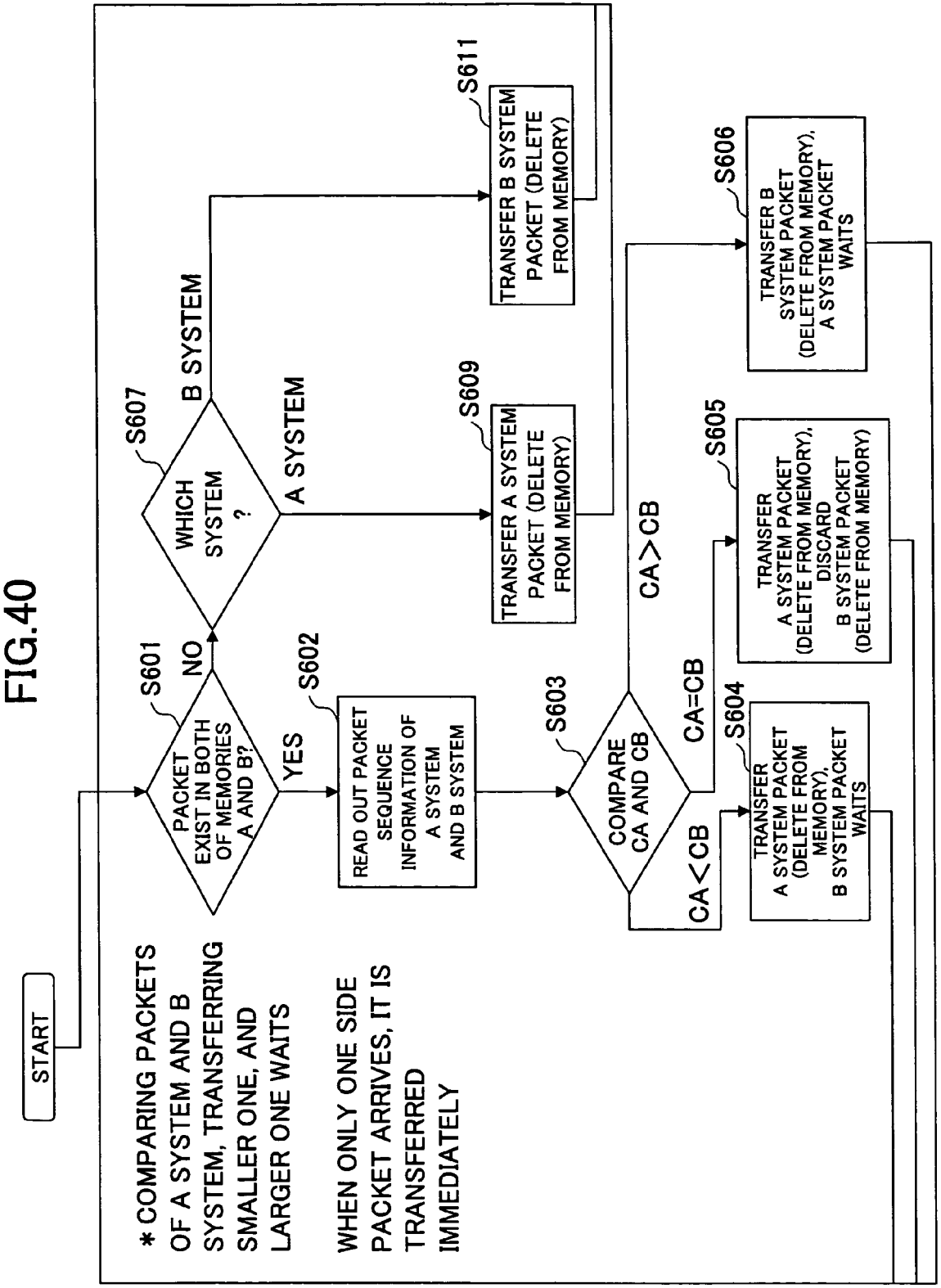
FIG. 40 is a flowchart showing a process procedure of the receiving function unit of the packet transfer apparatus in the fifteenth embodiment of the present invention.

FIG. 40 shows another flowchart in this embodiment. FIG. 40 shows a procedure in which packet waiting for the A system and the B system is not performed so that the packet is transferred downstream immediately after (1-2) in FIG. 39.

In this embodiment, since the receiving function unit of the packet transfer apparatus does not manage the sequence of transferred packets, when the arriving time difference between the A system and the B system is large (when no less than the packet waiting time), there is a possibility that a plurality of the same packets may be transferred downstream. Therefore, it is necessary to carefully set the route delay difference.

Sixteenth Embodiment

Figure 41:
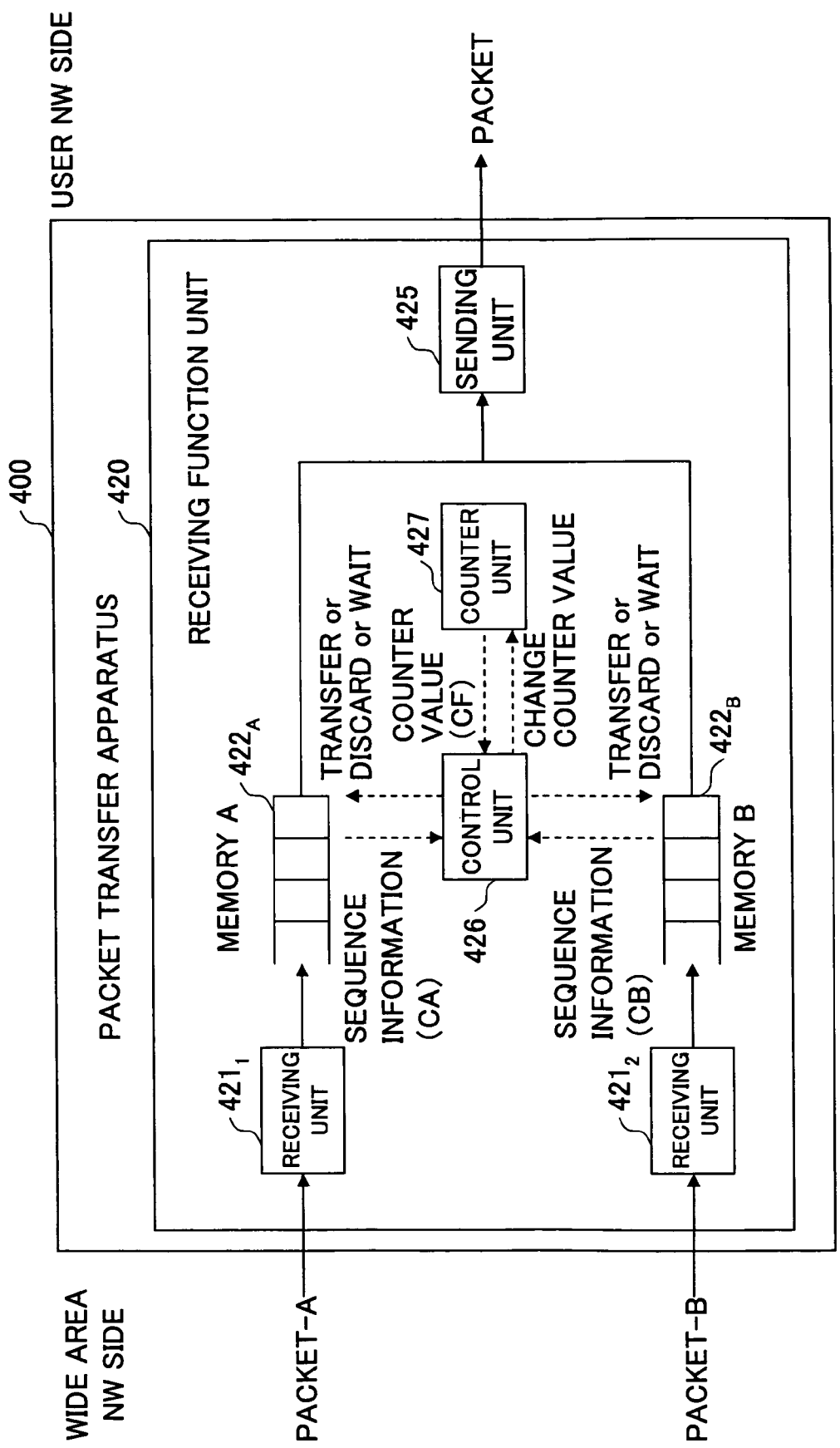
FIG. 41 is a block diagram of a receiving function unit of the packet transfer apparatus in a sixteenth embodiment of the present invention.

FIG. 41 shows a configuration of a receiving function unit 420 of the packet transfer apparatus 400 of this embodiment. The sending function unit is not shown. As shown in FIG. 41, the receiving function unit 420 of the packet transfer apparatus includes a counter unit 427 for managing sequence of transferred packets in addition to the configuration of the receiving function unit of the packet transfer apparatus in the fifteenth embodiment.

The control unit 426 compares a sequence identifier of the oldest packet (arrived at the earliest time) in the memory A and the memory B with a counter value of the counter unit 427 indicating a sequence number of the already transferred packet so as to determine a not-yet-transferred packet to be transferred downstream next. The process procedure by the control unit 426 is described with reference to the flowchart shown in FIG. 42.

Figure 42:
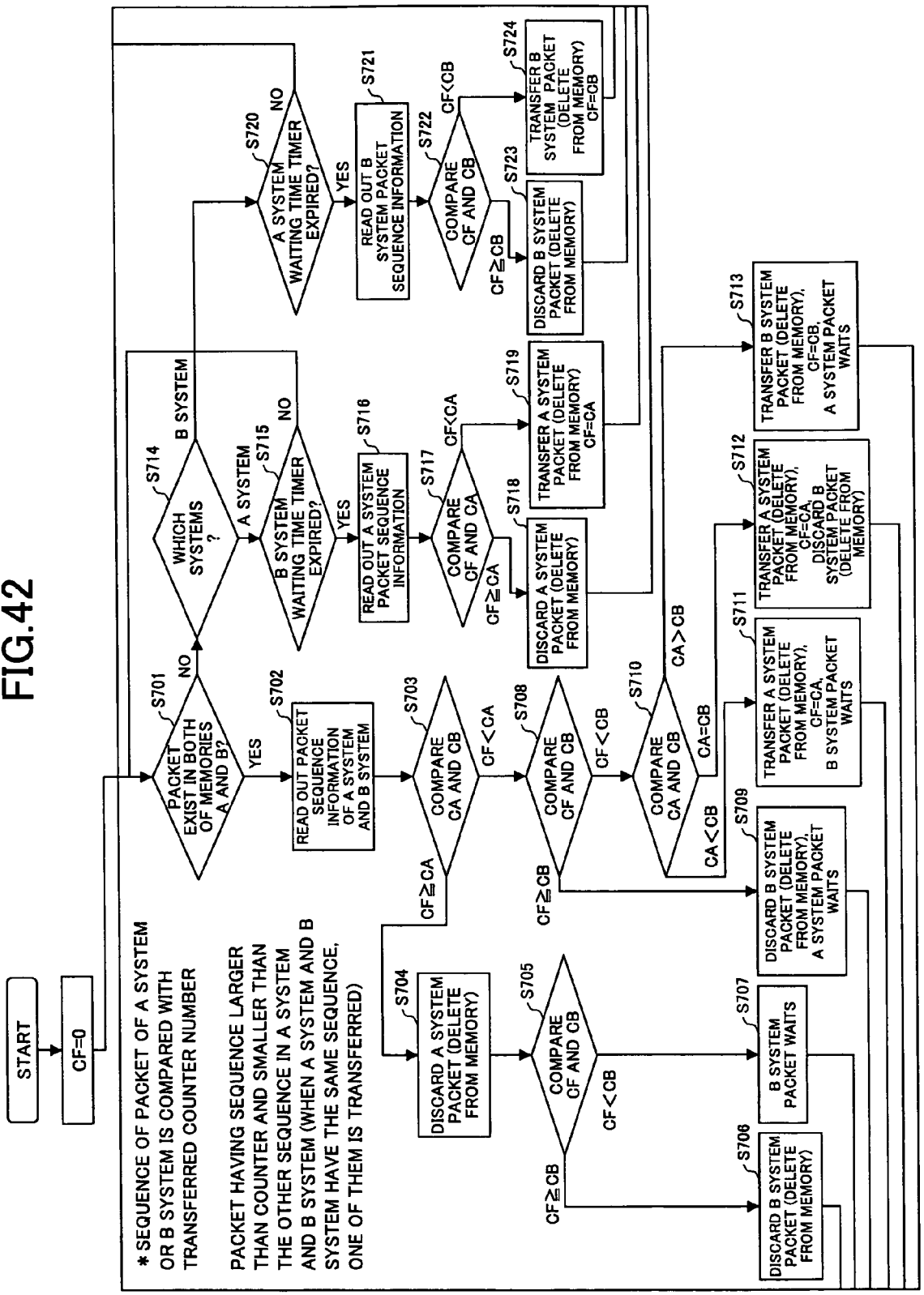
FIG. 42 is a flowchart showing a process procedure of the receiving function unit of the packet transfer apparatus in the sixteenth embodiment of the present invention.

As shown in FIG. 42, the control unit 426 checks presence or absence of packets of the memory A $422_A$ and the memory B $422_B$, so that the procedure conditionally branches off to two routes that are a case where the packets exist in both systems and a case where a packet exists in one of the systems (step 701).

(2-1) When the packets exist in both systems, sequence identifiers CA and CB of packets of both of A and B systems (step 702) are read so as to compare each of them with the counter value (CF). The procedure conditionally branches off to a case of CF≧CA or a case of CF<CA (step 703).

(2-1-1) When CF≧CA, the A system packet is discarded, the packet is deleted from the memory A, then comparison between CB and CF is performed (steps 704, 705).

(2-1-1-1) When CF≧CB, the B system packet is also discarded, the packet is deleted from the memory B, then, the state returns to the both system packet referring state (step 706).

(2-1-1-2) When CF<CB, the state returns to the both packet referring state while the B system packet remains in a waiting state (step 707).

(2-1-2) When CF<CA in step 703, comparison between CB and CF is performed while the A system packet remains in a waiting state (step 708).

(2-1-2-1) When CF≧CB, the B packet is discarded and is deleted from the memory B, and the state returns to the both packet referring state while the A system packet remains in the packet waiting state (step 709).

(2-1-2-2) In step 708, when CF<CB, comparison between CA and CB is performed while the A and B system packets remain in a waiting state (step 710).

(2-1-2-2-1) When CA<CB, the A system packet is transferred downstream, and the packet is deleted from the memory. After the counter value is reset to be CF=CA, the state returns to the both packet referring state while the B system packet remains in a waiting state (step 711).

(2-1-2-2-2) When CA=CB, the A system packet (or B system packet) is transferred downstream, and the transferred packet is deleted from the memory. After the counter value is reset to be CF=CA (CB), the B system (A system) packet is discarded. That is, the packet is deleted from the memory (step 712). Then, the state returns to the both packet referring state while the B system packet remains in a waiting state (step 712).

(2-1-2-2-3) When CA>CB, the B system packet is transferred downstream, and the packet is deleted from the memory. After the counter value is reset to be CF=CB, the state returns to the both packet referring state while the A system packet remains in a waiting state (step 713).

(2-2) When a packet exists in only one memory A or B in step 701, the procedure branches off to a case where the packet exists only in the A system or a case where the packet exists only in the B system (step 714).

(2-2-1) When the packet exists only in the A system, the packet waiting time in the B system is checked (step 715).

(2-2-1-1) When the packet waiting time in the B system has not yet expired, the state returns to the both system packet referring state.

(2-2-1-2) When the packet waiting time in the B system has expired, the sequence identifier CA of the A system packet is read out so that comparison with CF is performed (steps 716, 717).

(2-2-1-2-1) When CF≧CA, the A system packet is discarded by deleting it from the memory A so that the state returns to the both system packet referring state (step 718).

(2-2-1-2-2) When CA<CA, the A system packet is transferred downstream, and the packet is deleted from the memory. After the counter value is reset to be CF=CA, the state returns to the both packet referring state (step 719).

(2-2-2) When the packet exists only in the B system in step 714, the packet waiting time in the A system is checked (step 720).

(2-2-2-1) When the packet waiting time in the A system has not yet expired, the state returns to the both system packet referring state.

(2-2-2-2) When the packet waiting time in the A system has expired, the sequence identifier CB of the B system packet is read out so that comparison with CF is performed (steps 721, 722).

(2-2-1-2-1) When CF≧CB, the B system packet is discarded by deleting it from the memory B so that the state returns to the both system packet referring state (step 723).

(2-2-1-2-2) When CA<CB, the B system packet is transferred downstream, and the packet is deleted from the memory. After the counter value is reset to be CF=CB, the state returns to the both packet referring state (step 724).

In this embodiment, the counter value (CF) that is a sequence of already-transferred packets is compared with the sequence identifiers (C1~Cn) of target packets of n systems (n=2 in this embodiment). Then, a packet to be transferred next is determined to be a packet of a sequence, in C1~Cn, that is greater than CF and that is the smallest among C1~Cn (when there are plural packets of the smallest sequence, any one of them is selected).

In this embodiment, since the sequence of the already-transferred packet is managed using the counter value CF, even when the arrival time difference of the same packets between the A system and the B system (when no less than the packet waiting time), the uninterruptible configuration can be realized without transferring a plurality of the same packets downstream.

As an identifier for identifying the sameness among packets, a timestamp can be used instead of using the above-mentioned sequence identifier. In this case, the send side packet transfer apparatus provides the timestamp to a target packet. Then, the receiving side packet transfer apparatus compares timestamps arriving from a plurality of systems so as to identify the sequence.

In addition, for identifying the already-transferred packet in the receiving side like the present embodiment, m (m is an integer no less than 1) timestamps from the newest packet are stored, and each of the stored timestamps is compared with a timestamp of a packet arriving next, so that it is determined whether the arriving packet is an already transferred packet or not-yet-transferred packet.

Figure 43:
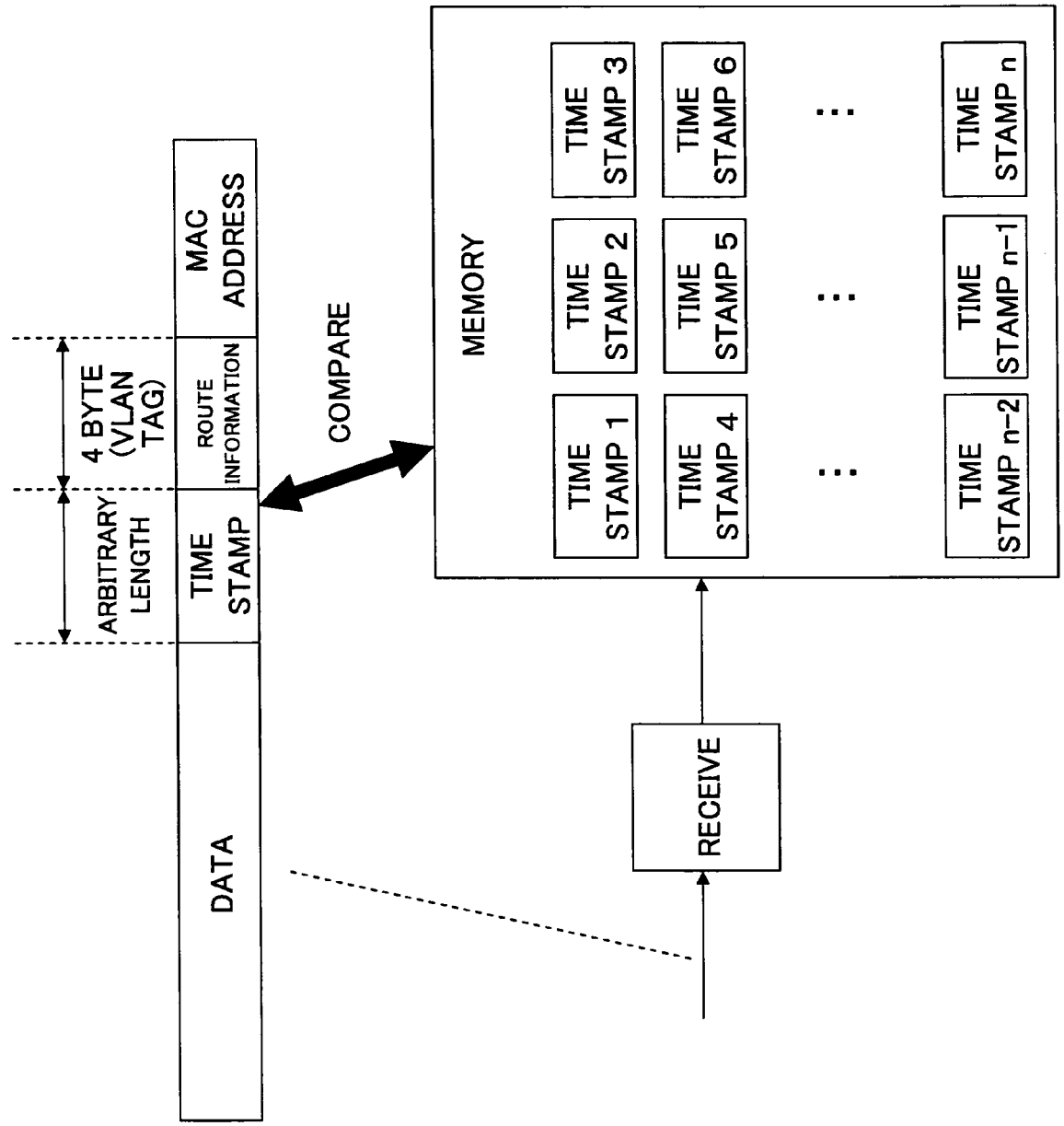
FIG. 43 is a figure for explaining a memory storing timestamps.

In this case, the receiving function unit of the packet transfer apparatus includes a memory for storing the timestamps shown in FIG. 43. As the memory, a RAM or CAM can be used. When using the RAM, comparison target data is compared with each piece of data stored in the memory so as to determine the sameness. When using the CAM, the comparison target data can be collectively compared with the data list in the memory so that quick determination can be realized.

In addition to providing the identifier for determining the sameness to the packet, the receiving side may apply a pre-determined function to an arriving packet so as to determine the sameness among packets based on a value obtained by the function. As the function, a predetermined hash function can be used, for example.

Figure 44:
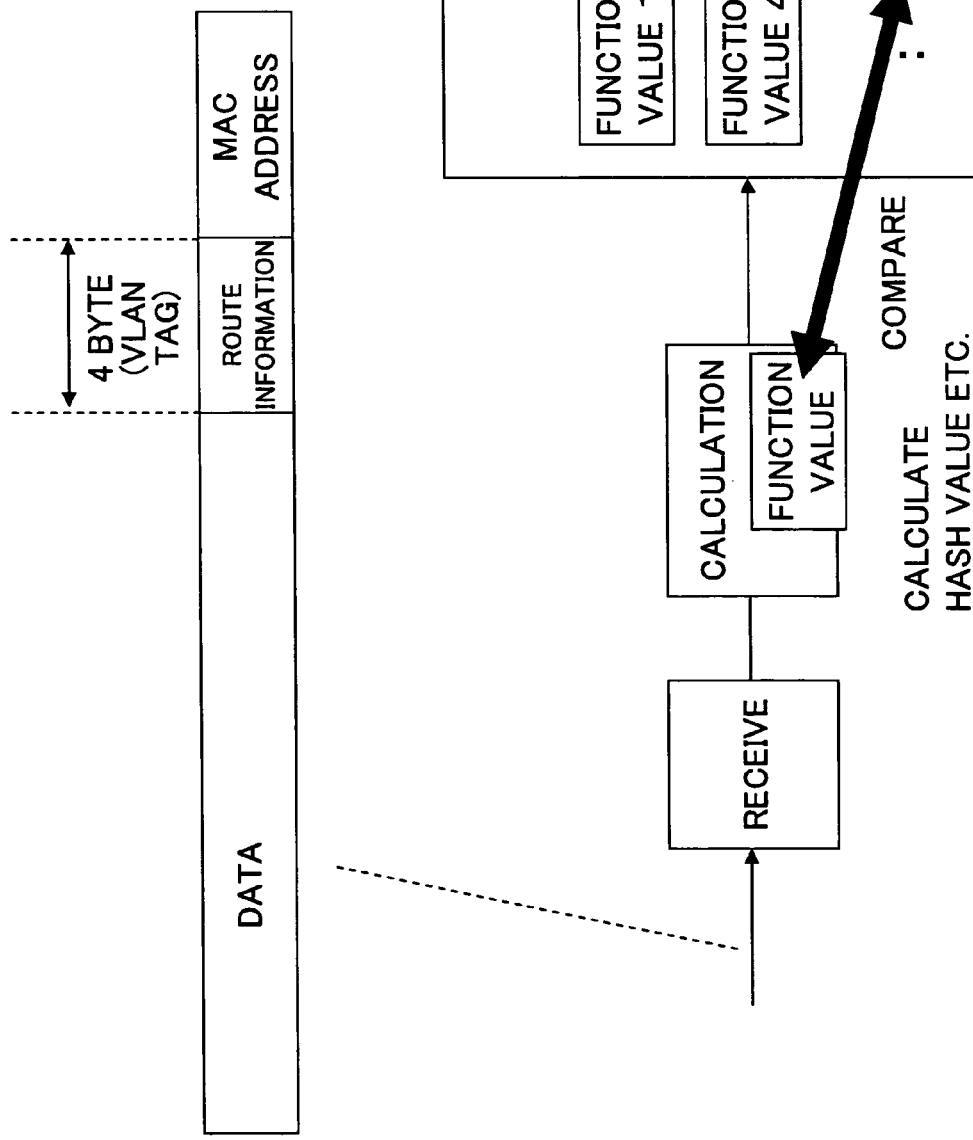
FIG. 44 is a figure for explaining a memory storing function values.

In this case, for identifying the already-transferred packet, a memory like one shown in FIG. 43 is held as shown in FIG. 44. In the same way as the case of FIG. 43, RAM, CAM and the like can be used as the memory.

The method described in this embodiment for determining whether the arriving packet is an already-transferred packet can be applied to other embodiments.

Seventeenth Embodiment

The configuration of the receiving function unit in the seventeenth embodiment is the same as that in the sixteenth embodiment shown in FIG. 41, but process operations are different.

In this embodiment, among n (n=2 in this embodiment) independent routes, a route from which a packet arrives first after starting communication is regarded as an active system, and a value (CF) of the counter storing a sequence of the already-transferred packet is compared with a sequence identifier (ci: 1≦i≦n) of a packet in the system adopted as the active system, so that a packet having a sequence larger than CF is determined to be a packet to be transferred next and the packet is transferred downstream. In addition, when arrival of packets stops in the active system, another route from which a packet arrives first next is adopted as a new active system so that the packet is transferred downstream.

Figure 45:
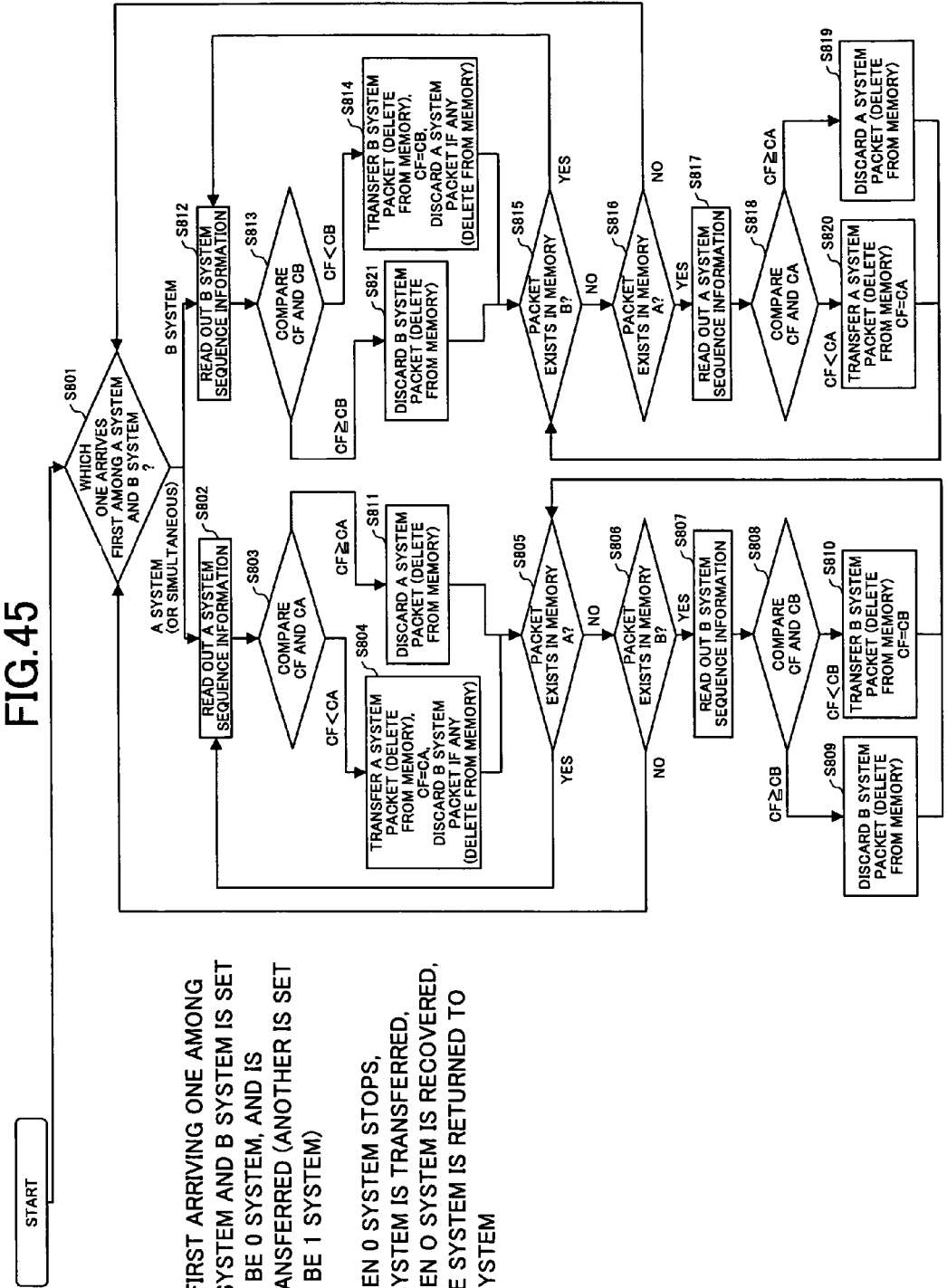
FIG. 45 is a flowchart showing a process procedure of the receiving function unit of the packet transfer apparatus in a seventeenth embodiment of the present invention.
Figure 46:
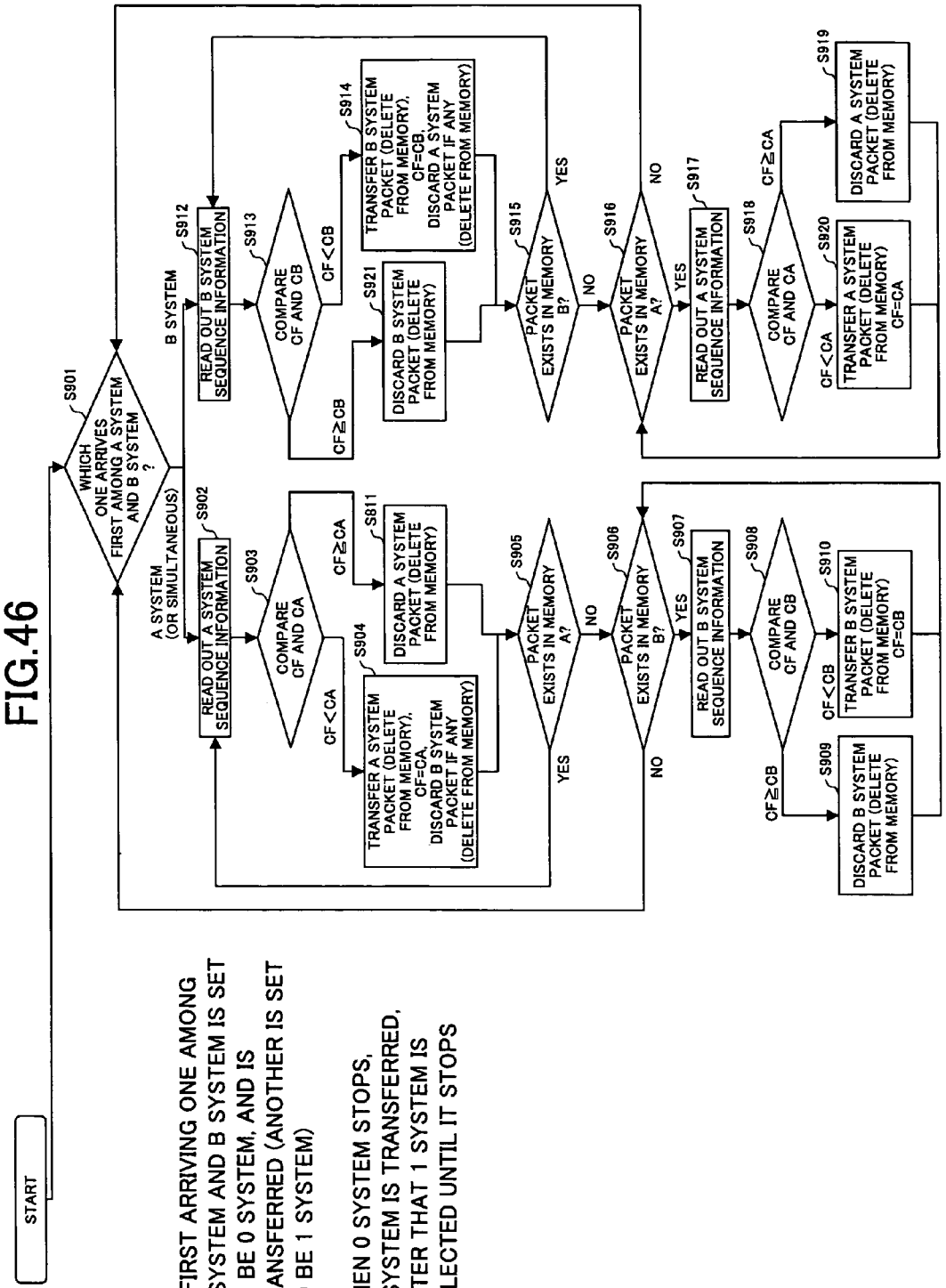
FIG. 46 is a flowchart showing a process procedure of the receiving function unit of the packet transfer apparatus in the seventeenth embodiment of the present invention.

Process operations in the seventeenth embodiment is described using flowcharts shown in FIGS. 45 and 46.

In a method shown in FIG. 45, among the A system and the B system, one from which a packet arrives first is regarded as a 0 system (another is 1 system) so as to transfer the packet, when communication in the 0 system stops due to failure or construction, a 1 system packet is transferred, and when the 0 system is recovered, the system is returned to the 0 system. The flowchart of FIG. 45 is described in the following.

First, the procedure branches off conditionally on a system, between the A system and the B system, from which a packet arrives first (step 801).

(3-1) When the A system packet arrives first, or when packets of the A system and the B system arrive at the same time, the sequence identifier CA of the A system is read out (step 802), so that CA is compared with the counter value (CF) (step 803). The procedure conditionally branches off according to a case of CF≧CA or a case of CF<CA.

(3-1-1) When CF<CA, the A system packet is transferred, the packet is deleted from the memory A, CF is set to be CF=CA, and the oldest packet is deleted if any B system packet exists (step 804), and checking for presence or absence of packet in memory A is performed (step 805).

(3-1-1-1) In step 805, when a packet exists in the memory A, the process returns to the procedure for reading out the sequence of packet.

(3-1-1-2) In step 805, when the packet does not exist in the memory A, checking for presence or absence of packet in memory A is performed (step 806).

(3-1-1-2-1) When the packet exists in the memory B in step 806, the sequence identifier CB of the B system is read out (step 807), so that CB is compared with the counter value (CF) (step 808). The procedure conditionally branches off according to a case of CF≧CB or a case of CF<CB.

(3-1-1-2-1-1) When CF≧CB, the B system packet is discarded, and after the packet is deleted from the memory B (step 809), the procedure returns to checking of presence or absence of the packet in memory A.

(3-1-1-2-1-2) When CF<CB, the B system packet is transferred, the packet is deleted from the memory, and after CF is set to be CF=CB (step 810), the procedure returns to checking of presence or absence of packet in the memory A.

(3-1-1-2-2) When there is no packet in the memory B in step 806, the procedure returns to first arrival checking for the A and B systems.

(3-1-2) When CF≧CA in step 803, the A system packet is discarded, the packet is deleted from the memory A (step 811), and the procedure returns to checking of presence or absence of the packet in memory A. After that, processes the same as steps 805~810 are performed.

(3-2) When the B system packet arrives first in step 801, the sequence identifier CB of the B system is read out (step 812), so that CB is compared with the counter value (CF) (step 813). The procedure conditionally branches off according to a case of CF≧CB or a case of CF<CB.

(3-2-1) When CF<CB, the B system packet is transferred, the packet is deleted from the memory B, CF is set to be CF=CB, and the oldest packet in the A system is deleted if any packet exists in the A system (step 814), and checking for presence or absence of packet in memory B is performed (step 815).

(3-2-1-1) In step 815, when a packet exists in memory B, the procedure returns to a procedure for reading out the sequence of packet.

(3-2-1-2) In step 815, when the packet does not exist in the memory B, checking for presence or absence of packet in memory A is performed (step 816).

(3-2-1-2-1) When the packet exists in the memory A in step 816, the sequence identifier CA of the A system is read out (step 817), so that CA is compared with the counter value (CF) (step 818). The procedure conditionally branches off according to a case of CF≧CA or a case of CF<CA.

(3-2-1-2-1-1) When CF≧CA, the A system packet is discarded by deleting the packet from the memory A (step 819), and the procedure returns to checking of presence or absence of the packet in memory B.

(3-2-1-2-1-2) When CF<CA, the A system packet is transferred, the packet is deleted from the memory, and after CF is set to be CF=CA (step 820), the procedure returns to checking of presence or absence of the packet in the memory B.

(3-2-1-2-2) When there is no packet in the memory A in step 816, the procedure returns to first arrival checking for the A and B systems.

(3-2-2) When CF≧CB in step 813, the B system packet is discarded, the packet is deleted from the memory B (step 821), and the procedure returns to checking of presence or absence of the packet in memory B. After that, processes the same as steps 815~820 are performed.

In a method shown in FIG. 46, a side at which a packet arrives first is regarded as the 0 system and the packet is transferred (another system is regarded as the 1 system), and when the 0 system stops, a packet of the 1 system is transferred. Then, irrespective of whether the 0 system recovers or not, the 1 system packet is used until the communication by the 1 system is interrupted due to failure, construction and the like.

When the first arriving side is the A system, the procedure returns to "checking of presence or absence of the packet of the memory A (step 805)" after step 809 or 810 in the flowchart of FIG. 45. Instead of that, in the flowchart shown in FIG. 46, the procedure returns to "checking of presence or absence of the packet of the memory B". When the first arriving side is the B system, the procedure returns to "checking of presence or absence of the packet of the memory B (step 815)" after step 820 or 819 in the flowchart of FIG. 45. Instead of that, in the flowchart shown in FIG. 46, the procedure returns to "checking of presence or absence of the packet of the memory A".

In the processes of the steps 805, 815, 905 and 915 in the methods shown in FIGS. 45 and 46, the step may move to a next step only after the waiting time timer expires. Accordingly, frequency of switching between the systems can be reduced.

Eighteenth Embodiment

Figure 47:
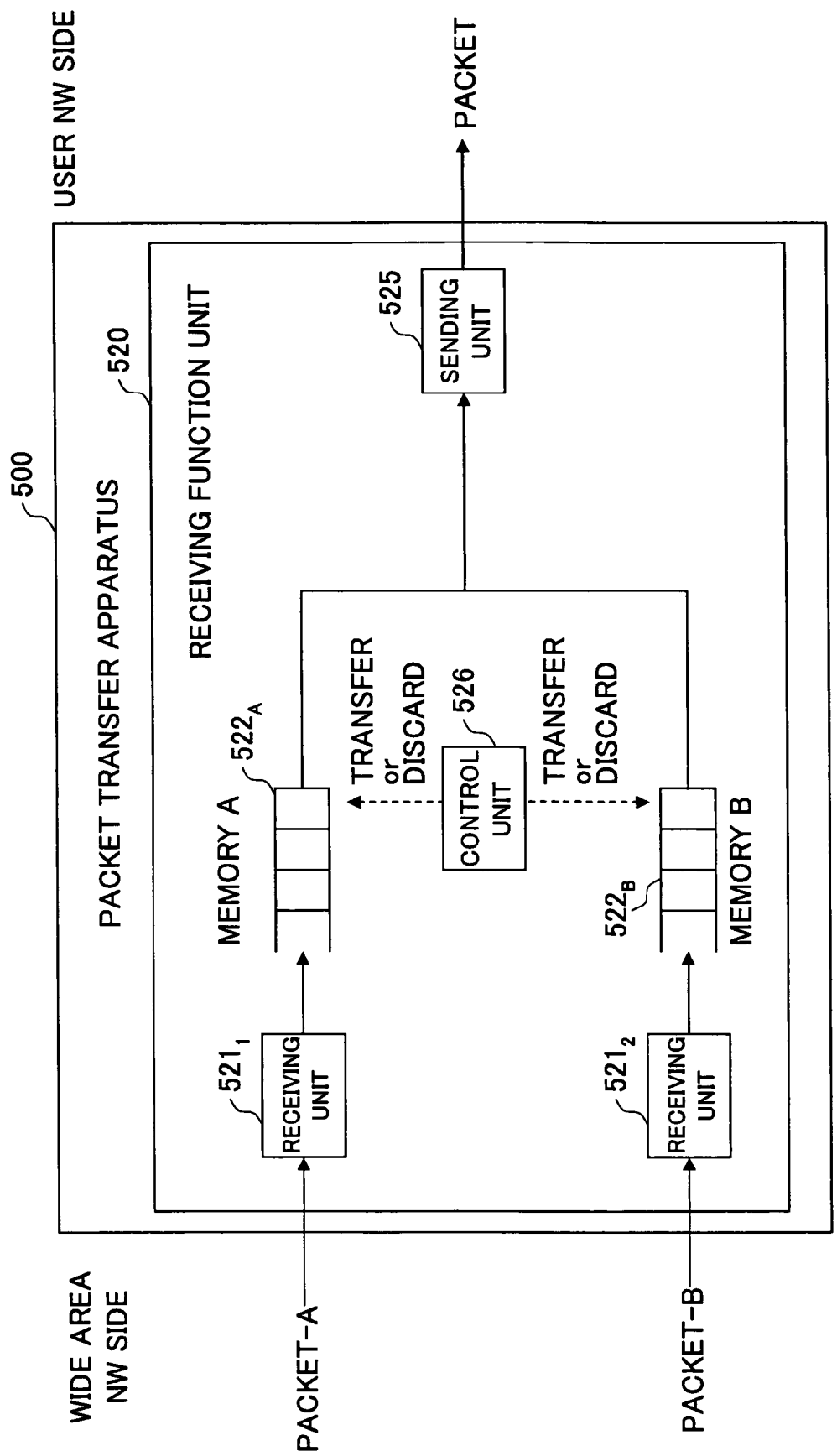
FIG. 47 is a block diagram of a receiving function unit of the packet transfer apparatus in a eighteenth embodiment of the present invention.

FIG. 47 shows a block diagram of a receiving function unit 520 in the eighteenth embodiment. Although this configuration is the same as that of the fifth embodiment shown in FIG. 38, the control unit 526 does not refer to the sequence identifier of the packet in this embodiment.

Figure 48:
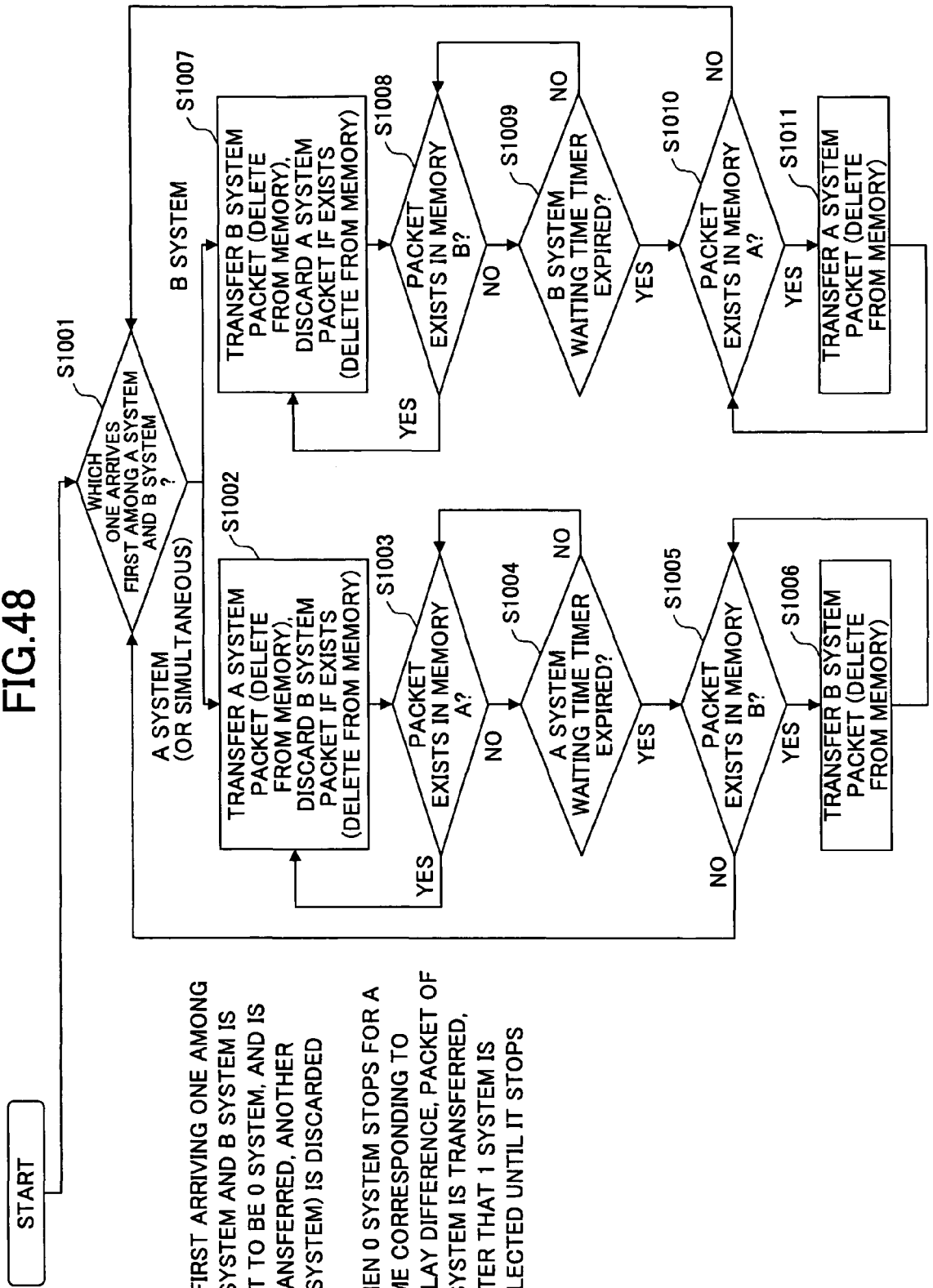
FIG. 48 is a flowchart showing a process procedure of the receiving function unit of the packet transfer apparatus in the eighteenth embodiment of the present invention.
Figure 49:
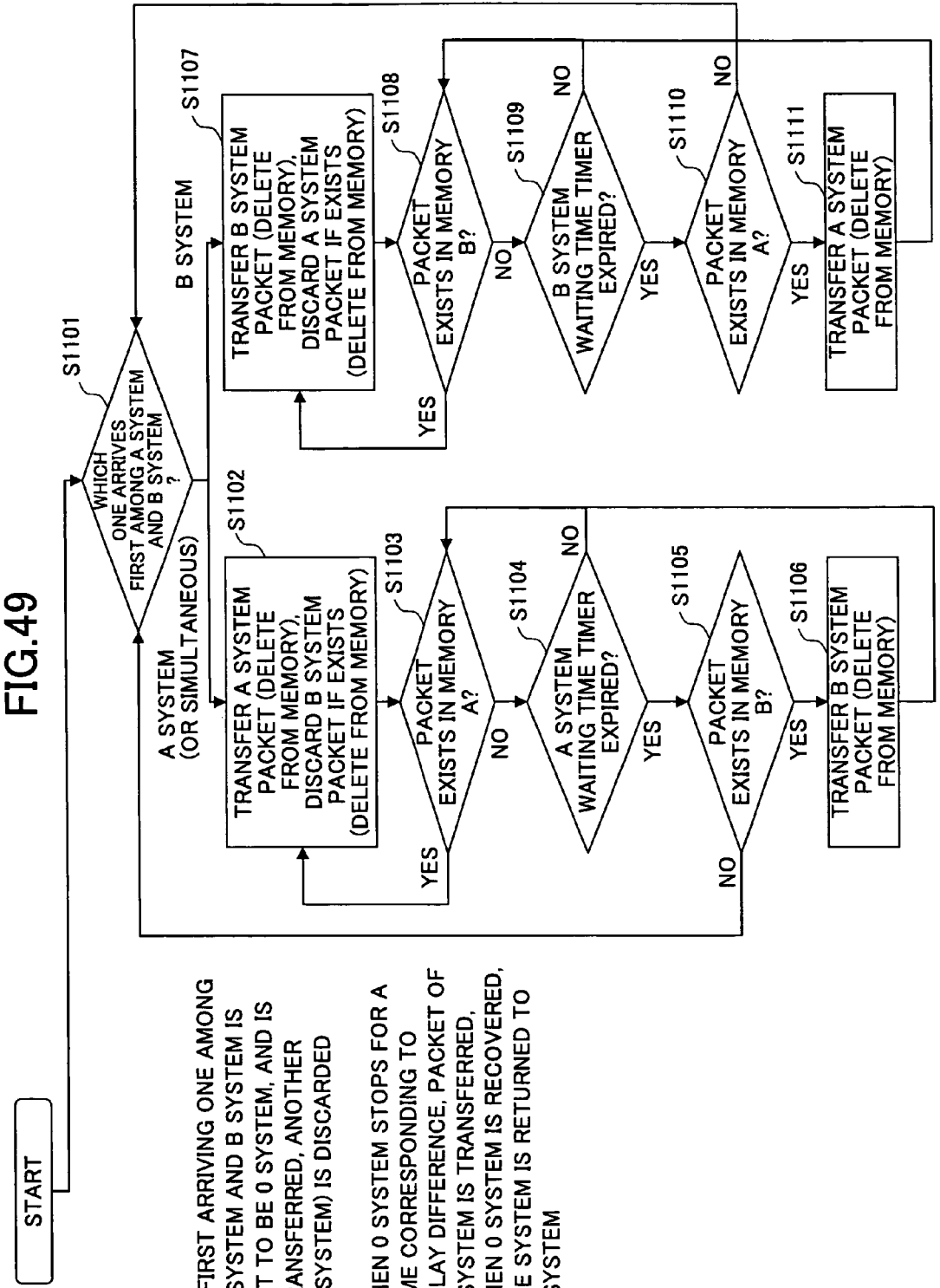
FIG. 49 is a flowchart showing a process procedure of the receiving function unit of the packet transfer apparatus in the eighteenth embodiment of the present invention.

FIG. 48 shows an operation flowchart. In this embodiment, a system in which the packet arrives first is regarded as the 0 system that is the active system, then, the packet is transferred (steps 1002-1003, steps 1007-1008). Determination for switching between the 0 system and the 1 system is performed according to presence or absence of a packet in the memory of the receiving function unit 520 and according to whether the packet waiting time expires or not (steps 1004-1005, steps 1009-1010). FIG. 48 shows a case in which, after the active system is changed from the 0 system to the 1 system, the system is not returned to the 0 system unless the 1 system is interrupted. FIG. 49 shows another example. The example shown in FIG. 49 shows a case in which, after the active system is changed from the 0 system to the 1 system, the active system is returned to the 0 system when the 0 system recovers.

Nineteenth Embodiment

Figure 50:
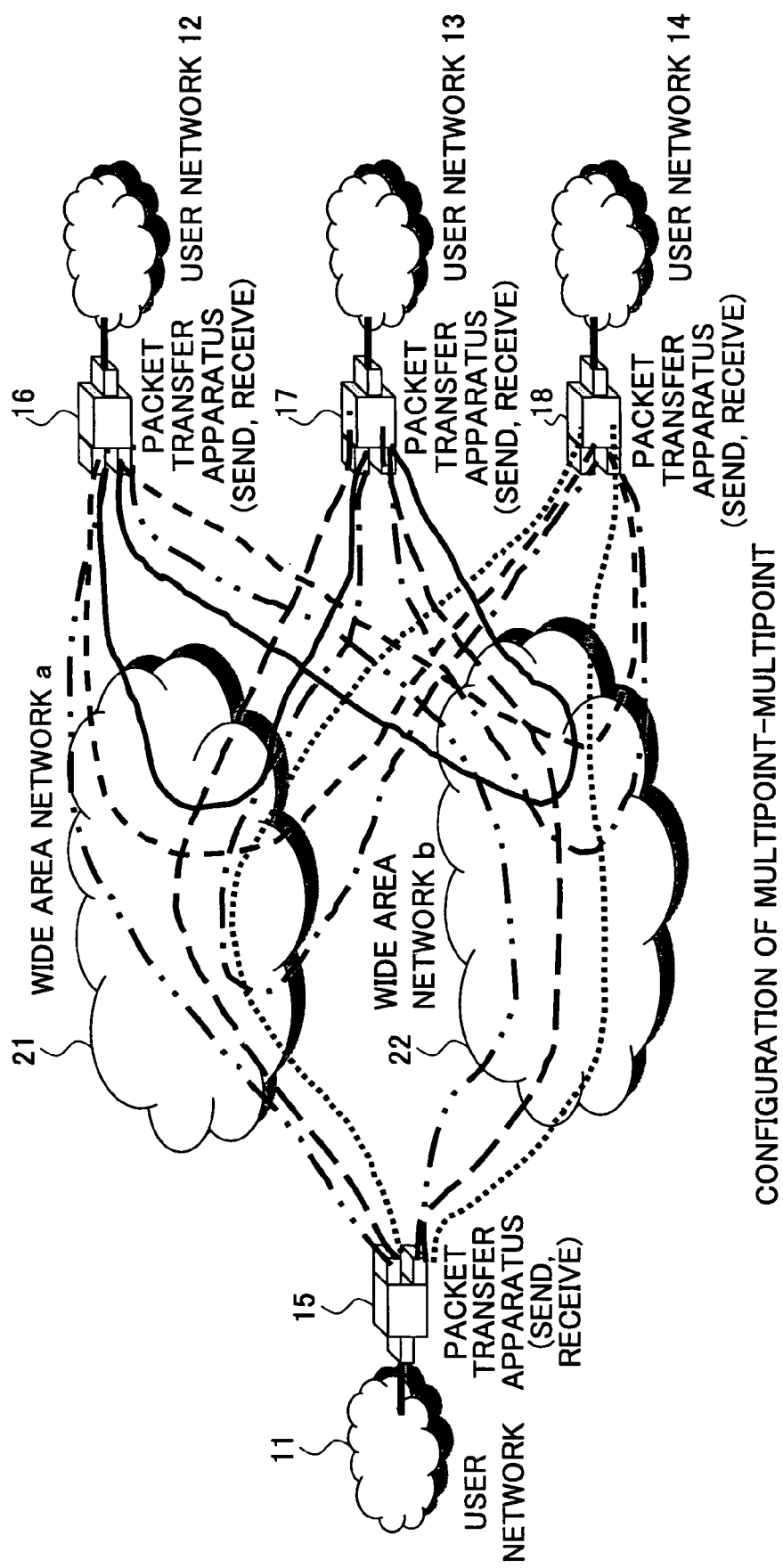
FIG. 50 is a network configuration diagram in a nineteenth embodiment of the present invention.

Next, the nineteenth embodiment is described. FIG. 50 shows a network configuration diagram in this embodiment. As shown in FIG. 50, this network is a multipoint-multipoint network for sending packets to a plurality destinations from a plurality of sources.

Figure 51:
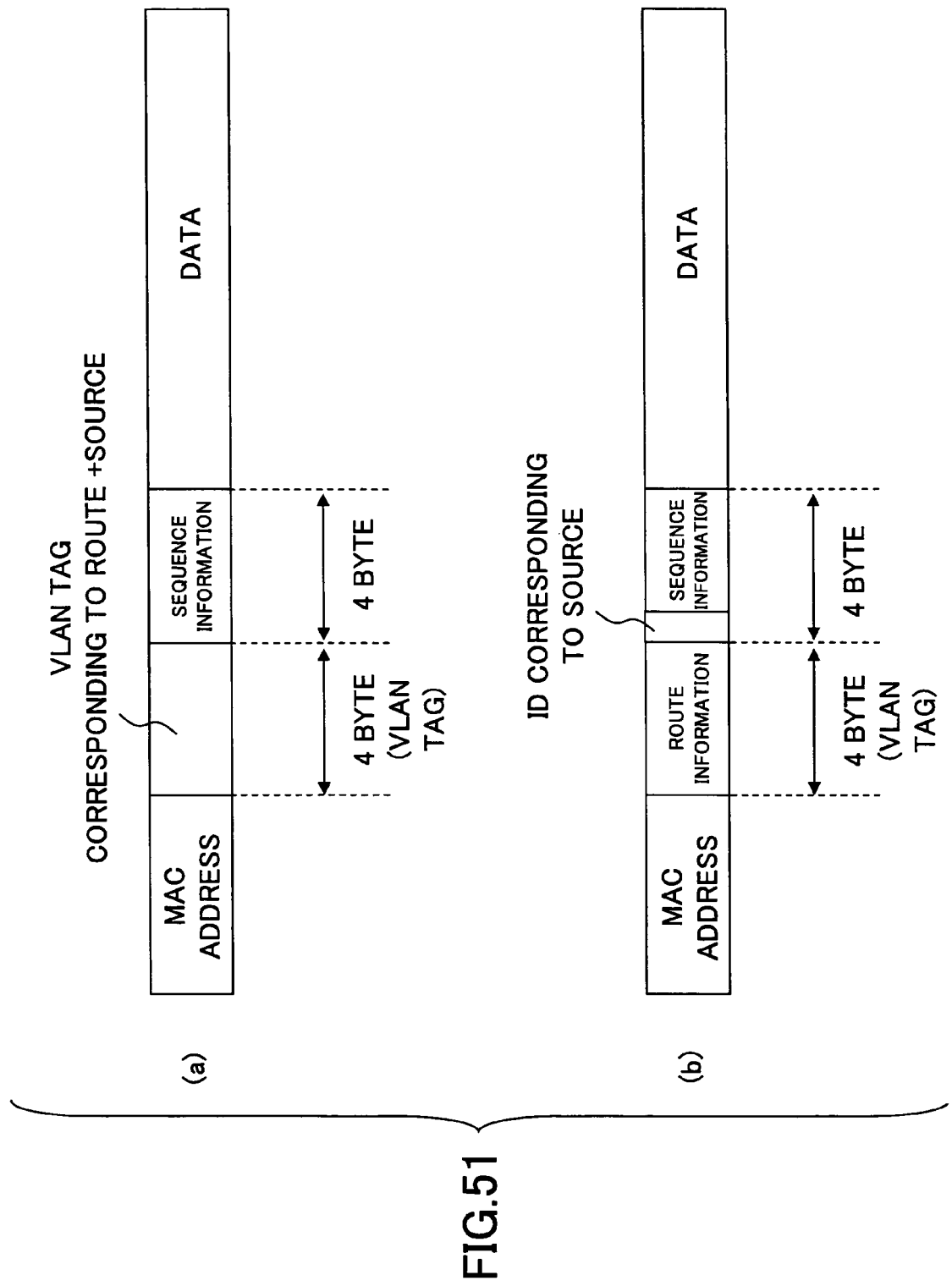
FIG. 51 shows a packet configuration example for Ethernet in the nineteenth embodiment of the present invention.

FIG. 51 shows a packet configuration example for the Ethernet in this embodiment. As shown in FIG. 51(a), a VLAN tag (4 bytes) corresponding to a route for transferring the packet and a source, and sequence information (4 bytes) are added. In addition, a configuration shown in FIG. 51(b) can be also adopted. In the case of FIG. 51(b), in addition to providing a VLAN tag of 4 bytes as route information, an ID number for identifying a source is provided in the sequence identifier.

Figure 52:
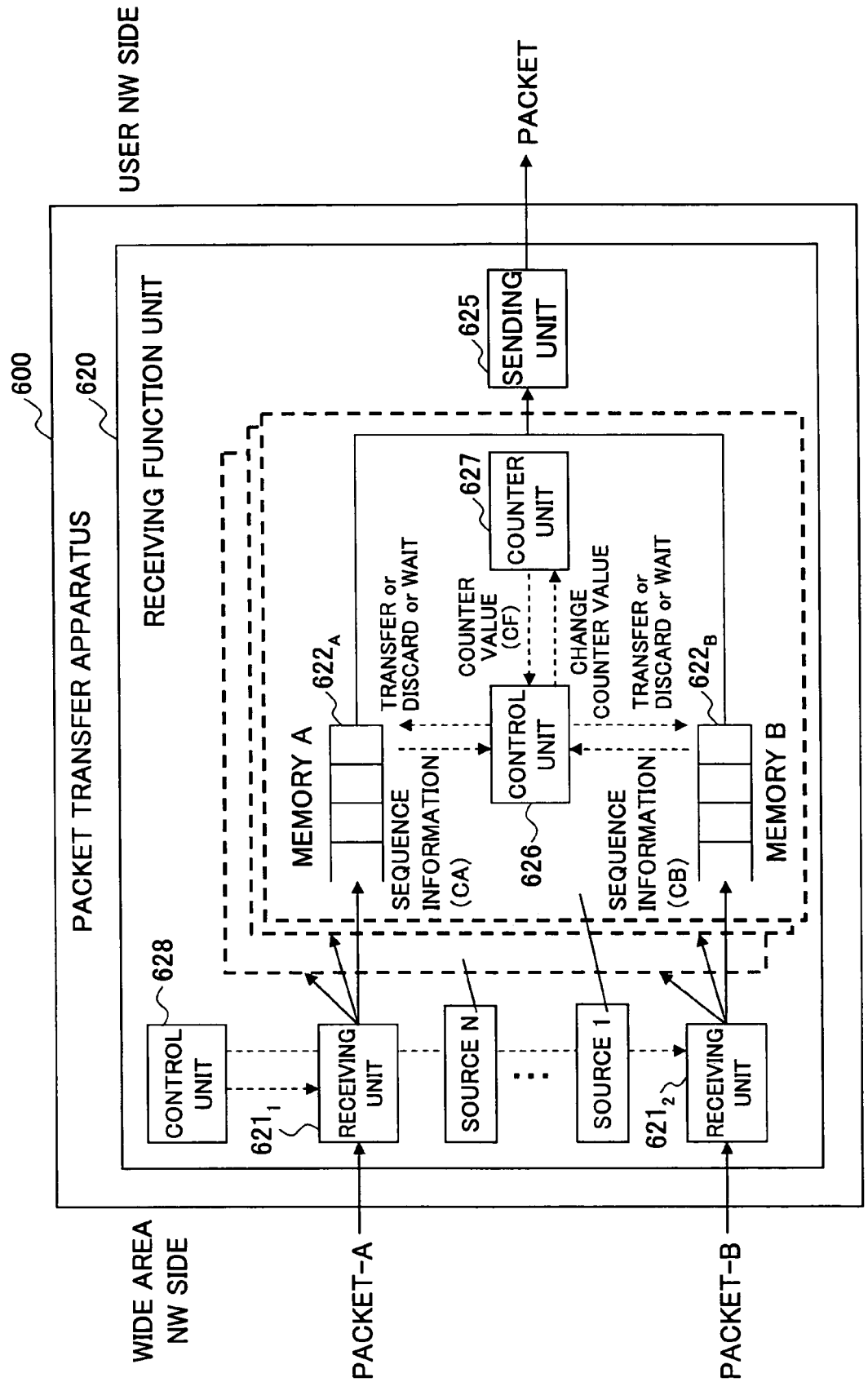
FIG. 52 is a block diagram of a receiving function unit of the packet transfer apparatus in the eighteenth embodiment of the present invention.

FIG. 52 is a block diagram of the receiving function unit 620 of the packet transfer apparatus 600 in this embodiment. The sending function unit is not shown. In this embodiment, since a different sequence identifier is provided for each source, a configuration for realizing functions of embodiments described so far is provided for each source. That is, as shown in FIG. 52, the receiving function unit 620 of this embodiment includes, for each source, a memory A $622_A$, a memory B $622_B$, a control unit 626 and a counter unit 627. In addition, a control unit 628 is provided. The control unit 628 recognizes source information to identify a storing destination memory for each source.

Twentieth Embodiment

Figure 53:
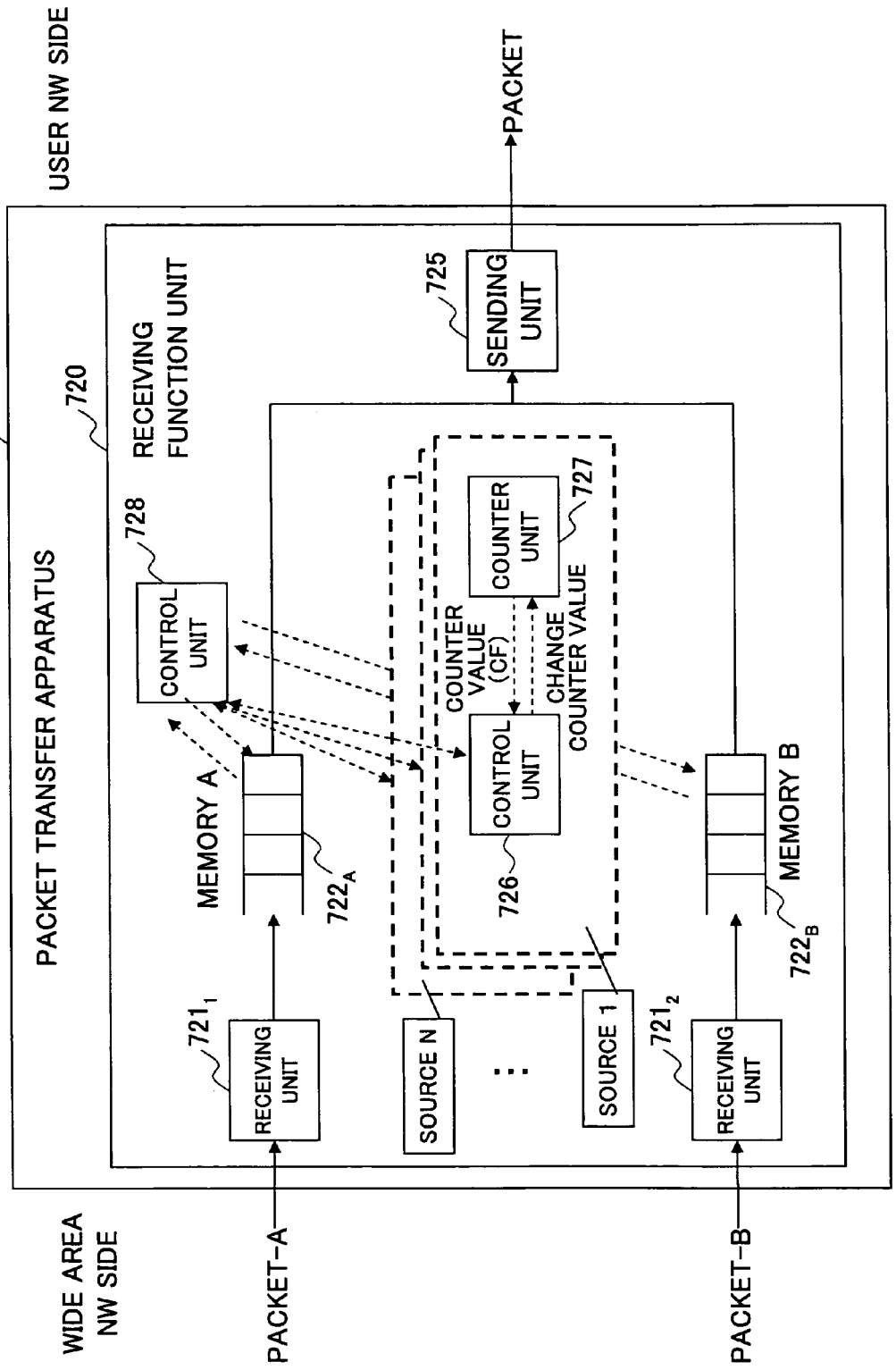
FIG. 53 is a block diagram of a receiving function unit of the packet transfer apparatus in a twentieth embodiment of the present invention.

FIG. 53 shows another example of the receiving function unit 720 of the packet transfer apparatus 700 that can be applied to the network shown in FIG. 50.

In the configuration shown in FIG. 53, the memory A, B is not differentiated for each source. That is, one memory A $722_A$ and one memory B $722_B$ are provided. In this embodiment, the control unit 728 obtains values of CA and CB and source information from packets in the memory A and the memory B, and transfers the values of CA and CB to the control unit 726 corresponding to a source based on the source information. The control unit 726 corresponding to the source performs sequence comparison of the packets, and sequence comparison result is returned to the control unit 728. The control unit 728 performs discard/transfer/waiting for a packet for the memory A $722_A$ and the memory B $722_B$ based on the sequence comparison result. The process procedure for one source is the same as one in embodiments described so far.

Twenty First Embodiment

In the above-mentioned embodiments, when using the counter value as the sequence identifier for determining the sameness of packets, since the counter value is finite (return to 0 after reaching the maximum value), a counter value once returned to 0 can not be distinguished from a counter value before returning to 0. Thus, in this embodiment, it is managed whether the counter returns to 0, and the counter values are compared considering it.

Figure 54:
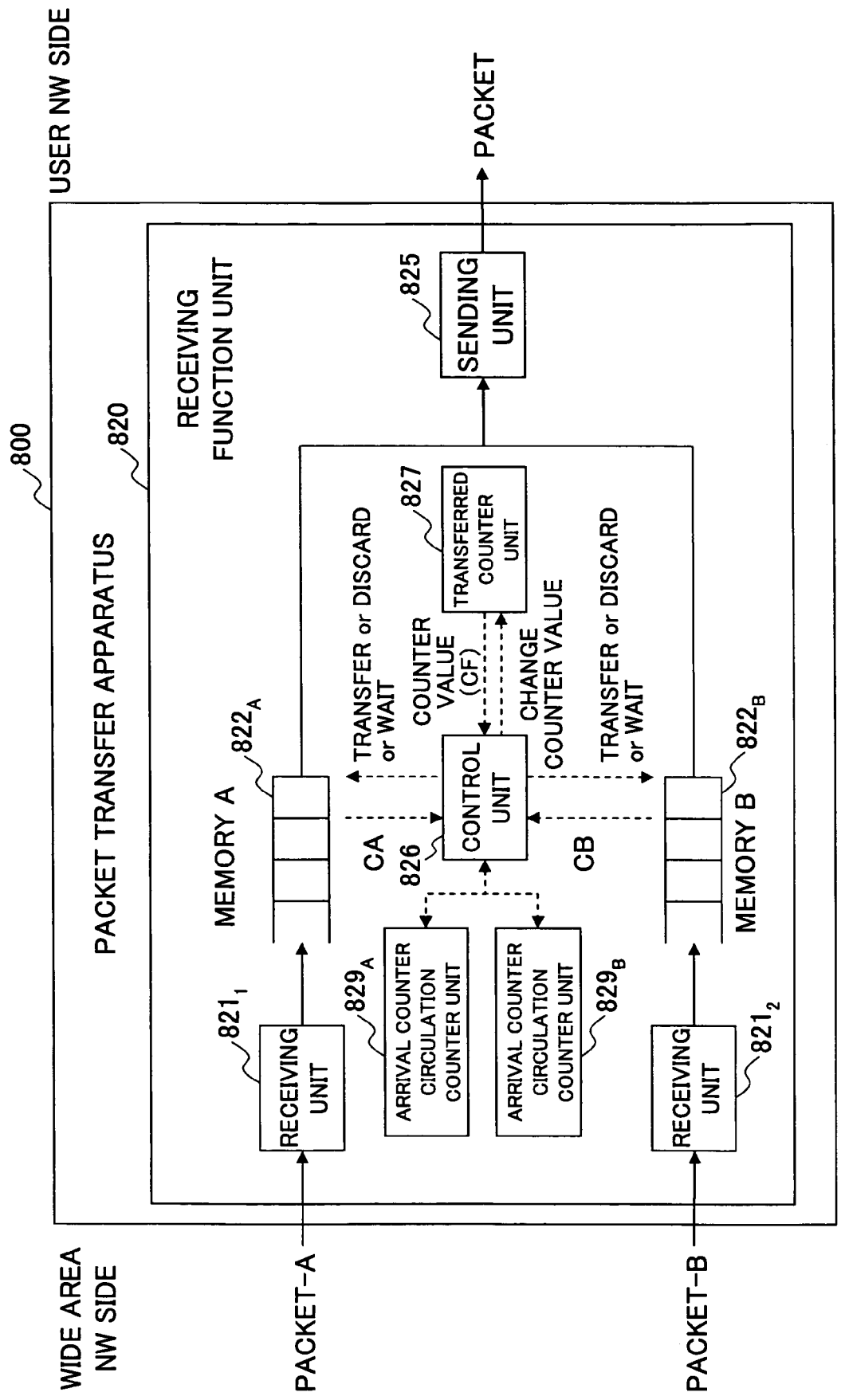
FIG. 54 is a block diagram of a receiving function unit of the packet transfer apparatus in a twenty-first embodiment of the present invention.

FIG. 54 shows a configuration of the receiving function unit 820 of the packet transfer apparatus in this embodiment. As shown in FIG. 54, the receiving function unit 820 includes an arrival counter/circulation counter unit 829 for each of the A system and the B system in addition to the configuration shown in FIG. 41.

Operation of the apparatus is described with reference to FIG. 55.

In the A system and the B system, circulation is managed independently. In the following, although circulation management in the A system is described, the same procedure applies for the B system.

Figure 55:
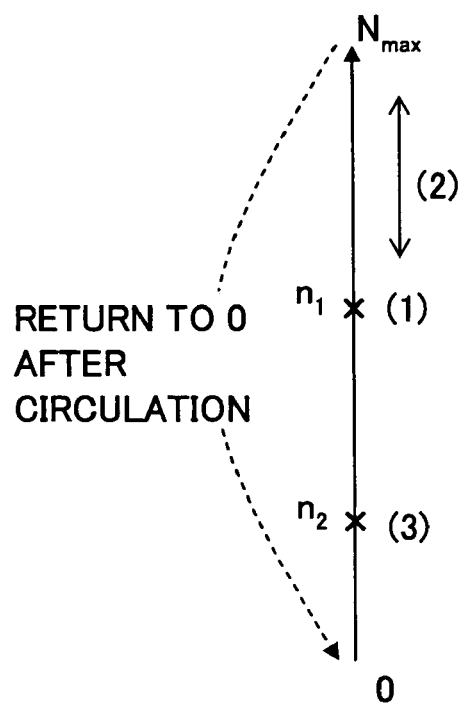
FIG. 55 is a figure for explaining operation outline of the receiving function unit of the packet transfer apparatus in the twenty-first embodiment of the present invention.

When a packet of a sequence $n_1$ arrives at the A system, the value of the arrival counter of the A system is set to be $n_1$, and the circulation timer of the A system of the control unit 826 is reset ((1) in FIG. 55). By the time when a next packet arrives, if the circulation timer counts a time from $n_1$ to the maximum value of the sequence number, 1 is added to the circulation counter of the A system ((2) in FIG. 55). Assuming that the maximum value of the sequence number is $N_{max}$, the time can be represented as (time corresponding to (minimum frame length+inter-frame interval))×($N_{max}-n_1$). When a next packet arrives before the circulation counter changes, a sequence number of the packet is used for sequence comparison as it is.

When a next packet (sequence $n_2$) of the A system arrives within a delay time difference between the A system and the B system ((3) of FIG. 55), if the circulation counter is in a state in which 1 is added and if $n_2<n_1$, the sequence of the packet of the A system is set to be $n_2+N_{max}$ and it is used for sequence comparison. Although the circulation counter is in a state in which 1 is added, if $n_2 \geq n_1$, sequence comparison is performed using $n_2$ as it is. After (2), if a next packet does not arrive within the delay difference time between the A system and the B system, the transferred counter value is returned to 0.

In the above-mentioned processes, at the time when circulation counters become the same between the A system and the B system, both circulation counters are returned to 0. In addition, the maximum value $N_{max}$ of the sequence is set such that (delay difference between A and B)≦((time corresponding to (minimum frame length (64 bytes)+inter-frame interval)×$N_{max}$).

Figure 56:
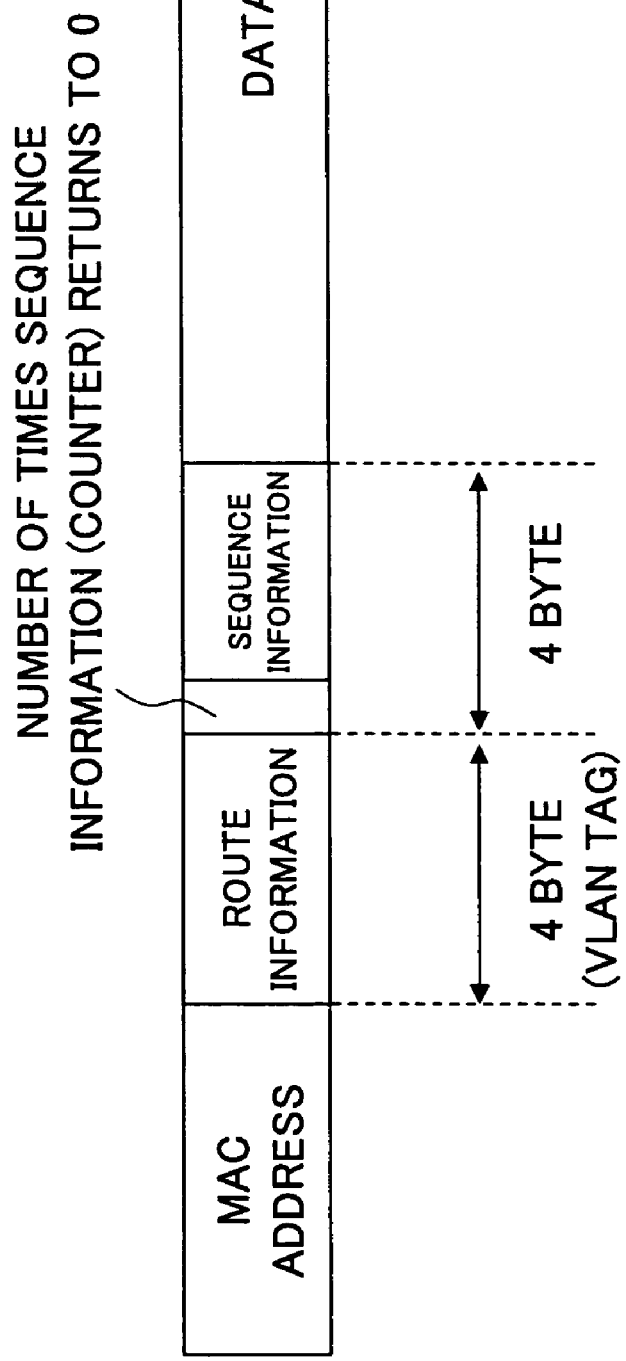
FIG. 56 shows a packet configuration example for Ethernet in the twenty-first embodiment of the present invention.

In addition, by storing the number of times the counter value is returned to 0 in the receiving side, the number of times the counter value is returned to 0 and the counter value can be used for comparison in the receiving side. FIG. 56 shows a configuration example of a packet for the Ethernet when adopting this method. As shown in FIG. 56, in addition to the counter value, the number of times the counter is returned to 0 is recorded. In the receiving side, the number and the counter value of a packet are compared with those of another packet. That is, when the number of times the counter is returned to 0 is the same, the counter value is compared.

The present invention is not limited to the specifically disclosed embodiments, and variations and modifications may be made without departing from the scope of the invention.

The invention claimed is:

1. A packet transfer method in a network apparatus that transfers packets, comprising:
generating, using a sending side apparatus, two packets, the packets being copies of a send packet, and including a first packet and a second packet;

providing, using the sending side apparatus, a sequence number identifying a same sending sequence to each of the packets, the sequence number including a first sequence number and a second sequence number, the first packet having the first sequence number, and the second packet having the second sequence number;

providing, using the sending side apparatus, a first identifier corresponding to a first send/receive pair and a second identifier corresponding to a second send/receive pair, to a respective one of the packets in order to send the packets over two routes, in the sending side apparatus, which are different from each other; and receiving, using a receiving side apparatus, the packets via two receiving units;

recognizing the first and second identifiers, each of the first and second identifiers corresponding to one of the first and second send/receive pairs;

identifying packets having a same information and the sequence based on the sequence number when the first and second identifiers are the same;

selecting the first packet of one of the packets of a same sequence so as to send the selected one of the packets downstream, in response to the first sequence number of the first packet being equal to a reference counter number;

selecting the second packet of one of the packets of the same sequence so as to send the selected one of the packets downstream, in response to the second sequence number of the second packet being equal to the reference counter number when the first sequence number of the first packet is greater than the reference counter number; and discarding a remaining one of the packets which is not selected by the selecting, wherein, when only one of the packets of the same sequence is received by the receiving, only the received one of the packets is sent downstream.

2. A packet transfer method in a network apparatus that transfers packets, comprising:

generating, using a sending side apparatus, two packets, the packets being copies of a send packet, and including a first packet and a second packet, providing, using the sending side apparatus, a sequence number identifying a same sending sequence to each of the packets, the sequence number including a first sequence number and a second sequence number, the first packet having the first sequence number, and the second packet having the second sequence number;

providing, using the sending side apparatus, a first identifier corresponding to a first send/receive pair and a second identifier corresponding to a first route, and a third identifier corresponding to a second send/receive pair and a fourth identifier corresponding to a second route, to a respective one of the packets in order to send the packets over two routes, in the sending side apparatus, which are different from each other; and receiving, using a receiving side apparatus, the packets via two receiving units;

recognizing the first and third identifiers respectively corresponding to the first and second send/receive pairs and the second and fourth identifiers respectively corresponding to the first and second routes;

identifying packets having a same information and the sequence based on the sequence number when the first and third identifiers are the same;

selecting the first packet of one of the packets of a same sequence so as to send the selected one of the packets downstream, in response to the first sequence number of the first packet being equal to a reference counter number;

selecting the second packet of one of the packets of the same sequence so as to send the selected one of the packets downstream, in response to the second sequence number of the second packet being equal to the reference counter number when the first sequence number of the first packet is greater than the reference counter number; and discarding a remaining one of the packets which is not selected by the selecting, wherein, when only one of the packets of the same sequence is received by the receiving, only the received one of the packets is sent downstream.

3. The packet transfer method as claimed in claim 2, wherein the receiving side apparatus temporarily stores the two packets transferred from the first and second routes into two FIFO memories respectively, and selects one of the packets which was transferred normally to transfer downstream.

4. The packet transfer method as claimed in claim 2, wherein the receiving side apparatus temporarily stores the two packets transferred from the first and second routes into two circulating hash memories respectively, and selects one of the packets which was transferred normally to transfer downstream.

5. The packet transfer method as claimed in claim 2, wherein the receiving side apparatus temporarily stores the two packets transferred from the first and second routes into two FIFO memories respectively, and selects one of the packets which was transferred normally using a third memory shared by the two receiving units so as to transfer the selected one of the packets downstream.

6. The packet transfer method as claimed in claim 2, wherein Ethernet is used as a packet transfer technology.

7. The packet transfer method as claimed in claim 6, wherein a tag field and a counter field are inserted following a source MAC address in an Ethernet packet so as to write a VLAN tag corresponding to the first or second route and the sequence number.

8. The packet transfer method as claimed in claim 6, wherein a tag field and a counter field are inserted following a source MAC address in an Ethernet packet so as to write a VLAN tag corresponding to the first or second send/receive pair and the sequence number.

9. The packet transfer method as claimed in claim 6, wherein a tag field and a counter field are inserted following a source MAC address in an Ethernet packet so as to write a VLAN tag corresponding to the first or second send/receive pair and a sending route and write the sequence number.

10. The packet transfer method as claimed in claim 6, wherein a tag field and a counter field are inserted following a source MAC address in an Ethernet packet so as to write a VLAN tag corresponding to the first or second sending route, an identifying ID corresponding to the first or second send/receive pair, and the sequence number.

11. The packet transfer method as claimed in claim 2, wherein Multiprotocol Label Switching (MPLS) is used as a packet transfer technology.

12. The packet transfer method as claimed in claim 11, wherein a tag field and a counter field are inserted before a shim header of the MPLS so as to write the shim header corresponding to the first or second sending route, and the sequence number.

13. The packet transfer method as claimed in claim 11, wherein a tag field and a counter field are inserted before a shim header of the MPLS so as to write the shim header corresponding to the first or second send/receive pair, and the sequence number.

14. The packet transfer method as claimed in claim 11, wherein a tag field and a counter field are inserted before a shim header of the MPLS so as to write the shim header corresponding to a sending route, an identifying ID corresponding to the first or second send/receive pair, and the sequence number.

15. The packet transfer method as claimed in claim 11, wherein a tag field and a counter field are inserted before a shim header of the MPLS so as to write the shim header corresponding to a sending route and the first or second send/receive pair, and the sequence number.

16. The packet transfer method as claimed in claim 4, wherein a region of each memory using circulating hash is divided into n (n is an integer no less than 2) to which addresses 1-n are assigned,
when the receiving side apparatus receives a packet, the receiving side apparatus stores the packet in a memory region of an address that is a reminder of a counter value when divided by n,
even when a packet having the counter value of N arrives prior to a packet having the counter value of N-n, the packet is once stored in the memory region of the address that is the reminder of the counter value N when divided by n, and when reading out the packet, the packet is read out in the order of the counter value, so that reversal of arriving sequence within n is corrected to a correct sequence when reading out the packet.

17. The packet transfer method as claimed in claim 2, wherein a packet transfer technology utilizing encapsulation of a variable-length packet is used.

18. The packet transfer method as claimed in claim 17, wherein, when providing a header to the variable-length packet for the encapsulation, a counter field is inserted after the header for the encapsulation so as to write the sequence number.

19. The packet transfer method as claimed in claim 18, wherein the receiving side apparatus extracts the first or third identifier corresponding to the first or second send/receive pair or the second or fourth identifier corresponding to the first or second route from the header for encapsulation.

20. A packet transfer apparatus for transferring packets, comprising:
sending function means comprising:
copy means for generating two packets, the packets being copies of a send packet, and including a first packet and a second packet;
number/identifier providing means for providing a sequence number identifying a same sending sequence to each of the packets generated by the copy means, the sequence number including a first sequence number and a second sequence number, the first packet having the first sequence number, and the second packet having the second sequence number, and for providing a first identifier corresponding to a first send/receive pair and a second identifier corresponding to a second send/receive pair, to each of the packets;
packet sending means for sending, over two routing means which are different from each other, the two packets to which the sequence number is provided and the first and second identifiers are respectively provided; and
receiving function means comprising:
packet receiving means for receiving the two packets sent from the sending function means;
a plurality of memories each storing one of the two received packets;
selection means for reading out the two packets stored in the memories, recognizing the first and second identifiers, each of the first and second identifiers corresponding to one of the first and second send/receive pairs, for identifying packets having a same information and the sequence based on the sequence number when the first and second identifiers are the same, for selecting the first packet of one of the packets of a same sequence, in response to the first sequence number of the first packet being equal to a reference counter number, and for selecting the second packet of one of the packets of the same sequence, in response to the second sequence number of the second packet being equal to the reference counter number when the first sequence number of the first packet is greater than the reference counter number; and
sending means for sending the one of the packets selected in the selection means downstream, and discarding a remaining one of the packets which is not selected by the selection means,
wherein, when only one of the packets of the same sequence is received by the packet receiving means, only the received one of the packets is sent downstream.

21. A packet transfer apparatus for transferring packets, comprising:
sending function means comprising:
copy means for generating two packets, the packets being copies of a send packet, and including a first packet and a second packet;
number/identifier providing means for providing a sequence number identifying a same sending sequence to each of the packets generated by the copy means, the sequence number including a first sequence number and a second sequence number, the first packet having the first sequence number, and the second packet having the second sequence number, and for providing a first identifier corresponding to a first send/receive pair and second identifier corresponding to a first route, and a third identifier corresponding to a second send/receive pair and a fourth identifier corresponding to a second route, to each of the packets;
packet sending means for sending, over two routing means which are different from each other, the two packets to which the sequence number and the first, second, third and fourth identifiers are respectively provided; and
receiving function means comprising:
packet receiving means for receiving the packets sent from the sending function means;
a plurality of memories each for storing one of the two received packets;
selection means for reading out the two packets stored in the memories, recognizing the first and third identifiers, each of the first and third identifiers corresponding to one of the first and second send/receive pairs and the second and fourth identifiers, each of the second and fourth identifiers corresponding to one of the first and second routes, for identifying packets having a same information and the sequence based on the sequence number when the first and third identifiers are the same, for selecting the first packet of one of the packets of a same sequence, in response to the first sequence number of the first packet being equal to a reference counter number, and for selecting the second packet of one of the packets of the same sequence, in response to the second sequence number of the second packet being equal to the reference counter number when the first sequence number of the first packet is greater than the reference counter number; and sending means for sending the one of the packets selected in the selection means downstream, and discarding a remaining one of the packets which is not selected by the selection means, wherein, when only one of the packets of the same sequence is received by the packet receiving means, only the received one of the packets is sent downstream.

22. The packet transfer apparatus as claimed in claim 20 or 21, wherein the plurality of memories are FIFO memories, and the selection means of the receiving function means further includes means for selecting one of the packets determined as being transferred normally from the packets temporarily stored in the FIFO memories.

23. The packet transfer apparatus as claimed in claim 20 or 21, wherein the plurality of memories are circulating hash memories, and the selection means of the receiving function means further includes means for selecting one of the packets determined as being Previously Presented transferred normally from among the packets temporarily stored in the two circulating hash memories.

24. The packet transfer apparatus as claimed in claim 20 or 21, wherein the plurality of memories are FIFO memories, and the receiving function means further includes a third memory shared by the packet receiving means, and further includes means for selecting one of the packets determined as being transferred normally using the third memory as a circulating hash.

25. The packet transfer apparatus as claimed in claim 21, wherein Ethernet is used as a packet transfer technology in the sending function means and the receiving function means.

26. The packet transfer apparatus as claimed in claim 25, wherein a tag field and a counter field are inserted following a source MAC address in an Ethernet packet so as to write a VLAN tag corresponding to the first or second route and the sequence number.

27. The packet transfer apparatus as claimed in claim 25, wherein a tag field and a counter field are inserted following a source MAC address in an Ethernet packet so as to write a VLAN tag corresponding to the first or second send/receive pair and the sequence number.

28. The packet transfer apparatus as claimed in claim 25, wherein a tag field and a counter field are inserted following a source MAC address in an Ethernet packet so as to write a VLAN tag corresponding to the first or second send/receive pair and a sending route and write the sequence number.

29. The packet transfer apparatus as claimed in claim 25, wherein a tag field and a counter field are inserted following a source MAC address in an Ethernet packet so as to write a VLAN tag corresponding to a sending route, an identifying ID corresponding to the first or second send/receive pair, and the sequence number.

30. The packet transfer apparatus as claimed in claim 20 or 21, wherein MPLS is used as a packet transfer technology.

31. The packet transfer apparatus as claimed in claim 30, wherein a tag field and a counter field are inserted before a shim header of the MPLS so as to write the shim header corresponding to a sending route, and the sequence number.

32. The packet transfer apparatus as claimed in claim 30, wherein a tag field and a counter field are inserted before a shim header of the MPLS so as to write the shim header corresponding to the first or second send/receive pair, and the sequence number.

33. The packet transfer apparatus as claimed in claim 30, wherein a tag field and a counter field are inserted before a shim header of the MPLS so as to write the shim header corresponding to a sending route, an identifying ID corresponding to the first or second send/receive pair, and the sequence number.

34. The packet transfer apparatus as claimed in claim 30, wherein a tag field and a counter field are inserted before a shim header of the MPLS so as to write the shim header corresponding to a sending route and the first or second send/receive pair, and the sequence number.

35. The packet transfer apparatus as claimed in claim 25, wherein a region of each memory using circulating hash is divided into n (n is an integer no less than 2) to which addresses 1-n are assigned, when the packet transfer apparatus receives a packet, the packet transfer apparatus stores the packet in a memory region of an address that is a reminder of a counter value when divided by n, even when a packet having the counter value of N arrives prior to a packet having the counter value of N-n, the packet is once stored in the memory region of the address that is the reminder of the counter value N when divided by n, and when reading out the packet, the packet is read out in the order of the counter value, so that reversal of arriving sequence within n is corrected to a correct sequence when reading out the packet.

36. The packet transfer apparatus as claimed in claim 21, wherein a packet transfer technology utilizing encapsulation of a variable-length packet is used.

37. The packet transfer apparatus as claimed in claim 36, wherein, when providing a header to the variable-length packet for the encapsulation, a counter field is inserted after the header for the encapsulation so as to write the sequence number.

38. The packet transfer apparatus as claimed in claim 37, wherein the packet transfer apparatus extracts the first or third identifier corresponding to the first or second send/receive pair or the second or fourth identifier corresponding to the first or second route from the header for the encapsulation.

* * * * *